(12) United States Patent
Wang et al.

(10) Patent No.: US 11,979,202 B2
(45) Date of Patent: May 7, 2024

(54) EMULATED CARD SELECTION METHOD AND MOBILE DEVICE

(71) Applicant: Huawei Technologies Co., Ltd., Shenzhen (CN)

(72) Inventors: Sishan Wang, Beijing (CN); Xinmiao Chang, Beijing (CN); Xiaona Zhao, Beijing (CN); Jingqing Mei, Shenzhen (CN); Chen Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 16/958,491

(22) PCT Filed: Dec. 29, 2017

(86) PCT No.: PCT/CN2017/120044
§ 371 (c)(1),
(2) Date: Jun. 26, 2020

(87) PCT Pub. No.: WO2019/127441
PCT Pub. Date: Jul. 4, 2019

(65) Prior Publication Data
US 2021/0067201 A1   Mar. 4, 2021

(51) Int. Cl.
| | |
|---|---|
| H04B 5/00 | (2006.01) |
| G01S 17/04 | (2020.01) |
| G06K 7/10 | (2006.01) |
| G06Q 20/32 | (2012.01) |
| G06Q 20/34 | (2012.01) |
| H04W 4/80 | (2018.01) |

(52) U.S. Cl.
CPC ............ H04B 5/0056 (2013.01); G01S 17/04 (2020.01); G06K 7/10297 (2013.01);
(Continued)

(58) Field of Classification Search
CPC ............ H04B 5/0056; G06Q 20/3278; G06Q 20/352; G06Q 20/227; G06Q 20/351;
(Continued)

(56) References Cited

U.S. PATENT DOCUMENTS

| | | |
|---|---|---|
| 8,882,509 B1 | 11/2014 | Nunamaker |
| 2012/0265685 A1 | 10/2012 | Brudnicki et al. |

(Continued)

FOREIGN PATENT DOCUMENTS

| | | |
|---|---|---|
| CN | 101790183 A | 7/2010 |
| CN | 104933556 A | 9/2015 |

(Continued)

*Primary Examiner* — Eugene Yun
(74) *Attorney, Agent, or Firm* — Conley Rose, P.C.

(57) ABSTRACT

An emulated card selection method is implemented on a mobile device having a near field communication (NEC) NFC function. A first emulated card and a second emulated card are configured on the mobile device, When detecting an NFC radio frequency field, the mobile device detects whether there is fingerprint input. The mobile device selects the first emulated card if there is the fingerprint input. The mobile device selects the second emulated card if there is no fingerprint input. The mobile device performs NEC interaction with the NFC card reader based on the selected first emulated card or second emulated card. The mobile device can automatically select an emulated card in different emulated cards based on a card swiping status when a user uses an NEC emulated card.

20 Claims, 27 Drawing Sheets

(52) U.S. Cl.
CPC ....... *G06Q 20/3278* (2013.01); *G06Q 20/352* (2013.01); *H04W 4/80* (2018.02); *G06Q 20/326* (2020.05)

(58) Field of Classification Search
CPC ............ G06Q 20/40145; H04W 4/80; H04W 12/068; H04W 1/72454; H04W 2250/04; H04W 1/725; G06K 7/10297; G01S 17/04; G06F 21/32; G06F 21/629
USPC ........................................................ 455/41.1
See application file for complete search history.

(56) References Cited

U.S. PATENT DOCUMENTS

| | | | | |
|---|---|---|---|---|
| 2014/0279530 | A1* | 9/2014 | Douglas | ............. G06Q 20/3278 705/44 |
| 2015/0039520 | A1 | 2/2015 | Polivka | |
| 2015/0134513 | A1* | 5/2015 | Olson | ............... G06K 19/06206 705/39 |
| 2016/0119300 | A1* | 4/2016 | Studerus | ............ G07C 9/00309 713/171 |
| 2016/0337863 | A1* | 11/2016 | Robinson | ............... H04W 4/021 |
| 2017/0243192 | A1 | 8/2017 | Andrews et al. | |
| 2018/0144115 | A1* | 5/2018 | Wennemer | ........... G06Q 20/352 |
| 2019/0205863 | A1* | 7/2019 | Shin | ................... G06Q 20/3227 |

FOREIGN PATENT DOCUMENTS

| | | |
|---|---|---|
| CN | 105491243 A | 4/2016 |
| CN | 106204049 A | 12/2016 |
| CN | 106231090 A | 12/2016 |
| CN | 106354410 A | 1/2017 |
| CN | 106709712 A | 5/2017 |
| CN | 106920090 A | 7/2017 |
| CN | 107122976 A | 9/2017 |
| CN | 107315609 A | 11/2017 |

* cited by examiner

EMULATED CARD SELECTION METHOD AND MOBILE DEVICE

CROSS-REFERENCE TO RELATED APPLICATIONS

This application is a National Stage of International Patent Application No. PCT/CN2017/120044 filed on Dec. 29, 2017, which is hereby incorporated by reference in its entirety.

TECHNICAL FIELD

The present invention relates to the near field communication (Near Field Communication, NFC for short below) field, and in particular, to an emulated card selection method and a mobile device.

BACKGROUND

Near field communication (Near Field Communication, NFC for short below) is a short-distance high-frequency radio technology, runs within a distance of 10 centimeters at an operating frequency of 13.56 MHz±7 kHz, and has three transmission speeds: 106 Kbit/s, 212 Kbits. and 424 Kbit/s. Currently, the NFC technology has become a related international standard, and is widely applied. An NFC mobile device (for example, a mobile phone, a tablet computer, or a wearable electronic device having a wireless communication function) is a mobile device with NFC hardware. The NFC mobile device can support many corresponding application programs. Usually, the mobile device has three application modes: a card reader mode, a point-to-point (P2P) mode, and a card emulation mode. In the card reader mode, the NFC mobile device is used as a contactless card reader. For example, the NFC mobile device reads related information from an NFC tag of a poster or an exhibition. In this mode, the NFC mobile device having a read/write function may collect data from the NFC tag, and then process the data. Typical scenarios based on this mode include reading an electronic advertisement, selling a ticket, selling a ticket for a cinema, and the like. For example, if an NFC tag is attached to a movie poster, a user may bring a mobile device that supports NFC close to the movie poster, to obtain detailed information about the movie, or immediately purchase a movie ticket online by using a credit card. The card reader mode can be further used to obtain simple data, for example, obtain information such as bus station information or a park map. In the point-to-point mode, two NFC mobile devices establish a connection, to implement point-to-point data transmission. In this mode, a plurality of digital cameras, tablet computers, and mobile phones that have an NFC function can be wirelessly interconnected to implement data exchange. Typical application scenarios based on this mode include quickly establishing a Bluetooth connection, exchanging contact cards, and the like. In the card emulation mode, an NFC card reader is an active device and generates an NFC radio frequency field, and the NFC mobile device is a passive device and emulates a contactless radio frequency card that meets an NFC standard to exchange data with the NFC card reader. This mode is mainly used in a contactless mobile payment scenario such as a store or a transportation scenario. A user needs only to place the NFC mobile device close to the NFC card reader, and enter a password to confirm a transaction or directly accept a transaction. In this way, a contactless payment service can be performed by using the NFC mobile device without changing an existing facility. Typical scenarios based on this mode include local payment, door access control, and the like.

In the card emulation mode, a current NFC mobile device can support three types of emulated cards. The emulated card is a radio frequency card emulated by the mobile device by using NFC hardware. The three types of emulated cards are respectively a bank card, a bus card, and an entrance guard card. One NFC mobile device can support all the foregoing three types of emulated cards. However, only one of the cards can be selected as a currently used emulated card at a specific moment. When the user manually selects a card, the user needs to determine a to-be-selected card based on a specific NFC emulated card usage scenario. However, operation steps performed in the mobile device in this process are very complex. Consequently, a capability of intelligent interaction between the mobile device and the user is severely reduced, and efficiency of the mobile device is low.

SUMMARY

To resolve the foregoing technical problems, embodiments of this application provide an emulated card selection method and a mobile device, so that the mobile device can automatically select an emulated card in different emulated cards based on a card swiping status when a user uses an NFC emulated card. Therefore, a requirement of the user for a quick and convenient switching process is met, and a capability of intelligent interaction between the mobile device and the user is greatly improved.

According to a first aspect, an emulated card selection method is provided, the method is implemented on a mobile device having an NFC function, a first emulated card and a second emulated card are configured on the mobile device, and the method includes: when detecting an NFC radio frequency field, detecting, by the mobile device, whether there is fingerprint input; selecting, by the mobile device, the first emulated card if there is the fingerprint input; or selecting, by the mobile device, the second emulated card if there is no fingerprint input; and performing, by the mobile device, NFC interaction with the NFC card reader based on the selected first emulated card or second emulated card.

According to the technical solutions provided in the embodiments of this application, the mobile device can be more intelligent when performing NFC payment, so that efficiency of the mobile device is improved, user operations are reduced, and user experience for NFC payment is improved.

In a possible implementation, the detecting, by the mobile device, whether there is fingerprint input when detecting an NFC radio frequency field is specifically: when detecting the NFC radio frequency field, obtaining, by the mobile device, information indicating a status of obtaining a fingerprint image, and determining whether the information indicating the status of obtaining the fingerprint image is a state in which no fingerprint image is obtained, where there is no fingerprint input if the information indicating the status of obtaining the fingerprint image is the state in which no fingerprint image is obtained, or there is the fingerprint input if the information indicating the status of obtaining the fingerprint image is not the state in which no fingerprint image is obtained, and the information indicating the status of obtaining the fingerprint image is the obtaining status of the fingerprint image or a fingerprint verification result.

In a possible implementation, the obtaining, by the mobile device, information indicating a status of obtaining a fingerprint image when detecting the NFC radio frequency field is: when detecting the NFC radio frequency field, triggering, by the mobile device, a fingerprint module to collect the fingerprint image, and receiving the information that is returned by the fingerprint module and that indicates the status of obtaining the fingerprint image.

In a possible implementation, the detecting, by the mobile device, whether there is fingerprint input when detecting an NFC radio frequency field is specifically: when detecting the NFC radio frequency field, obtaining, by the mobile device, a working status of a fingerprint sensor, and determining whether the working status of the fingerprint sensor is an idle state, where there is no fingerprint input if the working status of the fingerprint sensor is the idle state, or there is the fingerprint input if the working status of the fingerprint sensor is not the idle state.

According to a second aspect, an emulated card selection method is provided, the method is implemented on a mobile device having an NFC function, a first emulated card and a second emulated card are configured on the mobile device, and the method includes: when detecting an NFC radio frequency field, detecting, by the mobile device, whether a front side of the mobile device is close to an NFC card reader; selecting, by the mobile device, the first emulated card if the front side of the mobile device is close to the NFC card reader; or selecting, by the mobile device, the second emulated card if the front side of the mobile device is not close to the NFC card reader; and performing, by the mobile device, NFC interaction with the NFC card reader based on the selected first emulated card or second emulated card.

In a possible implementation, an infrared ranging sensor is disposed on the mobile device, and the detecting, by the mobile device, whether a front side of the mobile device is close to an NFC card reader when detecting an NFC radio frequency field is specifically: when detecting the NFC radio frequency field, obtaining, by the mobile device, a distance detected by the infrared ranging sensor, and determining, based on the distance according to a preset card swiping status identification rule, whether the front side of the mobile device is close to the NFC card reader.

In a possible implementation, the infrared ranging sensor is disposed on a rear side of the mobile device, and the preset card swiping status identification rule is as follows: the rear side of the mobile device is close to the NFC card reader if the distance detected by the infrared ranging sensor is less than a preset distance threshold, or the front side of the mobile device is close to the NFC card reader if the distance detected by the infrared ranging sensor is not less than the preset distance threshold; or the rear side of the mobile device is close to the NFC card reader if the distance detected by the infrared ranging sensor continuously decreases, or the front side of the mobile device is close to the NFC card reader if the distance detected by the infrared ranging sensor does not continuously decrease.

In a possible implementation, the infrared ranging sensor is disposed on the front side of the mobile device, and the preset card swiping status identification rule is as follows: the front side of the mobile device is close to the NFC card reader if the distance detected by the infrared ranging sensor is less than a preset distance threshold, or a rear side of the mobile device is close to the NFC card reader if the distance detected by the infrared ranging sensor is not less than the preset distance threshold; or the front side of the mobile device is close to the NFC card reader if the distance detected by the infrared ranging sensor continuously decreases, or a rear side of the mobile device is close to the NFC card reader if the distance detected by the infrared ranging sensor does not continuously decrease.

In a possible implementation, an ambient light sensor is disposed on the mobile device, and the detecting, by the mobile device, whether a front side of the mobile device is close to an NFC card reader when detecting an NFC radio frequency field is specifically: when detecting the NFC radio frequency field, obtaining, by the mobile device, ambient light intensity data detected by the ambient light sensor, and determining, based on the ambient light intensity data according to a preset card swiping status identification rule, whether the front side of the mobile device is close to the NFC card reader.

In a possible implementation, the ambient light sensor is disposed on the front side of the mobile device, and the preset card swiping status identification rule is specifically as follows: the front side of the mobile device is close to the NFC card reader if the ambient light intensity is less than a preset light intensity threshold, or a rear side of the mobile device is close to the NFC card reader if the ambient light intensity is not less than the preset light intensity threshold; or the front side of the mobile device is close to the NFC card reader if an attenuation amount of the ambient light intensity is greater than a preset attenuation amount threshold, or a rear side of the mobile device is close to the NFC card reader if an attenuation amount of the ambient light intensity is not less than the preset attenuation amount threshold; or the front side of the mobile device is close to the NFC card reader if an attenuation speed of the ambient light intensity is greater than a preset attenuation speed threshold, or a rear side of the mobile device is close to the NFC card reader if an attenuation speed of the ambient light intensity is not greater than the preset attenuation speed threshold.

In a possible implementation, the ambient light sensor is disposed on a rear side of the mobile device, and the preset card swiping status identification rule is specifically as follows: the rear side of the mobile device is close to the NFC card reader if the ambient light intensity is less than a preset light intensity threshold, or the front side of the mobile device is close to the NFC card reader if the ambient light intensity is not less than the preset light intensity threshold; or the rear side of the mobile device is close to the NFC card reader if an attenuation amount of the ambient light intensity is greater than a preset attenuation amount threshold, or the front side of the mobile device is close to the NFC card reader if an attenuation amount of the ambient light intensity is not less than the preset attenuation amount threshold; or the rear side of the mobile device is close to the NFC card reader if an attenuation speed of the ambient light intensity is greater than a preset attenuation speed threshold, or the front side of the mobile device is close to the NFC card reader if an attenuation speed of the ambient light intensity is not greater than the preset attenuation speed threshold.

In a possible implementation, a camera is disposed on the mobile device, and the detecting, by the mobile device, whether a front side of the mobile device is close to an NFC card reader when detecting an NFC radio frequency field is specifically: when detecting the NFC radio frequency field, obtaining, by the mobile device, information collected by the camera, and determining whether there is a portrait in the information collected by the camera, to determine whether the front side of the mobile device is close to the NFC card reader.

In a possible implementation, a front-facing camera is disposed on the mobile device, and the detecting, by the mobile device, whether a front side of the mobile device is close to an NFC card reader when detecting an NFC radio frequency field is specifically: when detecting the NFC radio frequency field, obtaining, by the mobile device, information collected by the camera, and determining whether there is a portrait in the information collected by the camera, where a rear side of the mobile device is close to the NFC card reader if there is the portrait in the information collected by the camera, or the front side of the mobile device is close to the NFC card reader if there is no portrait in the information collected by the camera.

In a possible implementation, a rear-facing camera is disposed on the mobile device, and the detecting, by the mobile device, whether a front side of the mobile device is close to an NFC card reader when detecting an NFC radio frequency field is specifically: when detecting the NFC radio frequency field, obtaining, by the mobile device, information collected by the camera, and determining whether there is a portrait in the information collected by the camera, where the front side of the mobile device is close to the NFC card reader if there is the portrait in the information collected by the camera, or a rear side of the mobile device is close to the NFC card reader if there is no portrait in the information collected by the camera.

In a possible implementation, a posture sensor is disposed on the mobile device, and the detecting, by the mobile device, whether a front side of the mobile device is close to an NFC card reader when detecting an NFC radio frequency field is specifically: when detecting the NFC radio frequency field, obtaining, by the mobile device, data of the posture sensor, and calculating an included angle between a facing direction of the front side of the mobile device and a positive direction of a first axis based on the data of the posture sensor, where the first axis is perpendicular to a horizontal plane, the positive direction of the first axis faces upward, and a rear side of the mobile device is close to the NFC card reader if the included angle is less than 90 degrees, or the front side of the mobile device is close to the NFC card reader if the included angle is not less than 90 degrees.

According to a third aspect, an emulated card selection method is provided, the method is implemented on a mobile device having an NFC function, a first emulated card and a second emulated card are configured on the mobile device, and the method includes: when detecting an NFC radio frequency field, detecting, by the mobile device, whether the mobile device is held by a right hand; selecting, by the mobile device, the first emulated card if the mobile device is held by the right hand; or selecting, by the mobile device, the second emulated card if the mobile device is not held by the right hand; and performing, by the mobile device, NFC interaction with the NFC card reader based on the selected first emulated card or second emulated card.

In a possible implementation, a touchscreen is disposed on the mobile device, and the detecting, by the mobile device, whether the mobile device is held by a right hand when detecting an NFC radio frequency field is specifically: when detecting the NFC radio frequency field, obtaining, by the mobile device, sensing data of the touchscreen, and determining, based on the sensing data of the touchscreen, whether there is one touch area on a right side of the touchscreen and there are a plurality of touch areas on a left side of the touchscreen, where if there is one touch area on the right side of the touchscreen and there are the plurality of touch areas on the left side of the touchscreen, the mobile device is held by the right hand, or if there is not one touch area on the right side of the touchscreen or there are not the plurality of touch areas on the left side of the touchscreen, the mobile device is held by a left hand.

According to a fourth aspect, an emulated card selection method is provided, the method is implemented on a mobile device having an NFC function, a first emulated card and a second emulated card are configured on the mobile device, and the method includes: when detecting an NFC radio frequency field, detecting, by the mobile device, whether a display of the mobile device is on; selecting, by the mobile device, the first emulated card if the display is on; or selecting, by the mobile device, the second emulated card if the display is off; and performing, by the mobile device, NFC interaction with the NFC card reader based on the selected first emulated card or second emulated card.

In a possible implementation, before the mobile device detects the NFC radio frequency field, no emulated card is selected by a user.

In a possible implementation, that the mobile device detects the NFC radio frequency field is that strength that is of the NFC radio frequency field and that is detected by the mobile device exceeds a preset NFC radio frequency field strength threshold.

In a possible implementation, if the mobile device selects the first emulated card, before the mobile device performs NFC interaction with the NFC card reader based on the selected first emulated card, the method further includes: when the mobile device prompts the user with the first emulated card, enlarging the first emulated card relative to the second emulated card for display.

In a possible implementation, the first emulated card or the second emulated card is one of a bank card, a bus card, and an entrance guard card, and the first emulated card is different from the second emulated card.

According to a fifth aspect, an emulated card selection method is provided, the method is implemented on a mobile device having an NFC function, a first emulated card, a second emulated card, a third emulated card, and a fourth emulated card are configured on the mobile device, and the method includes: when detecting an NFC radio frequency field, detecting, by the mobile device, whether a front side of the mobile device is close to an NFC card reader and whether there is fingerprint input; selecting the first emulated card if there is the fingerprint input and the front side of the mobile device is close to the NFC card reader; or selecting the second emulated card if there is the fingerprint input and a rear side of the mobile device is close to the NFC card reader; or selecting the third emulated card if there is no fingerprint input and the front side of the mobile device is close to the NFC card reader; or selecting the fourth emulated card if there is no fingerprint input and a rear side of the mobile device is close to the NFC card reader; and performing, by the mobile device, NFC interaction with the NFC card reader based on the selected first emulated card, second emulated card, third emulated card, or fourth emulated card.

According to a sixth aspect, a mobile device is provided, the mobile device includes a processor, a memory, an NFC apparatus, and a fingerprint module, and a first emulated card and a second emulated card are configured on the mobile device. The processor is configured to: when the NFC apparatus detects an NFC radio frequency field of an NFC card reader, detect whether there is fingerprint input; and select the first emulated card if there is the fingerprint input; or select the second emulated card if there is no fingerprint input. The NFC apparatus is configured to perform NFC interaction with the NFC card reader based on the first emulated card or the second emulated card selected by the processor.

In a possible implementation, that the processor is configured to: when the NFC apparatus detects an NFC radio frequency field of an NFC card reader, detect whether there is fingerprint input is as follows: when the NFC apparatus detects the NFC radio frequency field, the processor obtains information indicating a status of obtaining a fingerprint image, and determines whether the information indicating the status of obtaining the fingerprint image is a state in which no fingerprint image is obtained, where there is no fingerprint input if the information indicating the status of obtaining the fingerprint image is the state in which no fingerprint image is obtained, or there is the fingerprint input if the information indicating the status of obtaining the fingerprint image is not the state in which no fingerprint image is obtained, and the information indicating the status of obtaining the fingerprint image is the obtaining status of the fingerprint image or a fingerprint verification result.

In a possible implementation, that the processor is configured to: when the NFC apparatus detects an NFC radio frequency field of an NFC card reader, detect whether there is fingerprint input is as follows: when the NFC apparatus detects the NFC radio frequency field, the processor triggers a fingerprint module to collect the fingerprint image, and receives the information that is returned by the fingerprint module and that indicates the status of obtaining the fingerprint image.

In a possible implementation, the detecting whether there is fingerprint input is specifically as follows: the processor obtains a working status of a fingerprint sensor, and determines whether the working status of the fingerprint sensor is an idle state, where there is no fingerprint input if the working status of the fingerprint sensor is the idle state, or there is the fingerprint input if the working status of the fingerprint sensor is not the idle state.

According to a seventh aspect, a mobile device is provided, the mobile device includes a processor, a memory, and an NFC apparatus, and a first emulated card and a second emulated card are configured on the mobile device. The processor is configured to: when the NFC apparatus detects an NFC radio frequency field of an NFC card reader, detect whether a front side of the mobile device is close to the NFC card reader; the processor selects the first emulated card if the front side of the mobile device is close to the NFC card reader; or the processor selects the second emulated card if the front side of the mobile device is not close to the NFC card reader; and the NFC apparatus performs NFC interaction with the NFC card reader based on the first emulated card or the second emulated card selected by the processor.

In a possible implementation, the mobile device further includes an infrared ranging sensor, and the detecting whether a front side of the mobile device is close to the NFC card reader is specifically as follows: the processor is configured to: obtain a distance detected by the infrared ranging sensor, and determine, based on the distance according to a preset card swiping status identification rule, whether the front side of the mobile device is close to the NFC card reader.

In a possible implementation, the infrared ranging sensor is located on a rear side of the mobile device, and the preset card swiping status identification rule is as follows: the rear side of the mobile device is close to the NFC card reader if the distance detected by the infrared ranging sensor is less than a preset distance threshold, or the front side of the mobile device is close to the NFC card reader if the distance detected by the infrared ranging sensor is not less than the preset distance threshold; or the rear side of the mobile device is close to the NFC card reader if the distance detected by the infrared ranging sensor continuously decreases, or the front side of the mobile device is close to the NFC card reader if the distance detected by the infrared ranging sensor does not continuously decrease.

In a possible implementation, the infrared ranging sensor is located on the front side of the mobile device, and the preset card swiping status identification rule is correspondingly adjusted.

In a possible implementation, the mobile device further includes an ambient light sensor, and the detecting whether a front side of the mobile device is close to the NFC card reader is specifically as follows: the processor obtains ambient light intensity data detected by the ambient light sensor, and determines, based on the ambient light intensity data according to a preset card swiping status identification rule, whether the front side of the mobile device is close to the NFC card reader.

In a possible implementation, the ambient light sensor is disposed on the front side of the mobile device, and the preset card swiping status identification rule is specifically as follows: the front side of the mobile device is close to the NFC card reader if the ambient light intensity is less than a preset light intensity threshold, or a rear side of the mobile device is close to the NFC card reader if the ambient light intensity is not less than the preset light intensity threshold; or the front side of the mobile device is close to the NFC card reader if an attenuation amount of the ambient light intensity is greater than a preset attenuation amount threshold, or a rear side of the mobile device is close to the NFC card reader if an attenuation amount of the ambient light intensity is not less than the preset attenuation amount threshold; or the front side of the mobile device is close to the NFC card reader if an attenuation speed of the ambient light intensity is greater than a preset attenuation speed threshold, or a rear side of the mobile device is close to the NFC card reader if an attenuation speed of the ambient light intensity is not greater than the preset attenuation speed threshold.

In a possible implementation, the ambient light sensor is disposed on the rear side of the mobile device, and the preset card swiping status identification rule is correspondingly adjusted.

In a possible implementation, the mobile device further includes a camera, and the detecting whether a front side of the mobile device is close to the NFC card reader is specifically as follows: the processor obtains information collected by the camera, and determines whether there is a portrait in the information collected by the camera, to determine whether the front side of the mobile device is close to the NFC card reader.

In a possible implementation, the camera is a front-facing camera, and the detecting whether a front side of the mobile device is close to the NFC card reader is specifically as follows: the processor obtains information collected by the front-facing camera, and determines whether there is a portrait in the information collected by the front-facing camera, where a rear side of the mobile device is close to the NFC card reader if there is the portrait in the information collected by the front-facing camera, or the front side of the mobile device is close to the NFC card reader if there is no portrait in the information collected by the front-facing camera.

In a possible implementation, the camera is a rear-facing camera, and the preset card swiping status identification rule is correspondingly adjusted. In a possible implementation, the mobile device further includes a posture sensor, and the detecting whether a front side of the mobile device is close to the NFC card reader is specifically as follows: the processor obtains data of the posture sensor, and calculates an included angle between a facing direction of the front side of the mobile device and a positive direction of a first axis based on the data of the posture sensor, where the first axis is perpendicular to a horizontal plane, the positive direction of the first axis faces upward, and a rear side of the mobile device is close to the NFC card reader if the included angle is less than 90 degrees, or the front side of the mobile device is close to the NFC card reader if the included angle is not less than 90 degrees.

According to an eighth aspect, a mobile device is provided, the mobile device includes a processor, a memory, an NFC apparatus, and a fingerprint module, and a first emulated card and a second emulated card are configured on the mobile device. The processor is configured to: when the NFC apparatus detects an NFC radio frequency field of an NFC card reader, detect whether the mobile device is held by a right hand; the processor selects the first emulated card if the mobile device is held by the right hand; or the processor selects the second emulated card if the mobile device is not held by the right hand; and the NFC apparatus performs NFC interaction with the NFC card reader based on the first emulated card or the second emulated card selected by the processor.

In a possible implementation, the mobile device further includes a touchscreen, and the detecting whether the mobile device is held by a right hand is specifically as follows: the processor obtains sensing data of the touchscreen, and determines, based on the sensing data of the touchscreen, whether there is one touch area on a right side of the touchscreen and there are a plurality of touch areas on a left side of the touchscreen, where if there is one touch area on the right side of the touchscreen and there are the plurality of touch areas on the left side of the touchscreen, the mobile device is held by the right hand, or if there is not one touch area on the right side of the touchscreen or there are not the plurality of touch areas on the left side of the touchscreen, the mobile device is held by a left hand.

According to a ninth aspect, a mobile device is provided, the mobile device includes a processor, a memory, an NFC apparatus, and a fingerprint module, and a first emulated card and a second emulated card are configured on the mobile device. The processor is configured to: when the NFC apparatus detects an NFC radio frequency field of an NFC card reader, detect whether a display of the mobile device is on; the processor selects the first emulated card if the display is on; or the processor selects the second emulated card if the display is off; and the NFC apparatus performs NFC interaction with the NFC card reader based on the first emulated card or the second emulated card selected by the processor.

In a possible implementation, that the NFC apparatus detects the NFC radio frequency field of the NFC card reader is that the NFC apparatus detects that strength of the NFC radio frequency field of the NFC card reader exceeds a preset NFC radio frequency field strength threshold.

In a possible implementation, the mobile device further includes the display, and if the processor selects the first emulated card, before the NFC apparatus performs NFC interaction with the NFC card reader based on the selected first emulated card, when the display prompts a user with the first emulated card, the first emulated card is enlarged relative to the second emulated card for display.

In a possible implementation, the first emulated card or the second emulated card is one of a bank card, a bus card, and an entrance guard card, and the first emulated card is different from the second emulated card.

According to a tenth aspect, a mobile device is provided, the mobile device includes a processor, a memory, and an NFC apparatus, and a first emulated card, a second emulated card, a third emulated card, and a fourth emulated card are configured on the mobile device. The processor is configured to: when the NFC apparatus detects an NFC radio frequency field of an NFC card reader, detect whether a front side of the mobile device is close to the NFC card reader and whether there is fingerprint input; and select the first emulated card if there is the fingerprint input and the front side of the mobile device is close to the NFC card reader; or select the second emulated card if there is the fingerprint input and a rear side of the mobile device is close to the NFC card reader; or select the third emulated card if there is no fingerprint input and the front side of the mobile device is close to the NFC card reader; or select the fourth emulated card if there is no fingerprint input and a rear side of the mobile device is close to the NFC card reader. The NFC apparatus performs NFC interaction with the NFC card reader based on the first emulated card, the second emulated card, the third emulated card, or the fourth emulated card selected by the processor.

According to an eleventh aspect, an NFC apparatus is provided, the NFC apparatus is disposed on a mobile device, the NFC apparatus includes an NFC controller and an NFC radio frequency circuit, the mobile device includes a fingerprint sensor, and a first emulated card and a second emulated card are configured on the mobile device. The NFC controller is configured to: when detecting an NFC radio frequency field of an NFC card reader, detect whether there is fingerprint input; and select the first emulated card if there is the fingerprint input; or select the second emulated card if there is no fingerprint input. The NFC controller is configured to perform NFC interaction with the NFC card reader based on the selected first emulated card or second emulated card by using the NFC radio frequency circuit.

In a possible implementation, that the NFC controller is configured to: when detecting an NFC radio frequency field of an NFC card reader, detect whether there is fingerprint input is as follows: when detecting the NFC radio frequency field, the NFC controller obtains information indicating a status of obtaining a fingerprint image, and determines whether the information indicating the status of obtaining the fingerprint image is a state in which no fingerprint image is obtained, where there is no fingerprint input if the information indicating the status of obtaining the fingerprint image is the state in which no fingerprint image is obtained, or there is the fingerprint input if the information indicating the status of obtaining the fingerprint image is not the state in which no fingerprint image is obtained, and the information indicating the status of obtaining the fingerprint image is the obtaining status of the fingerprint image or a fingerprint verification result.

In a possible implementation, that the NFC controller is configured to: when detecting an NFC radio frequency field of an NFC card reader, detect whether there is fingerprint input is as follows: when detecting the NFC radio frequency field, the NFC controller triggers a fingerprint module to collect the fingerprint image, and receives the information that is returned by the fingerprint module and that indicates the status of obtaining the fingerprint image.

In a possible implementation, the detecting whether there is fingerprint input is specifically as follows: the NFC controller obtains a working status of a fingerprint sensor, and determines whether the working status of the fingerprint sensor is an idle state, where there is no fingerprint input if the working status of the fingerprint sensor is the idle state, or there is the fingerprint input if the working status of the fingerprint sensor is not the idle state.

According to a twelfth aspect, an NFC apparatus is provided, the NFC apparatus is disposed on a mobile device, the NFC apparatus includes an NFC controller and an NFC radio frequency circuit, and a first emulated card and a second emulated card are configured on the mobile device. The NFC controller is configured to: when detecting an NFC radio frequency field of an NFC card reader, detect whether a front side of the mobile device is close to the NFC card reader; the NFC controller selects the first emulated card if the front side of the mobile device is close to the NFC card reader; or the NFC controller selects the second emulated card if the front side of the mobile device is not close to the NFC card reader; and the NFC controller is configured to perform NFC interaction with the NFC card reader based on the selected first emulated card or second emulated card by using the NFC radio frequency circuit.

In a possible implementation, the mobile device further includes an infrared ranging sensor, and the detecting whether a front side of the mobile device is close to the NFC card reader is specifically as follows: the NFC controller is configured to: obtain a distance detected by the infrared ranging sensor, and determine, based on the distance according to a preset card swiping status identification rule, whether the front side of the mobile device is close to the NFC card reader.

In a possible implementation, the mobile device further includes an ambient light sensor, and the detecting whether a front side of the mobile device is close to the NFC card reader is specifically as follows: the NFC controller obtains ambient light intensity data detected by the ambient light sensor, and determines, based on the ambient light intensity data according to a preset card swiping status identification rule, whether the front side of the mobile device is close to the NFC card reader.

In a possible implementation, the mobile device further includes a camera, and the detecting whether a front side of the mobile device is close to the NFC card reader is specifically as follows: the NFC controller obtains information collected by the camera, and determines whether there is a portrait in the information collected by the camera, to determine whether the front side of the mobile device is close to the NFC card reader.

In a possible implementation, the mobile device further includes a posture sensor, and the detecting whether a front side of the mobile device is close to the NFC card reader is specifically as follows: the NFC controller obtains data of the posture sensor, and calculates an included angle between a facing direction of the front side of the mobile device and a positive direction of a first axis based on the data of the posture sensor, where the first axis is perpendicular to a horizontal plane, the positive direction of the first axis faces upward, and a rear side of the mobile device is close to the NFC card reader if the included angle is less than 90 degrees, or the front side of the mobile device is close to the NFC card reader if the included angle is not less than 90 degrees.

According to a thirteenth aspect, an NFC apparatus is provided, the NFC apparatus is disposed on a mobile device, the NFC apparatus includes an NFC controller and an NFC radio frequency circuit, and a first emulated card and a second emulated card are configured on the mobile device. The NFC controller is configured to: when detecting an NFC radio frequency field of an NFC card reader, detect whether the mobile device is held by a right hand; the NFC controller selects the first emulated card if the mobile device is held by the right hand; or the NFC controller selects the second emulated card if the mobile device is not held by the right hand; and the NFC controller is configured to perform NFC interaction with the NFC card reader based on the selected first emulated card or second emulated card by using the NFC radio frequency circuit.

According to a fourteenth aspect, an NFC apparatus is provided, the NFC apparatus is disposed on a mobile device, the NFC apparatus includes an NFC controller and an NFC radio frequency circuit, the mobile device includes a display, and a first emulated card and a second emulated card are configured on the mobile device. The NFC controller is configured to: when detecting an NFC radio frequency field of an NFC card reader, detect whether the display of the mobile device is on; the NFC controller selects the first emulated card if the display is on; or the NFC controller selects the second emulated card if the display is off; and the NFC controller is configured to perform NFC interaction with the NFC card reader based on the selected first emulated card or second emulated card by using the NFC radio frequency circuit.

In a possible implementation, that the NFC controller detects the NFC radio frequency field of the NFC card reader is that the NFC controller detects that strength of the NFC radio frequency field of the NFC card reader exceeds a preset NFC radio frequency field strength threshold.

In a possible implementation, the first emulated card or the second emulated card is one of a bank card, a bus card, and an entrance guard card, and the first emulated card is different from the second emulated card.

According to a fifteenth aspect, an NFC apparatus is provided, the NFC apparatus is disposed on a mobile device, the NFC apparatus includes an NFC controller and an NFC radio frequency circuit, and a first emulated card, a second emulated card, a third emulated card, and a fourth emulated card are configured on the mobile device. The NFC controller is configured to: when detecting an NFC radio frequency field of an NFC card reader, detect whether a front side of the mobile device is close to the NFC card reader and whether there is fingerprint input; and select the first emulated card if there is the fingerprint input and the front side of the mobile device is close to the NFC card reader; or select the second emulated card if there is the fingerprint input and a rear side of the mobile device is close to the NFC card reader; or select the third emulated card if there is no fingerprint input and the front side of the mobile device is close to the NFC card reader; or select the fourth emulated card if there is no fingerprint input and a rear side of the mobile device is close to the NFC card reader. The NFC controller is configured to perform NFC interaction with the NFC card reader based on the first emulated card, the second emulated card, the third emulated card, or the fourth emulated card by using the NFC radio frequency circuit.

According to a sixteenth aspect, a computer-readable storage medium is provided, and includes an instruction. When the instruction is run on a computer, the computer is enabled to perform the method according to any one of the first aspect to the fifth aspect.

According to a seventeenth aspect, a computer program product including an instruction is provided. When the computer program product is run on a computer, the computer is enabled to perform the method according to any one of the first aspect to the fifth aspect.

According to an eighteenth aspect, an emulated card selection method is provided, the method is implemented on a mobile device having an NFC function, a first emulated card and a second emulated card are configured on the mobile device, and the method includes: when detecting an NFC radio frequency field, obtaining, by the mobile device, information indicating a status of obtaining a fingerprint image; determining whether the information indicating the status of obtaining the fingerprint image is a state in which no fingerprint image is obtained; selecting the second emulated card if the information indicating the status of obtaining the fingerprint image is the state in which no fingerprint image is obtained; or selecting the first emulated card if the information indicating the status of obtaining the fingerprint image is not the state in which no fingerprint image is obtained, where the information indicating the status of obtaining the fingerprint image is the obtaining status of the fingerprint image or a fingerprint verification result; and performing, by the mobile device, NFC interaction with the NFC card reader based on the selected first emulated card or second emulated card.

According to an eighteenth aspect, an emulated card selection method is provided, the method is implemented on a mobile device having an NFC function, a first emulated card and a second emulated card are configured on the mobile device, and the method includes: when detecting an NFC radio frequency field, obtaining, by the mobile device, a working status of a fingerprint sensor; determining whether the working status of the fingerprint sensor is an idle state; selecting the second emulated card if the working status of the fingerprint sensor is the idle state; or selecting the first emulated card if the working status of the fingerprint sensor is not the idle state; and performing, by the mobile device, NFC interaction with the NFC card reader based on the selected first emulated card or second emulated card.

According to a nineteenth aspect, an emulated card selection method is provided, the method is implemented on a mobile device having an NFC function, a first emulated card and a second emulated card are configured on the mobile device, an infrared ranging sensor is disposed on a rear side of the mobile device, and the method includes: when detecting an NFC radio frequency field, obtaining, by the mobile device, a distance detected by the infrared ranging sensor; selecting the first emulated card if the distance detected by the infrared ranging sensor is less than a preset distance threshold; or selecting the second emulated card if the distance detected by the infrared ranging sensor is not less than the preset distance threshold; and performing, by the mobile device, NFC interaction with the NFC card reader based on the selected first emulated card or second emulated card.

According to a twentieth aspect, an emulated card selection method is provided, the method is implemented on a mobile device having an NFC function, a first emulated card and a second emulated card are configured on the mobile device, an ambient light sensor is disposed on a front side of the mobile device, and the method includes: when detecting an NFC radio frequency field, obtaining, by the mobile device, ambient light intensity data detected by the ambient light sensor; selecting the second emulated card if the ambient light intensity is less than a preset light intensity threshold; or selecting the first emulated card if the ambient light intensity is not less than the preset light intensity threshold; and performing, by the mobile device, NFC interaction with the NFC card reader based on the selected first emulated card or second emulated card.

According to the technical solutions provided in the embodiments of this application, the mobile device can be more intelligent when performing NFC payment, so that efficiency of the mobile device is improved, user operations are reduced, and user experience for NFC payment is improved.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in the embodiments may be combined in any proper manner. A person skilled in the art understands that an embodiment may be implemented without one or more specific technical features, technical solutions, or beneficial effects in a specific embodiment. In other embodiments, additional technical features and beneficial effects may further be identified in a specific embodiment that does not reflect all the embodiments.

DESCRIPTION OF EMBODIMENTS

Terms used in the description of the present invention in this specification are merely for the purpose of describing specific embodiments, and are not intended to limit the present invention. The terms "one", "a", "the", "the foregoing", and "this" of singular forms used in this specification and the appended claims of the present invention are also intended to include plural forms, unless otherwise specified in the context clearly. It should also be understood that, the term "and/or" used in this specification indicates and includes any or all possible combinations of one or more associated listed items.

A mobile device in the following embodiments may be various types of mobile communications devices having an NFC function, for example, may be a mobile phone 200 having an NFC function, or may be a tablet computer. A specific form of the mobile device is not particularly limited in the following embodiments.

Figure 1:
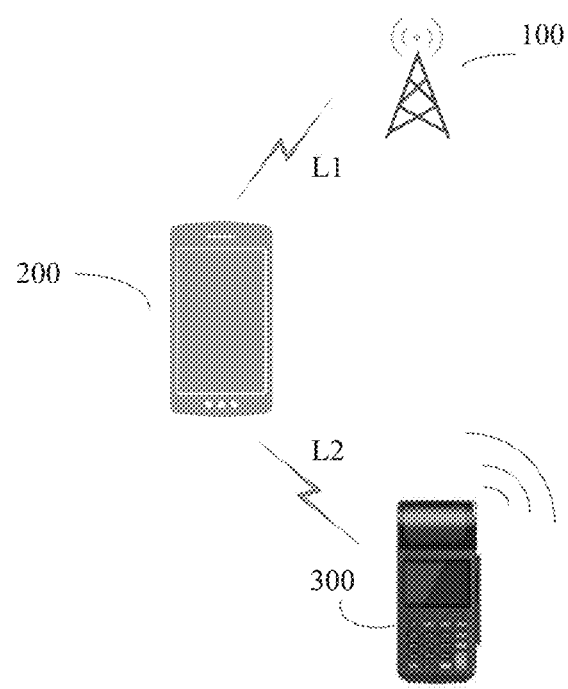
FIG. 1 is a schematic diagram of a network environment in which a mobile device (for example, a mobile phone) is located according to some embodiments.

As shown in FIG. 1, this embodiment provides a mobile phone 200 having an NFC function to perform wireless network communication. For example, the mobile phone 200 may send a wireless signal to a base station 100 by using a radio frequency circuit and an antenna of the mobile phone 200 through a wireless communication link L1, to request the base station 100 to perform a wireless network service to process a specific service requirement of the mobile phone 200. Because the mobile phone 200 may have the NFC function, the mobile phone 200 may perform NFC communication with an NFC card reader 300 (for example, a POS terminal having the NFC function) through a wireless communication link L2.

Figure 2:
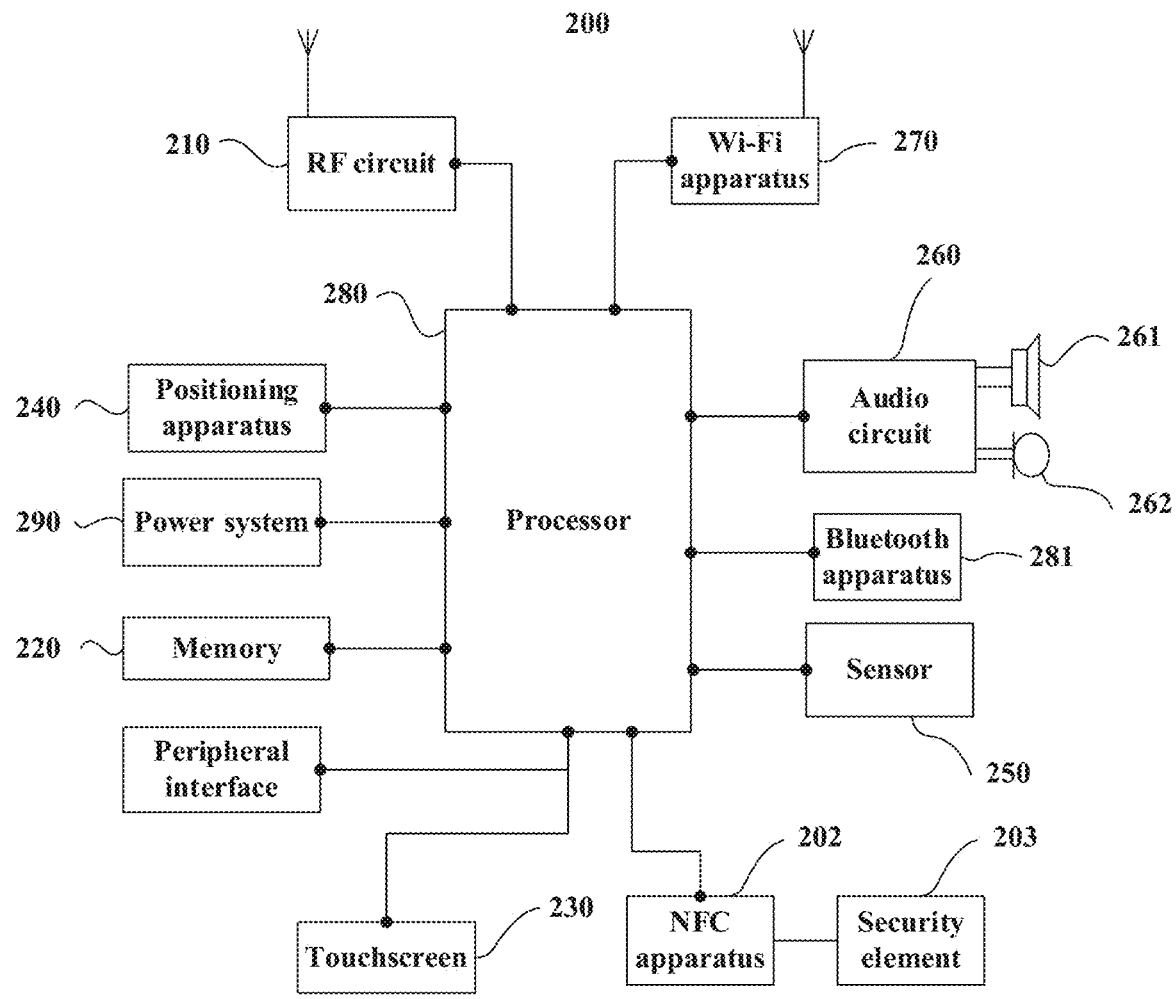
FIG. 2 is a schematic diagram of a hardware structure of a mobile phone according to some embodiments.

As shown in FIG. 2, a mobile device in this embodiment may be the mobile phone 200. The following specifically describes this embodiment by using the mobile phone 200 as an example. It should be understood that the mobile phone 200 shown in the figure is merely an example of the mobile device, and the mobile phone 200 may have more or fewer components than those shown in the figure, or may combine two or more components, or may have different component configurations. Various components shown in the figure may be implemented in hardware, software, or a combination of hardware and software that includes one or more signal processing and/or application-specific integrated circuits.

As shown in FIG. 2, the mobile phone 200 includes components such as an RF (Radio Frequency, radio frequency) circuit 210, a memory 220, a touchscreen 230, a positioning apparatus 240, an NFC apparatus 202, a sensor 250, an audio circuit 260, a Wi-Fi apparatus 270, a processor 280, and a power system 290. A person skilled in the art may understand that, a structure of the mobile phone shown in FIG. 2 does not constitute a limitation on the mobile phone. The mobile phone may include more or fewer components than those shown in the figure, or combine some components, or have different component arrangements.

The following describes the components of the mobile phone 200 in detail with reference to FIG. 2.

The RF circuit 210 may be configured to receive a signal and send a signal in an information sending and receiving process or a call process. Particularly, after receiving downlink data from a base station, the RF circuit 210 sends the downlink data to the processor 280 for processing, and sends related uplink data to the base station. Usually, the RF circuit includes but is not limited to an antenna, at least one amplifier, a transceiver, a coupler, a low noise amplifier, a duplexer, or the like. In addition, the RF circuit 210 may further communicate with another device through a wireless communications network. The wireless communications network may use any communications standard or protocol, including but not limited to a global system for mobile communications, a general packet radio service, code division multiple access, wideband code division multiple access, long term evolution, an email, an SMS message service, or the like.

The mobile phone 200 may further include at least one sensor 250, such as a light sensor, a posture sensor, and another sensor. Specifically, the light sensor may include an ambient light sensor and a proximity sensor. The ambient light sensor may adjust luminance of a display panel of the touchscreen 230 based on brightness of ambient light. The proximity sensor may power off the display panel when the mobile phone 200 moves to an ear. As one type of the posture sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between landscape mode and portrait mode, a related game, and magnetometer posture calibration), a function related to vibration recognition (such as a pedometer and a knock), and the like. Another sensor such as a gyroscope, a barometer, a hygrometer, a thermometer, or an infrared ranging sensor may be further configured in the mobile phone. Details are not described herein.

The audio circuit 260, a speaker 261, and a microphone 262 may provide an audio interface between a user and the mobile phone 200. The audio circuit 260 may convert received audio data into an electrical signal and transmit the electrical signal to the speaker 261. The speaker 261 converts the electrical signal into a sound signal for output. In addition, the microphone 262 converts a collected sound signal into an electrical signal. The audio circuit 260 receives the electrical signal, converts the electrical signal into audio data, and outputs the audio data to the RF circuit 210 to send the audio data to, for example, another mobile phone, or outputs the audio data to the memory 220 for further processing.

The processor 280 is a control center of the mobile phone 200, and is connected to various parts of the mobile phone by using various interfaces and lines. The processor 280 performs various functions and data processing of the mobile phone 200 by running or executing an application program stored in the memory 220 and invoking data stored in the memory 220, to perform overall monitoring on the mobile phone. In some embodiments, the processor 280 may include one or more processing units. An application processor and a modem processor may be further integrated into the processor 280. The application processor mainly processes an operating system, a user interface, an application program, and the like. The modem processor mainly processes wireless communication. It may be understood that, alternatively, the modem processor may not be integrated into the processor 280.

The mobile phone 200 further includes the power system 290 (including a battery and a power management chip) that supplies power to each component. The battery may be logically connected to the processor 280 by using the power management chip, to implement functions such as charging management, discharging management, and power consumption management by using the power system 290. Although not shown, the mobile phone 200 may further include a camera, a subscriber identity module (SIM) card slot, a peripheral interface (used to connect to another input/output device), and the like. Details are not described herein.

Figure 3:
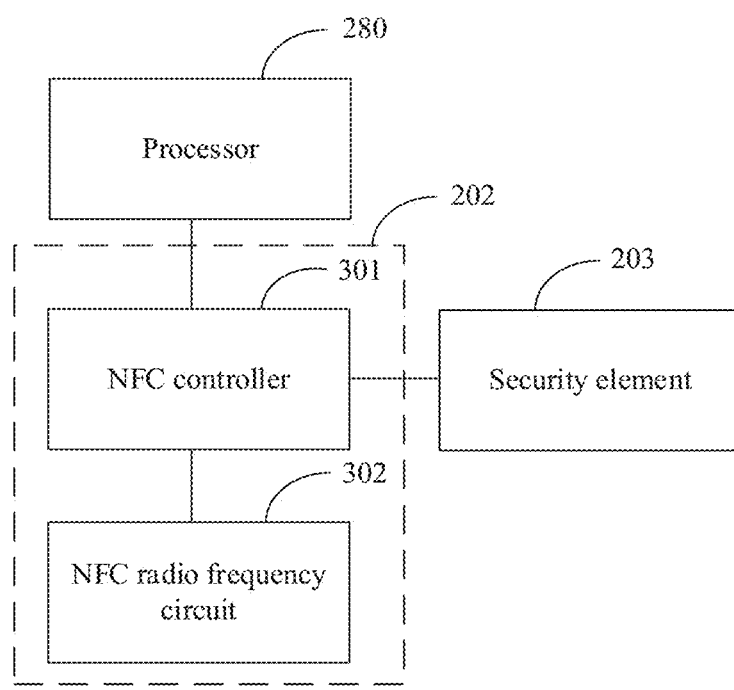
FIG. 3 is a schematic diagram of a function structure required by a mobile device having an NFC communication function according to some embodiments.

The NFC apparatus 202 is configured to provide an NFC function for the mobile phone 200. The NFC apparatus may have three application modes: a card reader mode, a point-to-point mode, and a card emulation mode. In some embodiments, a hardware structure of the NFC apparatus may be shown in FIG. 3. The NFC apparatus 202 may include an NFC controller (NFCC) 301 and an NFC radio frequency circuit 302. The NFC controller 301 is connected to the NFC radio frequency circuit 302, and is mainly configured to: modulate/demodulate a contactless communication signal, control input and output of data in the NFC apparatus, and exchange data with the processor 280. The NFC radio frequency circuit is connected to the NFC controller to implement sending and receiving of a 13.56 MHz radio frequency signal, and may include four parts: an EMC filter circuit, a matching circuit, a receiving circuit, and an NFC antenna.

The mobile phone 200 further includes a security element 203. Main functions of the security element are to implement secure storage of the application program and the data, and externally provide a secure computing service. The security element further communicates with an NFC card reader by using the NFC controller, to implement security of data storage and a transaction process. It should be noted that the security element 203 may be an anti-tampering component that is in the mobile device and that is configured to provide security and confidentiality and support various application environments. The security element 203 may have a plurality of shapes. For example, the security element 203 may be integrated into a universal integrated circuit card (UICC) such as a subscriber identity module SIM card, or integrated into an embedded security element (which is located on a circuit board of the mobile device), a secure digital (SD) card, a microSD card, or the like. In addition, the security element 203 may further include one or more application programs executed in an environment of the security element 203 (for example, in an operating system of the security element 203 or in a Java running environment running on the security element 203). In addition, the one or more application programs may include one or more payment application programs. The security element 203 supports secure transaction in the application program and secure data storage, and supports downloading, installation, deletion, update, and the like of a plurality of application programs. The security element 203 further supports secure isolation of application program data. For security, the security element may not allow free access between different application programs. The security element 203 further provides symmetric and asymmetric encryption algorithms and certificate capabilities required for various types of payment, provides a program interface for accessing a secure transaction application, and supports bidirectional communication with the NFC controller 301 or the processor 280.

In some other embodiments, the mobile device may alternatively have no security element 203, but an application program running on the processor of the mobile device or a server in a network completes a related function of the security element 203, to implement NFC payment. This manner avoids a hardware limitation that the mobile device needs to have the security element 203. This technology is referred to as a host-based card emulation (Host-based Card Emulation, HCE for short below) technology. For example, this technical solution is used for NFC payment such as Android Pay developed by Google.

The memory 220 is configured to store the application program and the data. The processor 280 performs various functions and data processing of the mobile phone 200 by running the application program and the data that are stored in the memory. The memory 220 mainly includes a program storage area and a data storage area. The program storage area may store an operating system, and an application program required by at least one function (for example, a sound playing function or an image playing function). The data storage area may store data (for example, audio data or a phone book) created based on use of the mobile phone. In addition, the memory may include a high-speed random access memory, and may further include a nonvolatile memory such as a magnetic disk storage device, a flash memory device, or another volatile solid-state storage device. The memory 220 may store an operating system that enables the mobile phone to run, for example, an IOS® operating system developed by Apple or an Android® operating system developed by Google.

The positioning apparatus 240 is configured to provide a geographic position for the mobile phone 200. It may be understood that the positioning apparatus 240 may be specifically a receiver of a positioning system such as a global positioning system (GPS), a BeiDou navigation satellite system, or a Russian GLONASS. After receiving the geographic position sent by the positioning system, the positioning apparatus 240 sends this information to the processor 280 for processing, or sends this information to the memory 220 for storage. In some other embodiments, the positioning apparatus 240 may alternatively be a receiver of an assisted global positioning system (AGPS). The AGPS runs in a manner in which GPS positioning is performed with specific assistance. By using a signal of a base station together with a GPS satellite signal, the AGPS can speed up positioning for the mobile phone 200. In the AGPS system, the positioning apparatus 240 may obtain positioning assistance through communication with an assisted positioning server (for example, a mobile phone positioning server). As an assisted server, the AGPS system assists the positioning apparatus 240 in completing ranging and positioning services. In this case, the assisted positioning server communicates with the mobile device (for example, the positioning apparatus 240 (namely, a GPS receiver) of the mobile phone 200) by using a wireless communications network, to provide positioning assistance. In some other embodiments, the positioning apparatus 240 may be alternatively a positioning technology based on a Wi-Fi access point. Each Wi-Fi access point has a globally unique MAC address, and the mobile device can scan and collect a broadcast signal of a surrounding Wi-Fi access point when Wi-Fi is enabled. Therefore, the mobile device can obtain a MAC address broadcast by the Wi-Fi access point. The mobile device sends such data (for example, the MAC address) that can identify the Wi-Fi access point to a location server by using a wireless communications network. The location server retrieves a geographic position of each Wi-Fi access point, calculates a geographic position of the mobile device with reference to strength of the Wi-Fi broadcast signal, and sends the geographic position of the mobile device to the positioning apparatus 240 of the mobile device.

The Wi-Fi apparatus 270 is configured to provide Wi-Fi network access for the mobile phone, to help a user receive/send an email, browse a web page, access streaming media, and so on. The Wi-Fi apparatus 270 provides wireless broadband internet access for the user. In some other embodiments, the Wi-Fi apparatus 270 may be alternatively used as a Wi-Fi access point to provide Wi-Fi network access for another mobile device. Bluetooth 280 is as follows: The mobile phone may exchange information with another electronic device (for example, a smartwatch) through Bluetooth.

The embodiments of this application are used to quickly select an emulated card based on a status of a mobile device, to reduce a complex operation that a user performs payment after manually opening a wallet application to select the emulated card.

The emulated card is a card application in which the mobile device interacts with a peer NFC card reader in a card emulation mode. The emulated card allows the mobile device to perform contactless mobile payment and the like by using an NFC technology.

In the embodiments of this application, which emulated card is to be selected may be determined based on the status of the mobile device, for example, a status about whether there is fingerprint input, a status about whether a front side of the mobile device is close to the NFC card reader, a status about whether a right hand holds the mobile device and approaches the NFC card reader, or a status about whether a screen is on.

A plurality of emulated cards may be configured on the mobile device. Any emulated card in the embodiments of this application may be one of a bank card, a bus card, or an entrance guard card. For example, a first emulated card is a bank card, and a second emulated card is a bus card, or a first emulated card is a bus card, and a second emulated card is an entrance guard card. Alternatively, a first emulated card is a bank card, and a second emulated card is an entrance guard card. Alternatively, a first emulated card is a first bank card such as a card of the Bank of China, and a second emulated card is a second bank card such as a card of the Industrial and Commercial Bank of China. Alternatively, a first emulated card is a first bus card such as a Shanghai bus card, and a second emulated card is a second bus card such as a Hangzhou bus card. Alternatively, a first emulated card is a first entrance guard card such as a company entrance guard card, and a second emulated card is a second entrance guard card such as a community entrance guard card. A person skilled in the art may understand that there may be another combination. For example, a third emulated card is one of a bank card, a bus card, and an entrance guard card.

The user may customize a card selection rule. For example, the first emulated card is selected when there is fingerprint input, or the second emulated card is selected when there is no fingerprint input. Alternatively, the first emulated card is selected when a rear side of the mobile device is close to the NFC card reader, but the second emulated card is selected when a front side of the mobile device is close to the NFC card reader. The card selection rule specified by the user is a condition customized by the user or a system default condition that can be changed by the user to select different emulated cards. The card selection rule may be a mapping relationship stored in a memory, or a user setting causes a change of a parameter in code.

For different card selection rules, the mobile device stores corresponding identification rules for identifying a card swiping status of the mobile device. The identification rule is a rule defined by a manufacturer of the mobile device for determining the card swiping status of the mobile device, and may be a mapping relationship stored in a memory or an algorithm process written in code. For example, the card selection rule is that the first emulated card is selected if there is fingerprint input, or the second emulated card is selected if there is no fingerprint input. The corresponding identification rule is an identification rule used to identify whether there is fingerprint input currently. Details may be as follows: If obtained information indicating a status of obtaining a fingerprint image is a state in which no fingerprint image is obtained, the mobile device determines, according to the identification rule, that there is no fingerprint input currently; or if obtained information indicating a status of obtaining a fingerprint image is not a state in which no fingerprint image is obtained, there is the fingerprint input. For another example, the card selection rule is that the first emulated card is selected if the rear side of the mobile device is close to the NFC card reader, or the second emulated card is selected if the front side of the mobile device is close to the NFC card reader. The corresponding identification rule may be that detection is performed by using an infrared ranging sensor in a rear part, and the rear side is close to the NFC card reader if a detected distance is less than a preset threshold, or the front side is close to the NFC card reader if a detected distance is not less than a preset threshold. Alternatively, the corresponding rule may be that detection is performed by using a front-facing camera, and the rear side is close to the NFC card reader if a portrait is detected, or the front side is close to the NFC card reader if no portrait is detected. It may be understood that there may be another identification rule when different sensors or components are used to determine the card swiping status of the mobile device.

Figure 4A:
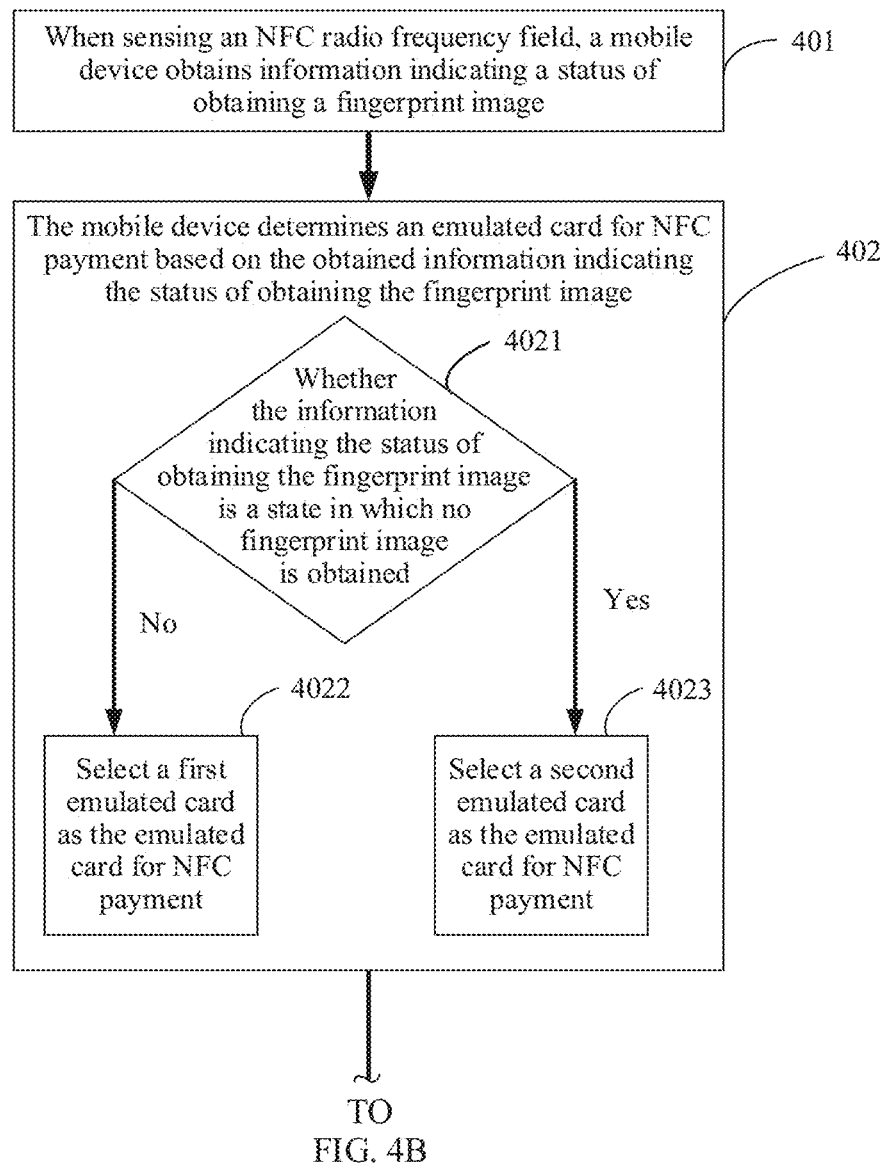
FIG. 4A and FIG. 4B are a schematic flowchart of an NFC-based interaction method according to some embodiments.
Figure 4B:
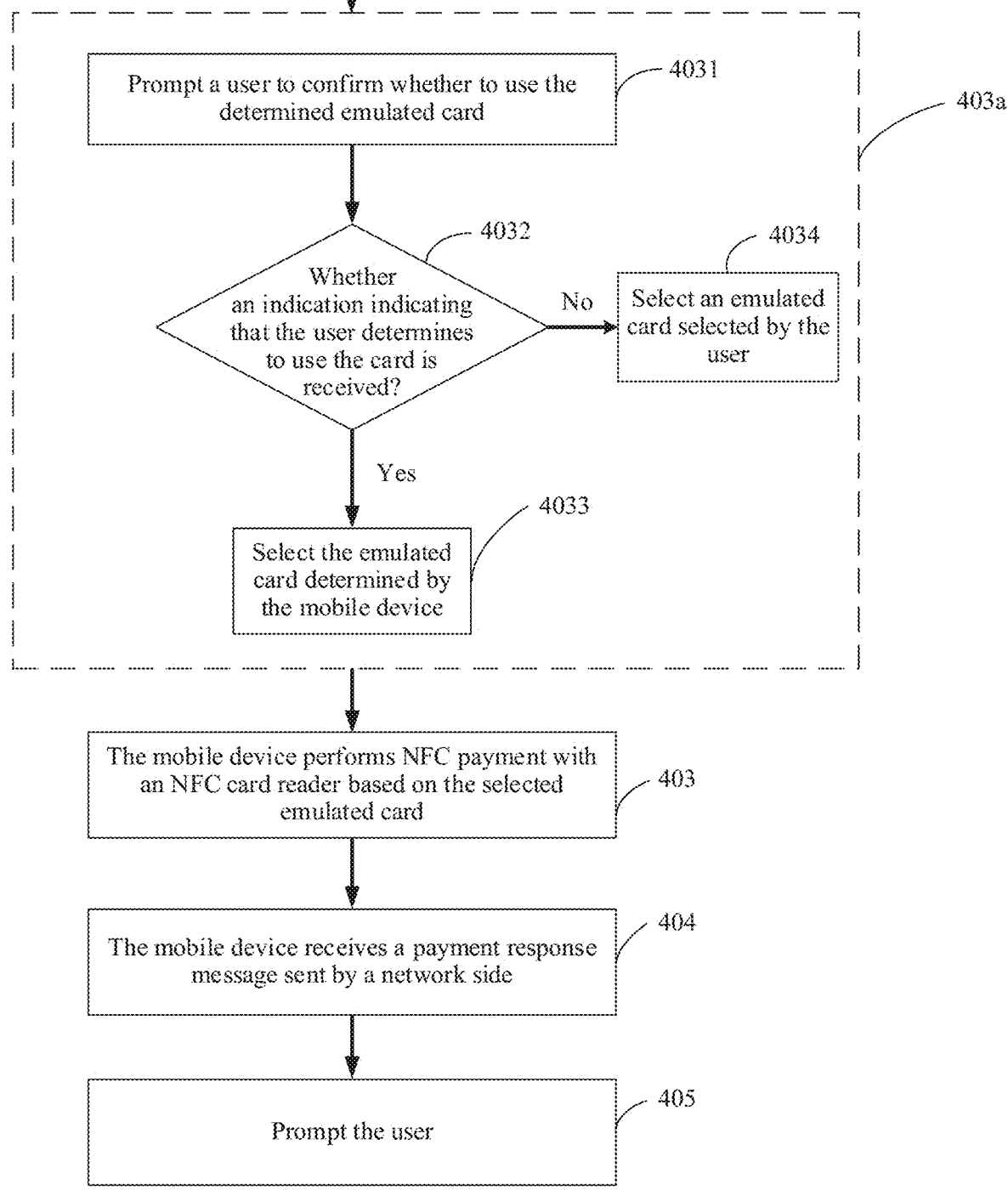

As shown in FIG. 4A and FIG. 4B, this embodiment provides an emulated card selection method. The method may be implemented on the foregoing mobile phone 200. In this embodiment, whether there is fingerprint input is determined to determine to use different emulated cards. That there is fingerprint input may also be understood as that it is detected that a user touches a fingerprint sensor. For example, a card selection rule specified by the user is that a first emulated card is selected when there is the fingerprint input, or a second emulated card is selected when there is no fingerprint input. A mobile device stores a corresponding identification rule for identifying a card swiping status of the mobile device. The identification rule is as follows: There is no fingerprint input if information indicating a status of obtaining a fingerprint image is a state in which no fingerprint image is obtained, or there is the fingerprint input if information indicating a status of obtaining a fingerprint image is not a state in which no fingerprint image is obtained. It may be understood that the identification rule is preset in the mobile device at delivery, and the identification rule usually cannot be changed by the user. A card swiping rule of the mobile device may be obtained according to the card selection rule specified by the user and the pre-stored identification rule, and is as follows: The first emulated card is selected when there is the information indicating the status of obtaining the fingerprint image, or the second emulated card is selected when there is no information indicating the status of obtaining the fingerprint image.

It may be understood that the card selection rule specified by the user is shown in Table 1.

TABLE 1

| Card selection condition | Card selection result |
| --- | --- |
| There is fingerprint input | First emulated card |
| There is no fingerprint input | Second emulated card |

The card swiping status identification rule stored by the mobile device is shown in Table 2.

TABLE 2

| State condition | State result |
| --- | --- |
| Information indicating a status of obtaining a fingerprint image is not a state in which no fingerprint image is obtained | There is fingerprint input |
| Information indicating a status of obtaining a fingerprint State condition image is a state in which no fingerprint image is obtained | There is no State result fingerprint input |

The card swiping rule of the mobile device is shown in Table 3.

TABLE 3

| State condition during current card swiping | Card selection result |
| --- | --- |
| Information indicating a status of obtaining a fingerprint image is not a state in which no fingerprint image is obtained | First emulated card |
| Information indicating a status of obtaining a fingerprint image is a state in which no fingerprint image is obtained | Second emulated card |

The method specifically includes the following steps.

Step 401: When sensing an NFC radio frequency field, the mobile device obtains the information indicating the status of obtaining the fingerprint image, where the information indicating the status of obtaining the fingerprint image indicates the obtaining status of the fingerprint image, and may be used to indicate whether there is fingerprint input.

The information indicating the status of obtaining the fingerprint image includes a state such as a state in which the fingerprint image is complete, a state in which the fingerprint image is incomplete, a state in which a fingerprint is entered too fast, or the state in which no fingerprint image is obtained. For details, refer to a fingerprint image obtaining status defined in https://developer.android.com/reference/android/hardware/fingerprint/FingerprintMan ager.html. It may be understood that, in addition to the fingerprint image obtaining status defined in this link, there may be another fingerprint image obtaining status, and extension may be performed based on an actual product requirement. The foregoing information may be obtained by using a fingerprint service or another specific interface in a system.

It may be understood that, in this case, an objective of obtaining the information indicating the status of obtaining the fingerprint image is to determine whether there is fingerprint input. Therefore, the information indicating the status of obtaining the fingerprint image may further include a fingerprint verification result. A verification result indicating that fingerprint verification succeeds or that fingerprint verification fails can indicate that there is the fingerprint input.

A fingerprint module includes the fingerprint sensor and a fingerprint image processing module. The fingerprint sensor is configured to collect the fingerprint image, the fingerprint image processing module is configured to process the fingerprint image, and the fingerprint image processing module returns the obtaining status of the fingerprint image.

When sensing the NFC radio frequency field, the mobile device may trigger an operation of obtaining the information indicating the status of obtaining the fingerprint image, trigger reading of the information that indicates the status of obtaining the fingerprint image and that is from the fingerprint sensor within a preset time period before the NFC radio frequency field is sensed, or trigger reading of the information that indicates the status of obtaining the fingerprint image and that is from the fingerprint sensor within a preset time period before the NFC radio frequency field is sensed and a preset time period after the NFC radio frequency field is sensed. Information that is beyond the preset time period and that indicates the status of obtaining the fingerprint image cannot be used for subsequent determining.

It may be understood that the operation of obtaining the information indicating the status of obtaining the fingerprint image may be as follows: When the NFC radio frequency field is detected, the fingerprint sensor is triggered to perform a fingerprint collection operation once, and then determining is performed based on data returned by the fingerprint module. Alternatively, the user has entered a fingerprint within a time before the NFC radio frequency field is detected, and when detecting the NFC radio frequency field, the mobile device reads data returned by the fingerprint module within a preset time before the NFC radio frequency field is detected.

Figure 5:
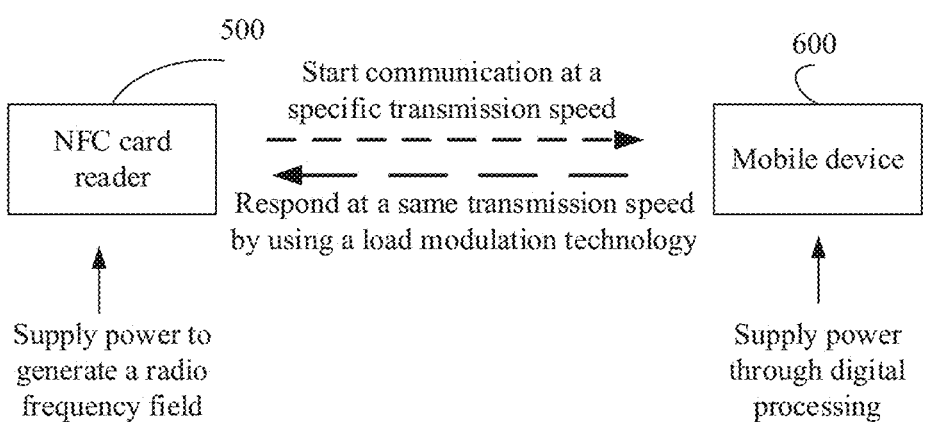
FIG. 5 is a schematic diagram of signaling interaction between an NFC card reader and a mobile device according to some embodiments.

As shown in FIG. 5, the NFC radio frequency field (RF field) is usually emitted by an NFC card reader, and one of 106 Kbit/s, 212 Kbit/s, and 424 Kbit/s may be selected as a transmission speed for communication with the mobile device. An NFC apparatus 202 of the mobile device may sense the radio frequency field emitted by the NFC card reader. Specifically, an NFC antenna (or a coil) of the mobile device 600 (for example, the mobile phone 200) is load of a transmit antenna (or a coil) of the NFC card reader. In this way, the mobile device changes parameters (such as resonance and detuning) of an antenna loop, to modulate the NFC card reader, so that the mobile device can transmit data back to the NFC card reader at a same speed. This implements data transmission from the mobile device to the NFC card reader by using weak energy. A data backhaul capability is achieved by using a load modulation technology, so that power consumption of the mobile device can be greatly reduced and a battery life can be prolonged.

It may be understood that, an operation of obtaining data from the fingerprint sensor is triggered only when the mobile device senses an NFC radio frequency field with sufficient strength, for example, when the strength of the sensed NFC radio frequency field reaches a predetermined radio frequency field strength threshold.

Figure 6:
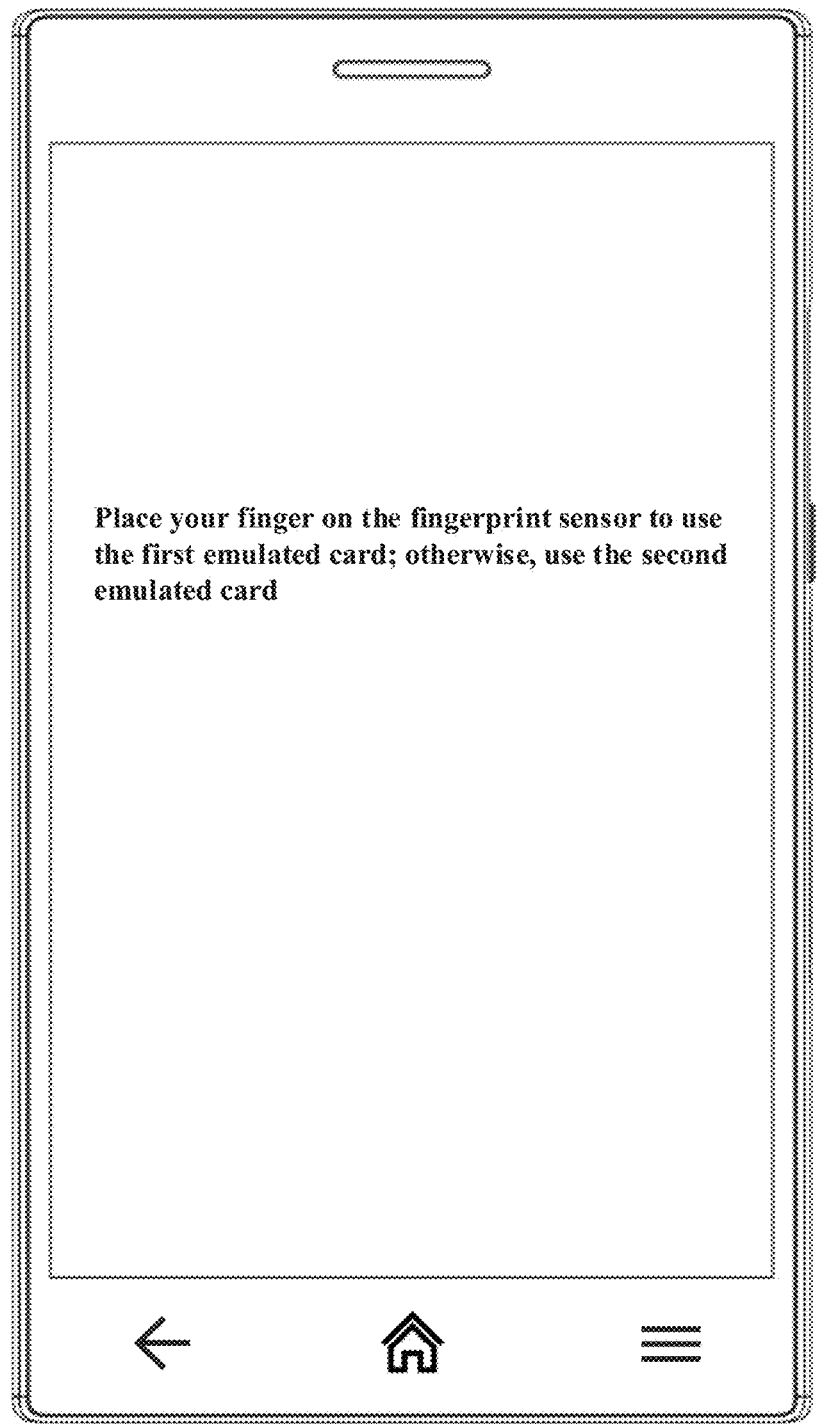
FIG. 6 is a schematic diagram of a user interface of prompt information of a mobile device according to some embodiments.

In an optional implementation, as shown in FIG. 6, after the NFC radio frequency field is detected and before the information indicating the status of obtaining the fingerprint image is obtained, a display screen of the mobile device may prompt the user with, for example, "Place your finger on the fingerprint sensor to use the first emulated card; otherwise, use the second emulated card", or may prompt the user in a sound manner. FIG. 6 shows an optional display screen. In actual product implementation, the screen may not be displayed, or a prompt is displayed when the user uses a quick payment function for the first several times, and no prompt is displayed in subsequent use.

Step 402: The mobile device determines an emulated card for NFC payment based on the obtained information indicating the status of obtaining the fingerprint image.

Specifically, step 402 includes step 4021: Determine whether the information indicating the status of obtaining the fingerprint image is the state in which no fingerprint image is obtained. If the information indicating the status of obtaining the fingerprint image is the state in which no fingerprint image is obtained, it indicates that there is no fingerprint input, and step 4023 is performed. If the information indicating the status of obtaining the fingerprint image is not the state in which no fingerprint image is obtained, it indicates that there is fingerprint input, and step 4022 is performed.

The state in which no fingerprint image is obtained indicates that the fingerprint sensor detects no fingerprint input. Another state such as a state in which the obtained fingerprint image is complete, a state in which the obtained fingerprint image is incomplete, or a state in which a fingerprint is entered too fast or a fingerprint verification result indicates that there is the fingerprint input.

For example, if the information indicating the status of obtaining the fingerprint image is FINGERPRINT_ACQUIRED_GOOD, it indicates that the obtained fingerprint image is complete, so as to indicate that there is the fingerprint input on the fingerprint sensor.

If the information indicating the status of obtaining the fingerprint image is FINGERPRINT_ACQUIRED_PARTIAL, it indicates that the obtained fingerprint image is only partial and incomplete. This also indicates that there is the fingerprint input on the fingerprint sensor.

If the information indicating the status of obtaining the fingerprint image is FINGERPRINT_ERROR_TIMEOUT, it indicates that fingerprint input times out. To be specific, the fingerprint sensor collects the fingerprint image within a specific time. In other words, it indicates that there is no fingerprint input.

Step 4022: Select the first emulated card as an emulated card for current NFC payment.

Step 4023: Select the second emulated card as an emulated card for current NFC payment.

Figure 7:
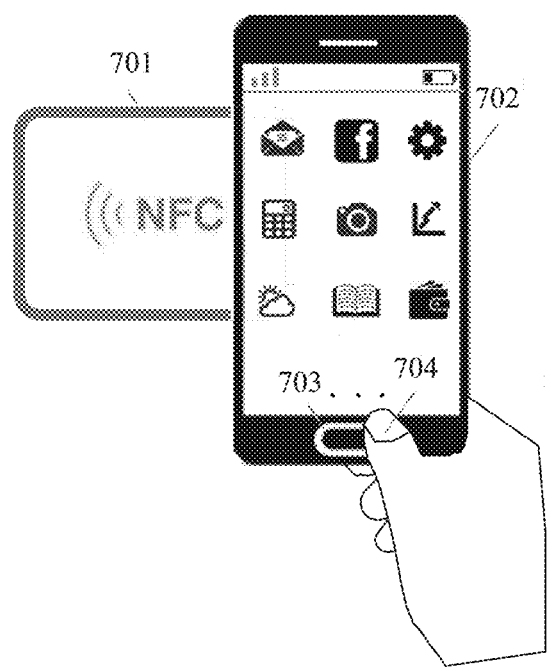
FIG. 7 is a schematic diagram of a scenario in which a mobile device performs NFC card swiping according to some embodiments.

As shown in FIG. 7, a fingerprint sensor 703 is disposed on a home button of a mobile device 702. When the mobile device 702 approaches an NFC card reader 701, if a finger 704 presses on the fingerprint sensor 703, a first emulated card is selected; or if no finger 704 touches the fingerprint sensor 703, a second emulated card is used.

For example, in the mobile device, the user presets that a credit card of the China Merchants Bank is selected when there is a fingerprint touch, or a Beijing bus card is selected when there is no fingerprint touch. When the NFC apparatus of the mobile device senses the NFC radio frequency field emitted by the NFC card reader, the mobile device obtains the information indicating the status of obtaining the fingerprint image. When the obtained information indicating the status of obtaining the fingerprint image indicates that there is fingerprint input, it may be determined that an emulated card to be used by the mobile device is the credit card of the China Merchants Bank. When the NFC apparatus of the mobile device senses the NFC radio frequency field emitted by the NFC card reader, the mobile device obtains the information indicating the status of obtaining the fingerprint image. When the obtained information indicating the status of obtaining the fingerprint image indicates that there is no fingerprint input, it is determined that a to-be-used NFC emulated card is the Beijing bus card.

It can be learned from the foregoing that the mobile device can determine, by detecting whether the user presses the fingerprint sensor, the emulated card that needs to be used to perform NFC payment. In this way, when the mobile device performs NFC payment, efficiency of the mobile device can be improved, user operations can be reduced, and user experience for NFC payment can be improved.

Step 403: The mobile device performs NFC payment with the NFC card reader based on the selected emulated card.

When the selected emulated card is a bank card, the fingerprint verification result obtained in step 401 may be used as an identity verification result of using the bank card this time, or the user may be required to enter a fingerprint again for fingerprint verification after the emulated card is selected.

It may be understood that, after the emulated card used for NFC payment is selected, a process of performing NFC payment is similar to an existing process in which a default emulated card is used for NFC payment or the user actively opens a wallet application and selects an emulated card for NFC payment.

In some embodiments, the mobile device determines the NFC emulated card, generates an emulated card selection instruction, and sends the emulated card selection instruction to an application program related to NFC payment in the mobile device, and then the application program selects the corresponding emulated card according to the emulated card selection instruction. Finally, the emulated card is used to communicate with the NFC card reader to perform NFC payment. Usually, the mobile device may transmit payment-related data back to the NFC card reader by using a load modulation technology. It may be understood that the mobile device may configure a routing entry of an NFCC based on the selected emulated card, and the NFCC routes, based on the configured routing entry, a subsequent service instruction to an NFC execution environment (NFCEE, NFC Execution Environment) in which a currently selected card application is located.

A process in which the mobile device determines the emulated card may be performed by a card selection module in the mobile device. The card selection module may be disposed in the NFC apparatus 202, and the NFCC runs the card selection module. Alternatively, the card selection module may be disposed in an operating system of the mobile device, and a processor of the mobile device runs the card selection module.

A correspondence between a card application and an NFCEE is preset in the card selection module. For example, a card application of the China Merchants Bank corresponds to a security element SE, a card application of the Bank of China corresponds to a security element SE, a bus card application corresponds to a TEE (Trust Execution Environment) trusted execution environment, and an entrance guard card application corresponds to an REE (Rich Execution Environment) rich execution environment. After the card selection module of the mobile device determines the emulated card, a corresponding NFCEE may be determined, and for example, may be a security element SE, a SIM. HCE, a TEE, or an REE. Then, the card selection module instructs the NFCC to send a subsequent service instruction to the corresponding NFCEE, and the NFCEE sends the service instruction to a corresponding card application (namely, the emulated card) based on a card application identifier (for example, an AID) in the service instruction, to implement payment.

In some other embodiments, after step 402 and before step 403, step 403a that may specifically prompt the user to perform confirmation includes the following steps.

Step 4031: The mobile device prompts the user to confirm whether to use the determined emulated card.

Figure 8:
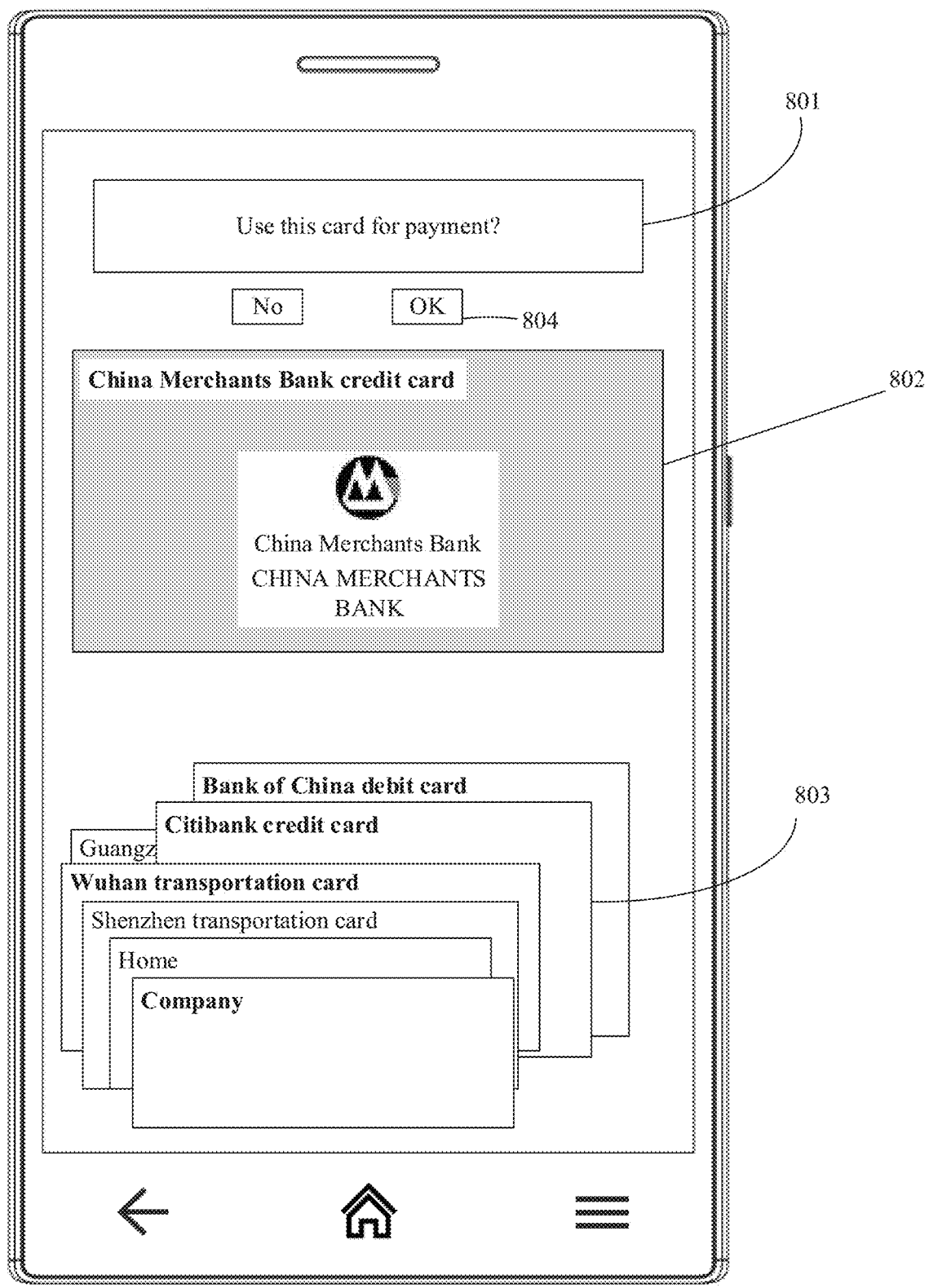
FIG. 8 is a schematic diagram of a user interface of prompting a user to confirm an emulated card on a mobile device according to some embodiments.

As shown in FIG. 8, the mobile device may prompt the user to confirm whether to use the emulated card. In FIG. 8, an enlarged emulated card icon 802 is displayed on a touchscreen of the mobile device, and the icon 802 indicates that the emulated card determined by the mobile device based on the information indicating the status of obtaining the fingerprint image is the credit card of the China Merchants Bank. In addition, other emulated cards in this application program are shrunk and stacked together, as shown by an icon 803. A prompt box 801 indicates that the mobile device requires the user to confirm whether to use the emulated card. When the user taps an icon 804, it indicates that the user agrees to select the emulated card automatically determined by the mobile device to perform NFC payment.

It may be understood that, in a process in which the user opens a wallet APP to select an emulated card, FIG. 8 is also displayed for the user for confirmation. The process in which the user opens the wallet APP to select the emulated card is simplified in this embodiment of this application, and the emulated card is directly selected for the user for confirmation by determining whether there is fingerprint input. Optionally, when determining to use a specific emulated card, the user may enter a card page of a corresponding wallet APP to perform fingerprint verification/card swiping. Usually, when card switching is performed on a card swiping screen of a wallet, only a card in the wallet can be switched. In this embodiment, the card selection module stores information about all cards on the terminal. One card may be preferentially enlarged, and the other cards on the device are all displayed. After switching to a specific card and confirming the card, the user enters a card swiping screen of a corresponding wallet.

Step 4032: The mobile device determines whether an indication indicating that the user determines to use the card is received. After the indication indicating that the user determines to use the card is received, step 4033 is performed; or after an indication indicating that the user determines not to use the card is received, step 4034 may be performed.

Step 4033: Select the emulated card determined by the mobile device, and perform step 403.

Step 4034: Select an emulated card selected by the user, and perform step 403.

A scenario in this embodiment is applicable to a case in which the mobile device determines the emulated card, but when prompting the user to perform further confirmation, receives the indication indicating that the user determines not to use the card, and then the user manually selects an emulated card for NFC payment. Certainly, in some other embodiments, after the mobile device receives the indication indicating that the user determines not to use the card, the user may not select another emulated card but abandon (terminate) NFC payment.

It may be understood that, in some embodiments, after determining the emulated card, the mobile device directly prompts the user with the emulated card used this time, but no longer prompts the user to perform further confirmation. For example, after determining the emulated card in a screen-off state, the mobile device may turn on the screen and prompt, on a lock screen, the user with the emulated card selected this time, or turn on the screen and prompt, in an unlocked state, the user with the emulated card used this time. Alternatively, after determining the emulated card, the mobile device does not prompt the user with the emulated card used this time, and does not prompt the user to perform further confirmation.

In some other embodiments, after step 403, the method may further include the following steps:

Step 404: The mobile device receives a payment response message sent by a network side, where the payment response message may be a message indicating that NFC payment succeeds, or may be a message indicating that NFC payment fails.

Step 405: The mobile device displays transaction information based on the payment response message.

When the payment response message indicates that NFC payment succeeds, the mobile device prompts, based on the message, the user that NFC payment succeeds. Otherwise, when the payment response message indicates that NFC payment fails, the mobile device prompts, based on the message, the user that NFC payment fails. There may be a plurality of prompt/reminder manners. For example, the touchscreen 230 is turned on and the message indicating that NFC payment succeeds or fails is displayed on the touchscreen 230 to prompt the user, or a related sound is played by using the speaker 261 to prompt the user, or a vibration is used to prompt the user, or all of the foregoing three manners may be used to prompt the user.

Figure 9:
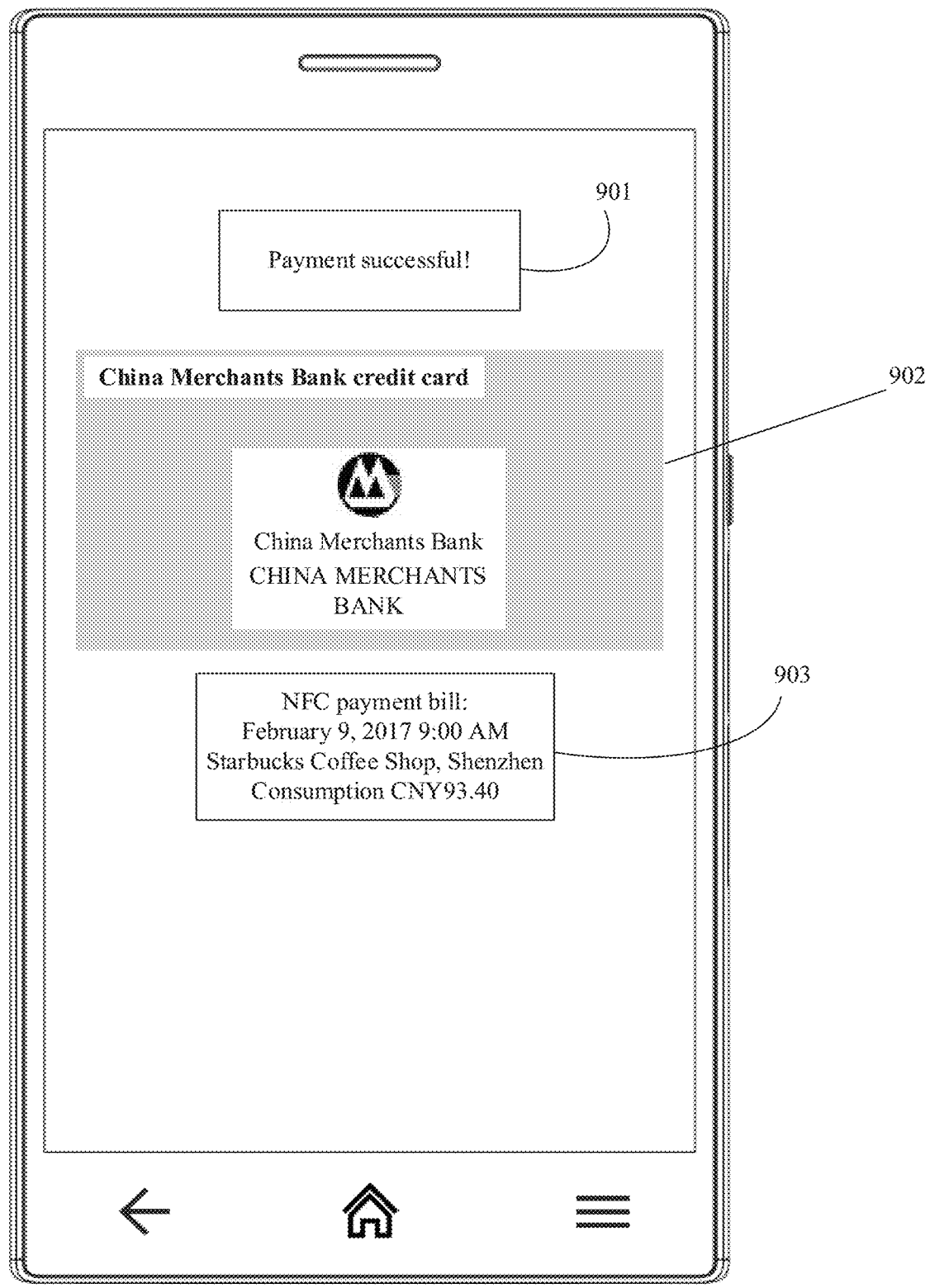
FIG. 9 is a schematic diagram of a user interface of prompting a user with an NFC payment result on a mobile device according to some embodiments.

As shown in FIG. 9, after NFC payment is completed by using the emulated card, a prompt box 901 may be displayed on the touchscreen 230 to indicate that the NFC payment succeeds, a prompt box 902 prompts that the payment is performed by using the credit card of the China Merchants Bank, and some NFC payment information, for example, a payment location (a Starbucks coffee shop in Shenzhen in the figure), a payment amount, and a payment time during NFC payment, existing when the NFC payment is performed by using the emulated card may be further displayed in a prompt box 903.

If the determined emulated card is an entrance guard card, step 403 to step 405 are a card swiping interaction process of the entrance guard card that is performed between the mobile device and the NFC card reader.

In some embodiments, corresponding to the card swiping rule based on whether there is fingerprint input, the card swiping status identification rule of the mobile device may be that whether there is fingerprint input is determined based on the information indicating the status of obtaining the fingerprint image. Details may be as follows: If the obtained information indicating the status of obtaining the fingerprint image is a state in which the fingerprint image is obtained, there is the fingerprint input; or if the obtained information indicating the status of obtaining the fingerprint image is not a state in which the fingerprint image is obtained, there is no fingerprint input. For example, after obtaining the information indicating the status of obtaining the fingerprint image, the mobile device may sequentially determine whether the information indicating the status of obtaining the fingerprint image is states in which the fingerprint image is obtained, for example, a state in which the fingerprint image is complete, a state in which the fingerprint image is incomplete, and a state in which a fingerprint is entered or moves too fast. If the information indicating the status of obtaining the fingerprint image is one of the states in which the fingerprint image is obtained, the mobile device determines that there is fingerprint input currently, or if the obtained information indicating the status of obtaining the fingerprint image is not any one of the states in which the fingerprint image is obtained, the mobile device determines that there is no fingerprint input currently.

In some embodiments, corresponding to the card swiping rule based on whether there is fingerprint input, the card swiping status identification rule of the mobile device may be alternatively that whether there is fingerprint input is determined based on a working status of the fingerprint sensor. Details may be as follows: If the working status of the fingerprint sensor is not an idle state, there is fingerprint input, or if the working status of the fingerprint sensor is an idle state, there is no fingerprint input. The working status of the fingerprint sensor may be a status of an HAL state machine of the fingerprint sensor. For details, refer to https://source.android.com/security/authentication/fingerprint-hal. The card swiping status identification rule of the mobile device may be as follows: When the status of the HAL state machine of the fingerprint sensor is an idle state, there is no fingerprint input, or when the status of the HAL state machine of the fingerprint sensor is not an idle state, there is fingerprint input.

Figure 10:
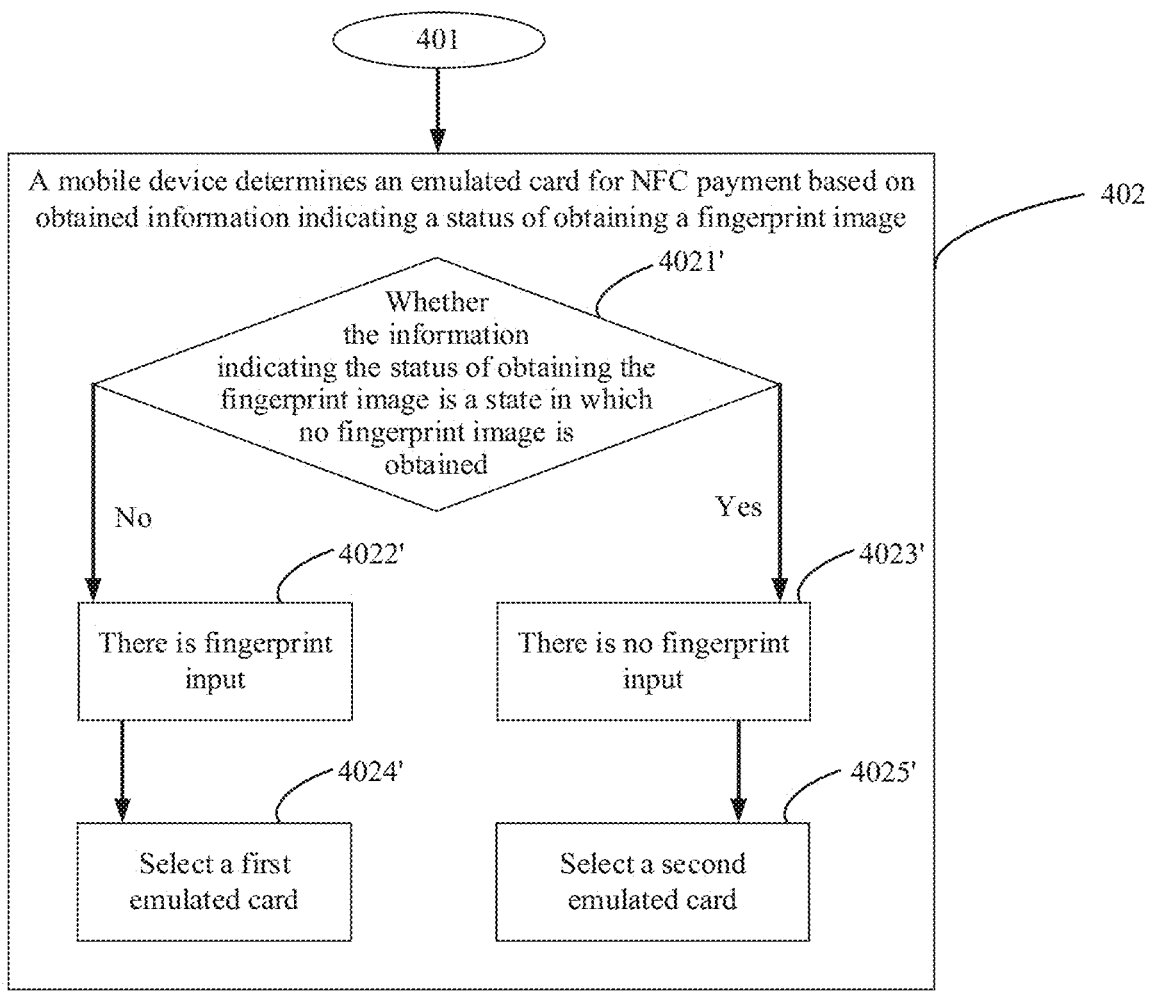
FIG. 10 is a schematic flowchart of step 402 according to some embodiments.

In the foregoing embodiment, the mobile device obtains the card swiping rule according to the card selection rule specified by the user and the card swiping status identification rule stored in the mobile device, and then performs step 402. In some embodiments, the mobile device may first identify a card swiping status of the mobile device according to the card swiping status identification rule stored in the mobile device, and then perform, based on the card swiping status, matching on the card selection rule specified by the user, to determine the emulated card for NFC payment. Specifically, as shown in FIG. 10, step 402 includes the following steps:

Step 4021': Determine whether the information indicating the status of obtaining the fingerprint image is the state in which no fingerprint image is obtained; and perform step 4022' if the information indicating the status of obtaining the fingerprint image is not the state in which no fingerprint image is obtained, or perform step 4023' if the information indicating the status of obtaining the fingerprint image is the state in which no fingerprint image is obtained.

Step 4022': Determine that there is fingerprint input, and continue to perform step 4024'.

Step 4023': Determine that there is no fingerprint input, and continue to perform step 4025'.

Step 4024': Select the first emulated card as an emulated card for current NFC payment.

Step 4025': Select the second emulated card as an emulated card for current NFC payment.

It may be understood that, in some other embodiments, to save power and further simplify an operation of the user, all the foregoing method steps may be performed when a power supply of the touchscreen of the mobile device is turned off.

An embodiment of this application provides another method, to select to use different emulated cards by detecting whether a front side or a rear side of a mobile device is close to an NFC card reader. The front side of the mobile device is usually a side with a display, and the rear side of the mobile device is usually a battery back cover of the mobile device. In this embodiment, for example, a card selection rule specified by a user is as follows: A first emulated card is selected when the rear side of the mobile device is close to the NFC card reader, or a second emulated card is selected when the front side of the mobile device is close to the NFC card reader. When detecting an NFC radio frequency field, the mobile device determines whether the front side or the rear side is close to the NFC card reader, and selects the second emulated card as an emulated card for current payment when detecting that the front side is close to the NFC card reader, or selects the first emulated card when detecting that the rear side is close to the NFC card reader. It may be understood that the card selection rule specified by the user may be changed based on a requirement of the user.

Figure 11:
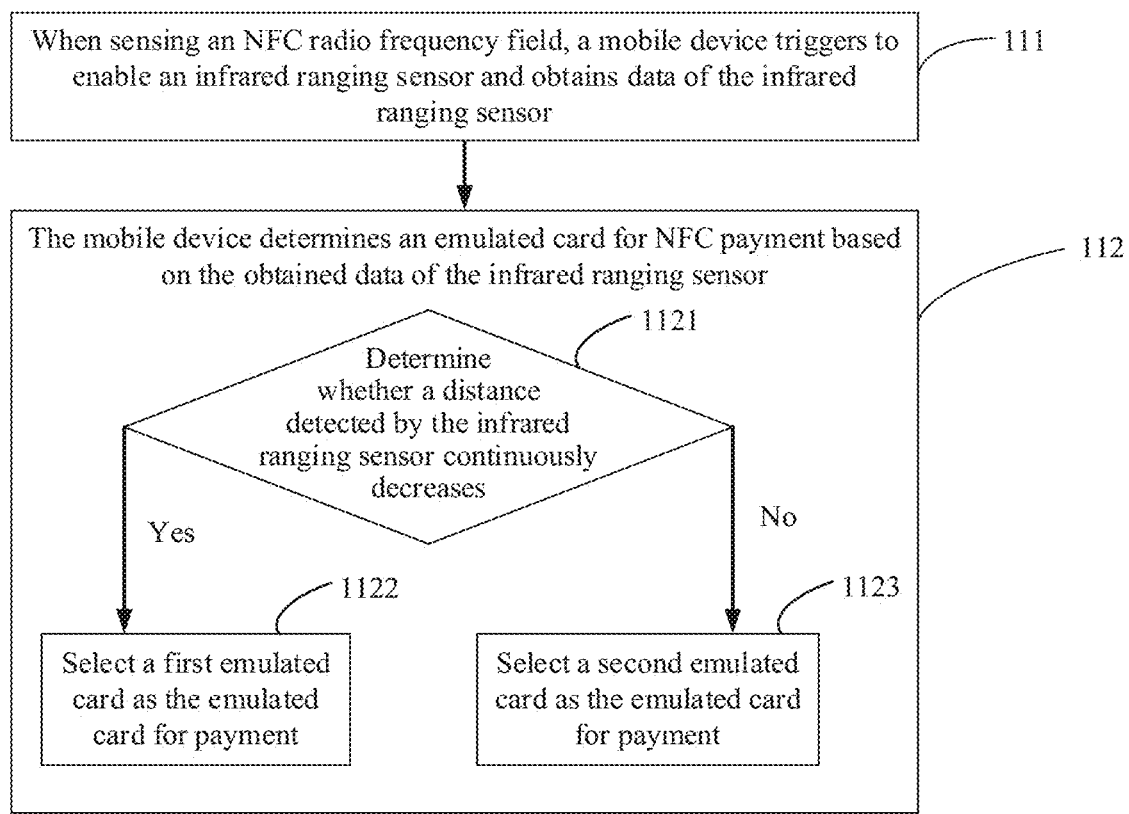
FIG. 11 is a schematic flowchart of a method for selecting an emulated card based on an infrared ranging sensor according to some embodiments.
Figure 12:
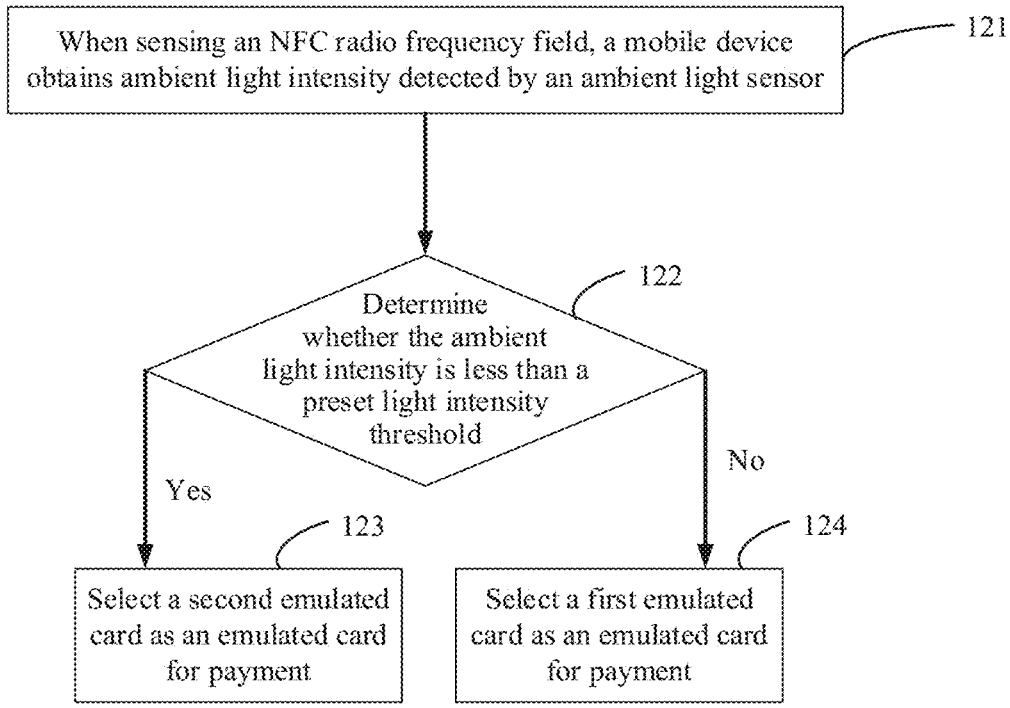
FIG. 12 is a schematic flowchart of a method for selecting an emulated card based on an ambient light sensor according to some embodiments.
Figure 13:
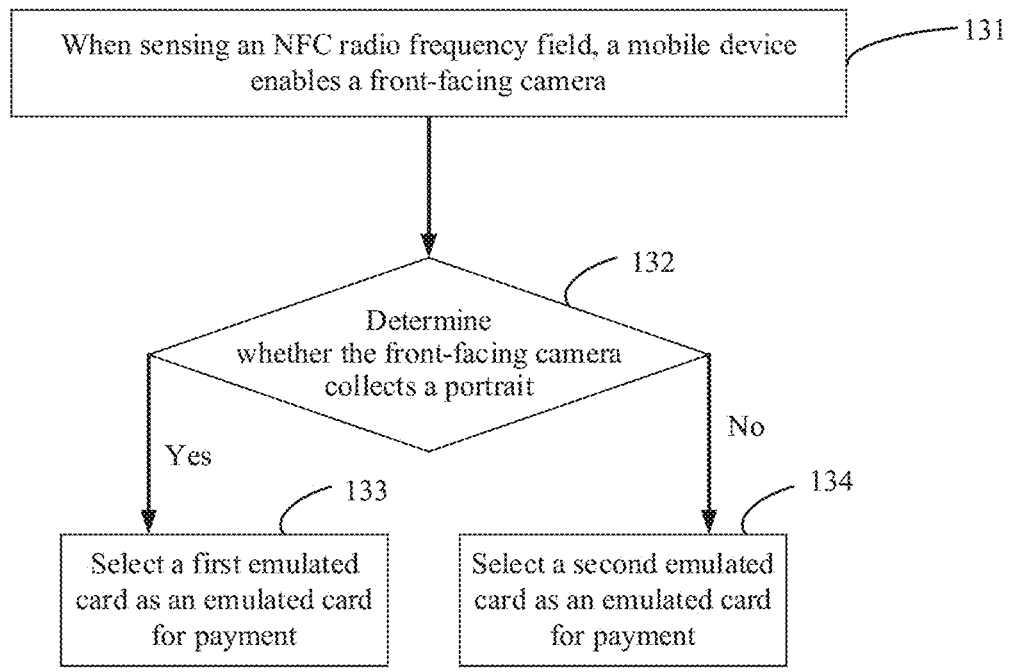
FIG. 13 is a schematic flowchart of a method for selecting an emulated card based on a camera according to some embodiments.
Figure 14:
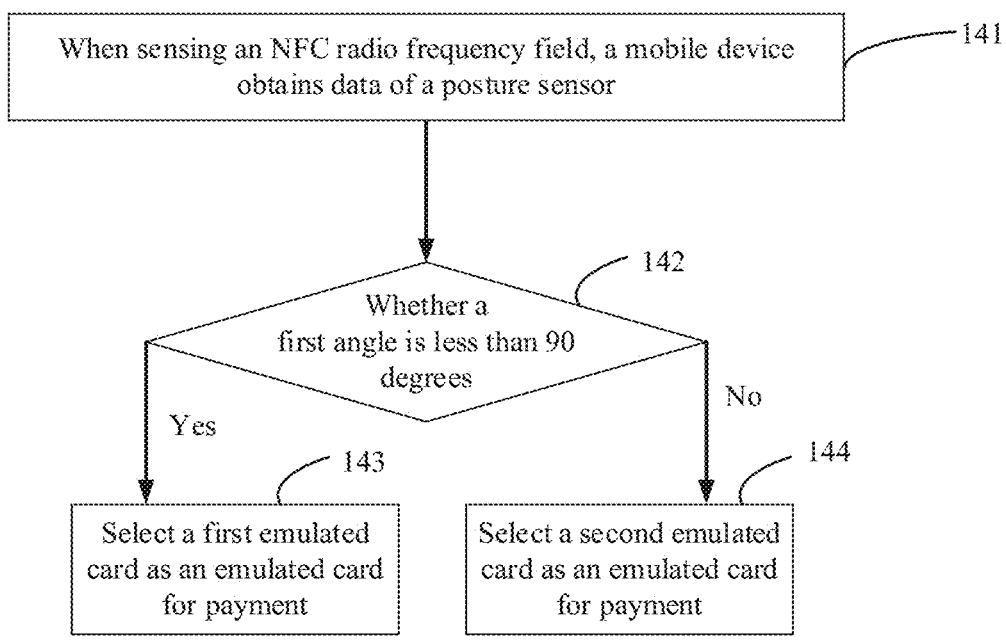
FIG. 14 is a schematic flowchart of a method for selecting an emulated card based on a posture sensor according to some embodiments.

Specifically, this embodiment of this application provides methods shown in FIG. 11, FIG. 12, FIG. 13, and FIG. 14, to select to use different emulated cards by detecting whether the front side or the rear side of the mobile device is close to the NFC card reader. All the methods shown in FIG. 11. FIG. 12, FIG. 13, and FIG. 14 use the example in which the pre-stored card selection rule specified by the user is that the first emulated card is selected when the rear side of the mobile device is close to the NFC card reader, or the second emulated card is selected when the front side of the mobile device is close to the NFC card reader.

As shown in FIG. 11, this embodiment provides an emulated card selection method. The method may be implemented on the foregoing mobile phone 200, and the mobile device has an infrared ranging sensor. It may be understood that the infrared ranging sensor may be disposed on a front side or a rear side of the mobile device. In this embodiment, an example in which the infrared ranging sensor is disposed on the rear side of the mobile device is used. The mobile device stores an identification rule for identifying a card swiping status of the mobile device. The identification rule is as follows: When a distance detected by the infrared ranging sensor continuously decreases, the rear side is close to an NFC card reader; or when a distance detected by the infrared ranging sensor does not continuously decrease, the front side is close to an NFC card reader. It may be understood that the identification rule is preset in the mobile device at delivery, and the identification rule usually cannot be changed by a user. A card swiping rule is obtained according to a card selection rule specified by the user and the identification rule for identifying a card swiping status. Specifically, when the distance detected by the infrared ranging sensor continuously decreases, a first emulated card is selected; or when the distance detected by the infrared ranging sensor does not continuously decrease, a second emulated card is selected.

The method specifically includes the following steps.

Step 111: When sensing an NFC radio frequency field, the mobile device obtains data of the infrared ranging sensor.

It may be understood that, that the mobile device senses the NFC radio frequency field is that the mobile device senses an NFC radio frequency field with sufficient strength, for example, the strength of the sensed NFC radio frequency field reaches a predetermined radio frequency field strength threshold.

It may be understood that, when sensing the NFC radio frequency field, the mobile device triggers the infrared ranging sensor to detect the distance, and obtains the distance detected by the infrared ranging sensor. After the mobile device triggers the infrared ranging sensor to work, the infrared ranging sensor may periodically work for a preset time to obtain a plurality of distance values. Alternatively, the infrared ranging sensor may always work. Distance data obtained by the infrared ranging sensor may be stored in a memory, and the memory may store distances in a time period. When sensing the NFC radio frequency field, the mobile device may obtain a plurality of distance values detected between a first time point before the NFC radio frequency field is sensed and a second time point after the NFC radio frequency field is sensed.

Step 112: The mobile device determines an emulated card for NFC payment based on the obtained data of the infrared ranging sensor.

Specifically, step 112 includes step 1121: Determine, based on the obtained data of the infrared ranging sensor, whether the distance detected by the infrared ranging sensor continuously decreases, and perform step 1122 if the distance continuously decreases, or perform step 1123 if the distance does not change, the distance continuously increases, or no valid data is collected. The infrared ranging sensor is disposed on the rear side of the mobile device. If the distance continuously decreases, it indicates that the rear side of the mobile device is close to the NFC card reader, or if the distance does not continuously decrease, it indicates that the front side of the mobile device is close to the card reader.

Step 1122: Select the first emulated card as an emulated card for current payment.

Step 1123: Select the second emulated card as an emulated card for current payment.

For a process after the emulated card for NFC payment/ NFC verification is determined, refer to step 403a to step 405. Details are not described herein again.

In some embodiments, the example in which the infrared ranging sensor is disposed on the rear side of the mobile device is still used. The identification rule for identifying a card swiping status may be as follows: When a distance detected by the infrared ranging sensor is less than a preset distance threshold, it is identified that the rear side of the mobile device is close to the NFC card reader; or when a distance detected by the infrared ranging sensor is not less than a preset distance threshold, the front side of the mobile device is close to the NFC card reader. Correspondingly, when detecting that strength of the radio frequency field exceeds a preset field strength threshold, the mobile device obtains data of the infrared sensor, and determines whether the distance detected by the infrared ranging sensor is less than the preset distance threshold. If the distance detected by the infrared ranging sensor is less than the preset distance threshold, it indicates that the mobile device is currently in a state in which the rear side of the mobile device is close to the NFC card reader, and the mobile device selects the first emulated card. If the distance detected by the infrared ranging sensor is not less than the preset distance threshold, it indicates that the mobile device is in a state in which the front side of the mobile device is close to the NFC card reader, and the mobile device selects the second emulated card.

In some embodiments, the infrared ranging sensor may be disposed on the front side of the mobile device, and the identification rule for identifying a card swiping status by the mobile device changes accordingly. For example, when a distance detected by the infrared ranging sensor is less than a preset distance threshold, the front side of the mobile device is close to the NFC card reader; or when a distance detected by the infrared ranging sensor is not less than a preset distance threshold, the rear side of the mobile device is close to the NFC card reader. Alternatively, if a distance detected by the infrared ranging sensor continuously decreases, the front side of the mobile device is close to the NFC card reader; or if a distance detected by the infrared ranging sensor does not continuously decrease, the rear side of the mobile device is close to the NFC card reader. It may be understood that the identification rule for identifying a card swiping status by the mobile device may be alternatively as follows: When a distance detected by the infrared ranging sensor is greater than a preset distance threshold, the rear side of the mobile device is close to the NFC card reader; or when a distance detected by the infrared ranging sensor is not greater than a preset distance threshold, the front side of the mobile device is close to the NFC card reader.

In some embodiments, the infrared ranging sensor may be replaced with an ambient light sensor.

FIG. 12 shows a procedure of a method in which an ambient light sensor is used to determine whether a front side or a rear side of a mobile device is close to an NFC card reader. The mobile device has the ambient light sensor, and the ambient light sensor may be disposed on the front side or the rear side of the mobile device. In this embodiment, an example in which the ambient light sensor is disposed on the front side of the mobile device is used. An identification rule that is stored in the mobile device and that is used to identify a card swiping status of the mobile device may be as follows: When ambient light intensity detected by the ambient light sensor is less than a preset light intensity threshold, the front side is close to the NFC card reader; or when ambient light intensity detected by the ambient light sensor is not less than a preset light intensity threshold, the rear side is close to the NFC card reader. A card swiping rule is obtained according to a card selection rule specified by a user and the identification rule for identifying a card swiping status. Specifically, when the ambient light intensity detected by the ambient light sensor is less than the preset light intensity threshold, a second emulated card is selected; or when the ambient light intensity detected by the ambient light sensor is not less than the preset light intensity threshold, a first emulated card is selected. The method includes the following steps.

Step 121: When sensing an NFC radio frequency field, the mobile device obtains data of the ambient light intensity detected by the ambient light sensor.

It may be understood that, that the mobile device senses the NFC radio frequency field is that the mobile device senses an NFC radio frequency field with sufficient strength, for example, the strength of the sensed NFC radio frequency field reaches a predetermined radio frequency field strength threshold.

Step 122: Determine whether the detected ambient light intensity is less than the preset light intensity threshold, and perform step 123 if the detected ambient light intensity is less than the preset light intensity threshold, or perform step 124 if the detected ambient light intensity is not less than the preset light intensity threshold.

If the ambient light intensity detected by the ambient light sensor is less than the preset light intensity threshold, it indicates that the front side of the mobile device is close to the NFC card reader; or if the ambient light intensity detected by the ambient light sensor is not less than the preset light intensity threshold, it indicates that the rear side of the mobile device is close to the NFC card reader.

Step 123: Select the second emulated card as an emulated card for current payment.

Step 124: Select the first emulated card as an emulated card for current payment.

For steps after the emulated card for NFC payment/NFC verification is determined, refer to step 403a to step 405. Details are not described herein again.

The ambient light sensor may work all the time, the ambient light intensity data obtained by the ambient light sensor may be stored in a memory, and the memory may store ambient light intensity data within a time period. When sensing the NFC radio frequency field, the mobile device may obtain an ambient light intensity change from a first time point before the NFC radio frequency field is sensed to a second time point after the NFC radio frequency field is sensed. The mobile device may determine, based on the obtained ambient light intensity change, whether the front side or the rear side of the mobile device is close to the NFC card reader. It may be understood that, in some embodiments, the identification rule that is stored in the mobile device and that is used to identify a card swiping status of the mobile device may be alternatively as follows: When it is determined that an ambient light intensity attenuation amount is greater than a preset light intensity attenuation threshold, the front side is close to the NFC card reader; or when it is determined that an ambient light intensity attenuation amount is not greater than a preset light intensity attenuation threshold, the rear side is close to the NFC card reader. The ambient light intensity attenuation amount is a difference between two pieces of obtained ambient light intensity, for example, a difference between ambient light intensity at a moment when the NFC radio frequency field is detected and ambient light intensity at an earlier preset time point. The identification rule that is stored in the mobile device and that is used to identify a card swiping status of the mobile device may be alternatively as follows: When it is determined that an ambient light intensity attenuation speed is greater than a preset light intensity attenuation speed, the front side is close to the NFC card reader; or when it is determined that an ambient light intensity attenuation speed is not greater than a preset light intensity attenuation speed, the rear side is close to the NFC card reader.

In some embodiments, the ambient light sensor may be disposed on the rear side of the mobile device, and the identification rule for identifying a card swiping status by the mobile device changes accordingly. For example, when ambient light intensity detected by the ambient light sensor is less than a preset light intensity threshold, the rear side of the mobile device is close to the NFC card reader; or when ambient light intensity detected by the ambient light sensor is not less than a preset light intensity threshold, the front side of the mobile device is close to the NFC card reader. Alternatively, when an ambient light intensity attenuation amount is greater than a preset threshold, the rear side is close to the NFC card reader; or when an ambient light intensity attenuation amount is not greater than a preset threshold, the front side is close to the NFC card reader. The ambient light intensity attenuation amount is a difference between two pieces of obtained ambient light intensity, for example, a difference between ambient light intensity at a moment when the NFC radio frequency field is detected and ambient light intensity at an earlier preset time point. The identification rule that is stored in the mobile device and that is used to identify a card swiping status of the mobile device may be alternatively as follows: When it is determined that an ambient light intensity attenuation speed is greater than a preset light intensity attenuation speed, the rear side is close to the NFC card reader; or when it is determined that an ambient light intensity attenuation speed is not greater than a preset light intensity attenuation speed, the front side is close to the NFC card reader.

In some embodiments, the infrared ranging sensor may be replaced with a camera. FIG. 13 shows a procedure of a method in which a camera is used to determine whether a front side or a rear side of a mobile device is close to an NFC card reader. In the method, a front-facing camera is used as an example. The front-facing camera is a camera disposed on the front side of the mobile device. An identification rule that is stored in the mobile device and that is used to identify a card swiping status of the mobile device may be as follows: When the front-facing camera detects a portrait, the rear side is close to the NFC card reader; or when the front-facing camera detects no portrait, the front side is close to the NFC card reader. A card swiping rule is obtained according to a card selection rule specified by a user and the identification rule for identifying a card swiping status. Specifically, when the front-facing camera detects a portrait, a first emulated card is selected; or when the front-facing camera detects no portrait, a second emulated card is selected. In this embodiment, detecting a portrait may be detecting a face, detecting an entire body, or detecting a partial body, such as a hand or an upper part of the body. It may be understood that detecting a collected image is detecting whether there is a person. The method includes the following steps.

Step 131: When sensing an NFC radio frequency field, the mobile device turns on the front-facing camera, and obtains information collected by the camera.

It may be understood that, that the mobile device senses the NFC radio frequency field is that the mobile device senses an NFC radio frequency field with sufficient strength, for example, the strength of the sensed NFC radio frequency field reaches a predetermined radio frequency field strength threshold.

Step 132: Determine, based on the information collected by the camera, whether the front-facing camera collects a portrait, and perform step 133 if the front-facing camera collects the portrait, or perform step 134 if the front-facing camera collects no portrait.

If the front-facing camera collects the portrait, it indicates that the rear side of the mobile device is close to the NFC card reader; or if the front-facing camera collects no portrait, it indicates that the front side of the mobile device is close to the NFC card reader.

Step 133: Select the first emulated card as an emulated card for payment.

Step 134: Select the second emulated card as an emulated card for payment.

For steps after the emulated card for NFC payment/NFC verification is determined, refer to step 403a to step 405. Details are not described herein again.

It may be understood that a rear-facing camera may be alternatively used for detection. The rear-facing camera is a camera disposed on the rear side of the mobile device. The identification rule for identifying a card swiping status by the mobile device changes accordingly. For example, if the rear-facing camera detects a portrait, it indicates that the front side of the mobile device is close to the NFC card reader; or if the rear-facing camera collects no portrait, it indicates that the rear side of the mobile device is close to the NFC card reader.

In some embodiments, the infrared ranging sensor may be replaced with a posture sensor. FIG. 14 shows a procedure of a method in which a posture sensor is used to determine whether a front side or a rear side of a mobile device is close to an NFC card reader. The mobile device stores an identification rule for identifying a card swiping status of the mobile device. The identification rule is as follows: When a first angle detected by the posture sensor is less than 90 degrees, the rear side is close to the NFC card reader; or when a first angle detected by the posture sensor is not less than 90 degrees, the front side is close to the NFC card reader. The first angle is an included angle between a facing direction (which is a vertical line perpendicular to the front side, and the direction is from the rear side of the mobile device to the front side) of the front side of the mobile device and a positive direction of the z-axis. An upward direction (for example, pointing to the sky) is the positive direction of the z-axis, and a horizontal plane is perpendicular to the z-axis. When a screen faces upward, an included angle of [0, 90) degrees exists between a plane (front side) of the screen of a mobile phone and the positive direction of the z-axis. When a screen faces downward, an included angle of [0, 90) degrees exists between a plane of the screen of a mobile phone and a negative direction of the z-axis. In other words, an included angle of (90, 180] degrees exists between the plane of the screen of the mobile phone and the positive direction of the z-axis.

The posture sensor is one or a combination of sensors for detecting a posture of the mobile device, for example, a gyroscope, an acceleration sensor, and a gravity sensor. A card swiping rule obtained according to a card selection rule and the identification rule is as follows: When the first angle detected by the posture sensor is less than 90 degrees, a first emulated card is selected; or when the first angle detected by the posture sensor is not less than 90 degrees, a second emulated card is selected. The method includes the following steps.

Step 141: When sensing an NFC radio frequency field, the mobile device obtains data of the posture sensor of the mobile device.

It may be understood that, that the mobile device senses the NFC radio frequency field is that the mobile device senses an NFC radio frequency field with sufficient strength, for example, the strength of the sensed NFC radio frequency field reaches a predetermined radio frequency field strength threshold.

Step 142: Determine whether the first angle detected by the posture sensor is less than 90 degrees, and perform step 143 if the first angle detected by the posture sensor is less than 90 degrees, or perform step 144 if the first angle detected by the posture sensor is not less than 90 degrees.

Figure 15A:
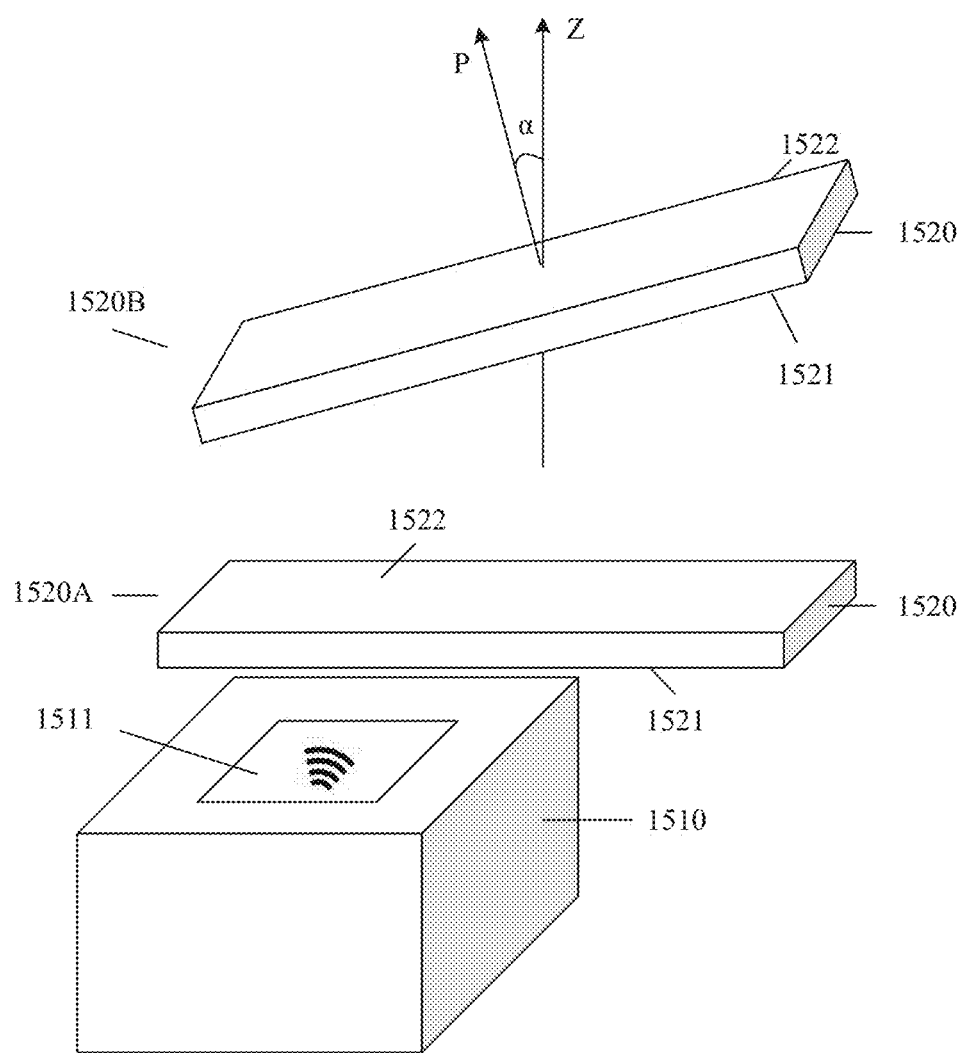
FIG. 15A to FIG. 15C are schematic diagrams of postures of performing NFC card swiping based on a mobile device according to some embodiments.
Figure 15B:
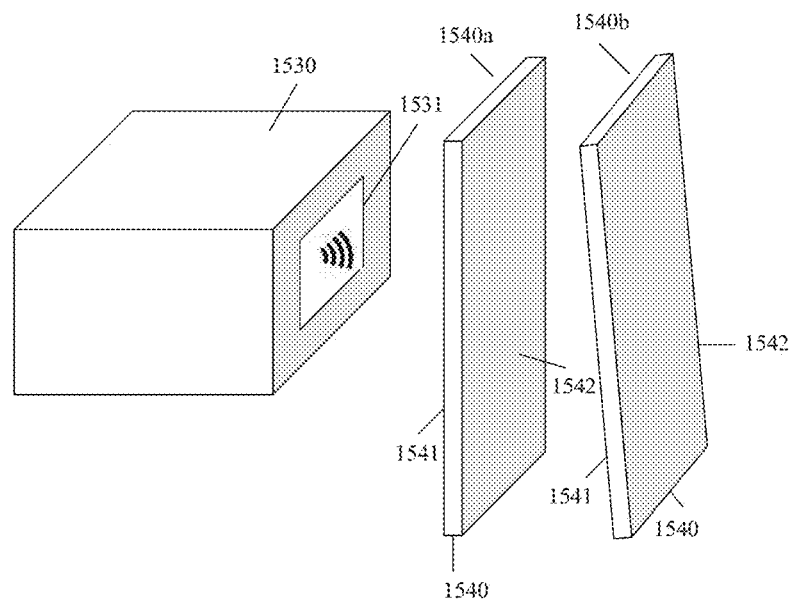
Figure 15C:
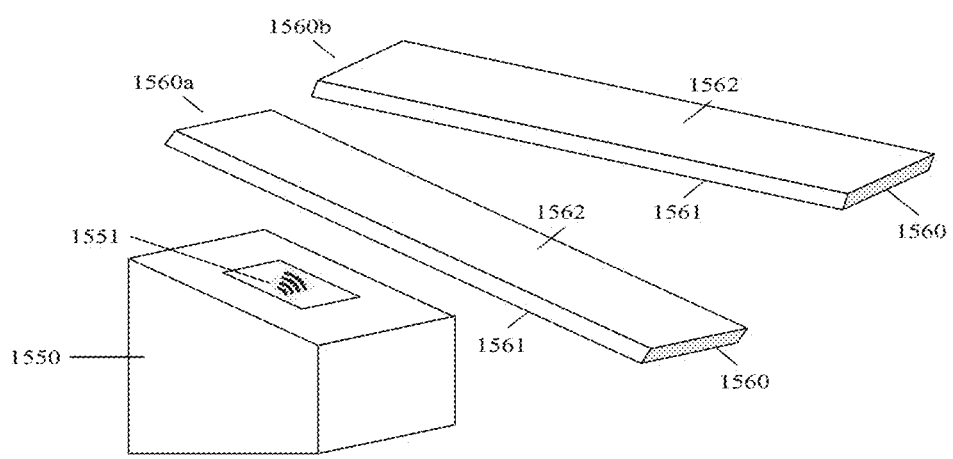

The posture sensor may calculate a posture of the mobile device. FIG. 15A to FIG. 15C show appearances of three common NFC card readers 1510, 1530, and 1550, and postures of the mobile device when the mobile device is close to the NFC card reader. Usually, an NFC antenna is close to a head of a mobile phone. Therefore, a user usually performs card swiping in a manner in which the head of the mobile phone is close to the NFC card reader. In FIG. 15A, a card reading area 1511 of the NFC card reader 1510 horizontally faces upward, and a mobile device 1520 has a first side 1521 and a second side 1522. The mobile device 1520 usually approaches the card reading area 1511 in a manner in which the mobile device 1520 is approximately parallel to a plane on which the card reading area 1511 is located, 1520. shows that the mobile device 1520 is parallel to the plane on which the card reading area 1511 is located, and 1520B shows that there is an included angle between the mobile device 1520 and the plane on which the card reading area 1511 is located. In FIG. 15B, a card reading area 1531 of the NFC card reader 1530 is vertically disposed, and a mobile device 1540 has a first side 1541 and a second side 1542. The mobile device 1540 usually approaches the card reading area 1531 in a manner in which the mobile device 1540 is approximately parallel to a plane on which the card reading area 1531 is located. 1540A shows that the mobile device 1540 is parallel to the plane on which the card reading area 1531 is located, and 1540B shows that there is an included angle between the mobile device 1540 and the plane on which the card reading area 1531 is located. In FIG. 15C, a card reading area 1551 of the NFC card reader 1550 is obliquely disposed, and a mobile device 1560 has a first side 1561 and a second side 1562. The mobile device 1560 usually approaches the card reading area 1551 in a manner in which the mobile device 1560 is approximately parallel to a plane on which the card reading area 1551 is located. 1560A shows that the mobile device 1560 is parallel to the plane on which the card reading area 1551 is located, and 1560B shows that there is an included angle between the mobile device 1560 and the plane on which the card reading area 1551 is located. The first side and the second side of the mobile device in FIG. 15A to FIG. 15C may be respectively a front side and a rear side of the mobile device, or a rear side and a front side of the mobile device. The posture sensor may detect the posture of the mobile device. For example, the front side faces upward, the front side faces downward, or a direction angle of the mobile device is detected. By using the posture of the mobile device, the mobile device may determine whether the front side or the rear side of the mobile device is close to the NFC card reader. FIG. 15A or FIG. 15C is used as an example. If the posture sensor detects that the front side of the mobile device faces upward, it may be determined that the rear side of the mobile device is close to the NFC card reader; or if the posture sensor detects that the front side of the mobile device faces downward, it may be determined that the front side of the mobile device is close to the NFC card reader. In a case in FIG. 15B, the mobile phone usually approaches the NFC card reader at a head part, and a user usually moves the mobile phone close to the NFC card reader in the posture 1540*b*. 1540*a* is usually a transient process. Therefore, the mobile device can also detect a current posture of the mobile device by using the posture sensor.

The posture 1520*b* in FIG. 15A is used as an example. For example, 1522 is the front side of the mobile device. A P direction is perpendicular to the side 1522, and points from the rear side of the mobile device to the front side of the mobile device. Therefore, whether the front side or the rear side of the mobile device is close to the NFC card reader may be identified by determining the included angle between the facing direction of the front side of the mobile device and the positive direction of the z-axis.

Step 143: Select the first emulated card as an emulated card for payment.

Step 144: Select the second emulated card as an emulated card for payment.

For steps after the emulated card for NFC payment/NFC verification is determined, refer to step 403*a* to step 405. Details are not described herein again.

It may be understood that the processes of detecting a card swiping status of the mobile device that are shown in FIG. 11, FIG. 12, FIG. 13, and FIG. 14 may be used in combination. For example, the posture sensor and the infrared ranging sensor are used in combination to determine the card swiping status of the mobile device, to improve determining accuracy.

In some embodiments, the mobile device may first identify, according to the card swiping status identification rule stored in the mobile device, whether the card swiping status of the mobile device is that the front side is close to the NFC card reader or that the rear side is close to the NFC card reader, and then perform, based on the card swiping status, matching on the card selection rule specified by the user, to determine the emulated card for NFC payment. Details are not described herein.

Figure 16A:
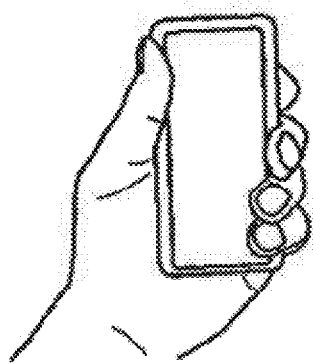
FIG. 16A and FIG. 16B are a schematic diagram of holding a mobile device with a left hand and holding a mobile device with a right hand according to some embodiments.
Figure 16B:
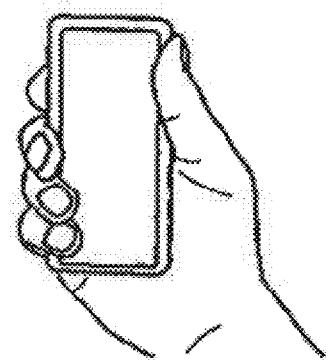

An embodiment of this application provides another method, to select to use different emulated cards by detecting whether a mobile device is held by a right hand or held by a left hand to be close to an NFC card reader. A relatively common placement manner of the mobile device in use is used as a reference placement manner. A side facing a user is a "front side", and a side back to the user is a "rear side". The front side of the mobile device is usually a side with a display, and the rear side of the mobile device is usually a battery back cover of the mobile device. FIG. 16A shows a state in which the mobile device is held by the left hand. The user holds the mobile device by the left hand, so that the front side of the mobile device faces the user. FIG. 16B shows that the mobile device is held by the right hand. The user holds the mobile device by the right hand, so that the front side of the mobile device faces the user.

Figure 17:
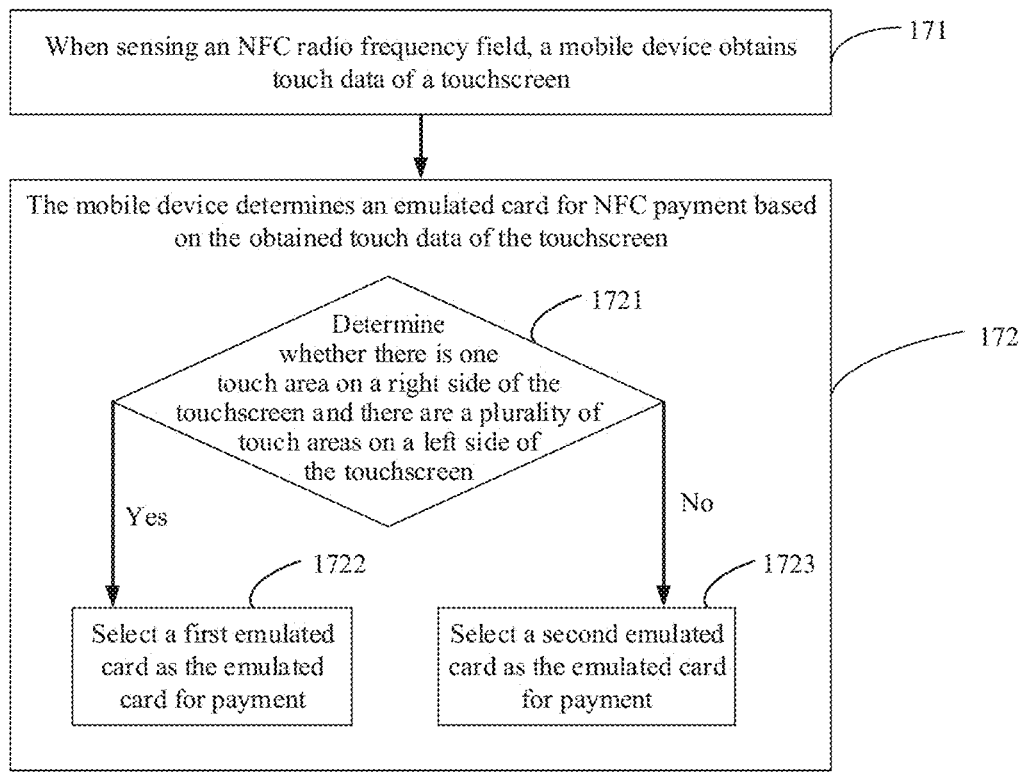
FIG. 17 is a schematic flowchart of a method for selecting an emulated card based on a touchscreen according to some embodiments.

As shown in FIG. 17, this embodiment provides an emulated card selection method. The method may be implemented on the foregoing mobile phone 200. For example, a card selection rule specified by a user is as follows: A first emulated card is selected when a mobile device is close to an NFC card reader and is held by a right hand, or a second emulated card is selected when a mobile device is close to an NFC card reader and is held by a left hand. A corresponding identification rule that is stored in the mobile device and that is used to identify a card swiping status of the mobile device may be as follows: When sensing data of a touchscreen displays that sensing areas on the touchscreen are one touch area on a right side of the touchscreen and a plurality of touch areas on a left side of the touchscreen, the mobile device is held by the right hand; or when sensing data of a touchscreen displays that sensing areas on the touchscreen are one touch area on a left side of the touchscreen and a plurality of touch areas on a right side of the touchscreen, the mobile device is held by the left hand. A card swiping rule obtained according to the card selection rule and the identification rule is as follows: The first emulated card is selected when the sensing data of the touchscreen displays that the sensing areas on the touchscreen are one touch area on the right side of the touchscreen and a plurality of touch areas on the left side of the touchscreen, or the second emulated card is selected when the sensing data of the touchscreen displays that the sensing areas on the touchscreen are one touch area on the left side of the touchscreen and a plurality of touch areas on the right side of the touchscreen. The method specifically includes the following steps.

Step 171: When sensing an NFC radio frequency field, the mobile device obtains touch data of the touchscreen.

It may be understood that, that the mobile device senses the NFC radio frequency field is that the mobile device senses an NFC radio frequency field with sufficient strength, for example, the strength of the sensed NFC radio frequency field reaches a predetermined radio frequency field strength threshold.

Step 172: The mobile device determines an emulated card for NFC payment based on the obtained touch data of the touchscreen.

Specifically, step 172 includes step 1721: Identify, based on the touch data, whether there is one touch area on the right side of the touchscreen and there are a plurality of touch areas on the left side of the touchscreen, and perform step 1722 if there is one touch area on the right side of the touchscreen and there are the plurality of touch areas on the left side of the touchscreen, or perform step 1723 if there is not one touch area on the right side of the touchscreen or there are not the plurality of touch areas on the left side of the touchscreen. Usually, the user holds the mobile device with a single hand. A common holding posture is that a thumb presses the screen, a part between the thumb and a forefinger on the hand touches or approaches an edge of the screen, and four fingers press or approach the screen on the opposite edge of the screen, or four fingers press a rear side of the screen. Pressing of only the thumb can be detected on a front side of the screen. A palm part close to the thumb presses or approaches the screen. Therefore, it may be identified, based on the touch data on the touchscreen, whether the mobile device is held by the left hand or the right hand.

Step 1722: Select the first emulated card as an emulated card for payment.

Step 1723: Select the second emulated card as an emulated card for payment.

For a process after the emulated card for NFC payment/NFC verification is determined, refer to step 403a to step 405. Details are not described herein again.

It may be understood that, the mobile device may alternatively determine a thumb inclination based on the touch data, to identify whether the mobile device is held by the left hand or the right hand. Alternatively, a capacitive sensor may be disposed on a side frame of the mobile device, and whether the mobile device is held by the left hand or the right hand is identified by using data detected by the capacitive sensor.

An embodiment of this application provides another method, to select to use a specific emulated card by detecting whether a screen of a mobile device is on when the mobile device is close to an NFC card reader.

Figure 18:
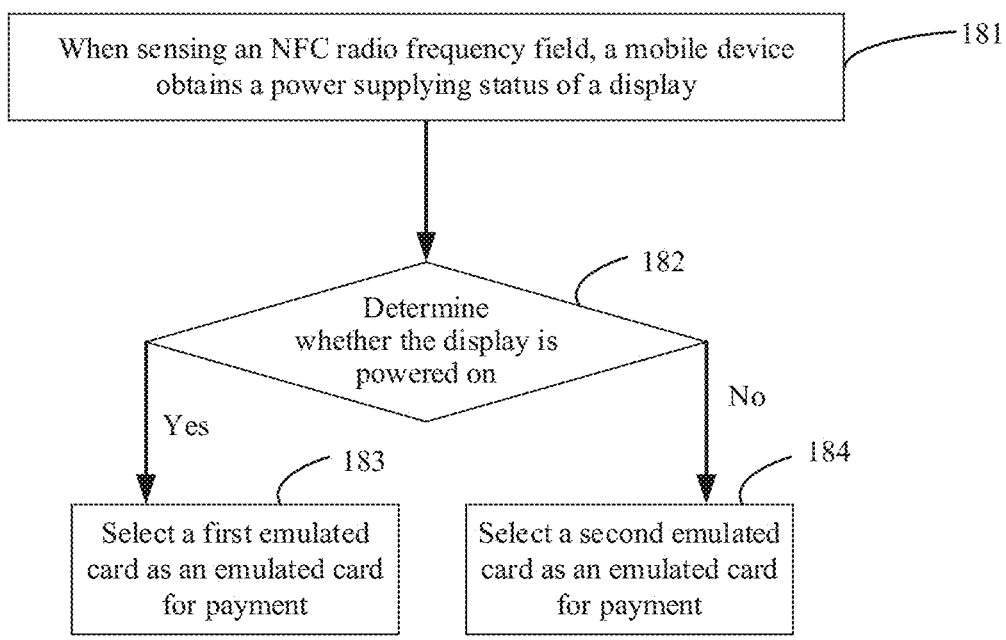
FIG. 18 is a schematic flowchart of a method for selecting an emulated card based on a display according to some embodiments.

As shown in FIG. 18, this embodiment provides an emulated card selection method. The method may be implemented on the foregoing mobile phone 200. For example, a card selection rule specified by a user is as follows: When a mobile device is close to an NFC card reader, a first emulated card is selected if a screen is on, or a second emulated card is selected if a screen is off. A corresponding identification rule that is stored in the mobile device and that is used to identify a card swiping status of the mobile device may be as follows: When a display is powered on, the screen is on; or when a display is powered off, the screen is off. A card swiping rule obtained according to the card selection rule and the identification rule is as follows: The first emulated card is selected when the display is powered on, or the second emulated card is selected when the display is powered off. The method specifically includes the following steps.

Step 181: When sensing an NFC radio frequency field, the mobile device obtains a power supplying status of the display.

It may be understood that, that the mobile device senses the NFC radio frequency field is that the mobile device senses an NFC radio frequency field with sufficient strength, for example, the strength of the sensed NFC radio frequency field reaches a predetermined radio frequency field strength threshold.

It may be understood that, in some embodiments, when sensing the NFC radio frequency field, the mobile device prompts the user to turn on the screen to select the first emulated card or turns off the screen to select the second emulated card, and obtains a power supplying status of the display after the prompt appears for a preset time. After seeing the prompt, the user may select to turn off the screen or keep the screen on. Therefore, accuracy of determining which card is selected by the user can be improved by obtaining the status of the display after the prompt appears for a period of time.

Step 182: Determine, based on the power supplying status of the display, whether the display is powered, and perform step 183 if the display is powered, or perform step 184 if the display is not powered.

Step 183: Select the first emulated card as an emulated card for payment.

Step 184: Select the second emulated card as an emulated card for payment.

For a process after the emulated card for NFC payment/ NFC verification is determined, refer to step 403a to step 405. Details are not described herein again.

In the foregoing embodiments related to FIG. 4A and FIG. 4B, FIG. 11, FIG. 12, FIG. 13, FIG. 14, FIG. 17, and FIG. 18, quick selection is performed between the two cards: the first emulated card and the second emulated card. A plurality of emulated cards are usually configured on the mobile device. To perform quick selection on more emulated cards, the card selection rules in the foregoing embodiments may be combined. For example, if the card selection rule (as shown in the embodiment shown in FIG. 4A and FIG. 4B) related to fingerprint input and the card selection rule (as shown in the embodiments shown in FIG. 11, FIG. 12, FIG. 13, and FIG. 14) related to the facing direction in which the mobile device is close to the NFC card reader, a selection manner for four emulated cards may be provided. Examples are as follows:

A first emulated card is selected if there is fingerprint input and a front side of the mobile device is close to the NFC card reader.

A second emulated card is selected if there is fingerprint input and a rear side of the mobile device is close to the NFC card reader.

A third emulated card is selected if there is no fingerprint input and a front side of the mobile device is close to the NFC card reader.

A fourth emulated card is selected if there is no fingerprint input and a rear side of the mobile device is close to the NFC card reader.

It may be understood that the identification rule in FIG. 4A and FIG. 4B may be used as a card swiping status identification rule corresponding to the card selection rule based on whether there is fingerprint input, and any one of the identification rules in FIG. 11, FIG. 12, FIG. 13, and FIG. 14 may be used as a card swiping status identification rule corresponding to the selection rule based on the facing direction in which the mobile device is close to the NFC card reader. Identification results according to the two identification rules are combined for determining, so that selection may be performed on the four emulated cards.

Similarly, the card selection rule (as shown in the embodiment shown in FIG. 17) related to the left hand and the right hand and the card selection rule (as shown in the embodiment shown in FIG. 4A and FIG. 4B) related to fingerprint input may be combined, or the card selection rule (as shown in the embodiment shown in FIG. 18) related to screen-on/ off and the card selection rule (as shown in the embodiment shown in FIG. 4A and FIG. 4B) related to fingerprint input may be combined, or the card selection rule (as shown in the embodiments shown in FIG. 11, FIG. 12, FIG. 13, and FIG. 14) related to the facing direction in which the mobile device is close to the NFC card reader and another physical button may be combined. Examples are as follows:

A first emulated card is selected if a front side of the mobile device is close to the NFC card reader and a volume button is long-pressed.

A second emulated card is selected if a rear side of the mobile device is close to the NFC card reader and a volume button is not long-pressed.

A third emulated card is selected if a front side of the mobile device is close to the NFC card reader and a volume button is long-pressed.

A fourth emulated card is selected if a rear side of the mobile device is close to the NFC card reader and a volume button is not long-pressed.

It may be understood that there may be another combination manner.

In the embodiments shown in FIG. 4A and FIG. 4B, FIG. 11, FIG. 12, FIG. 13, FIG. 14, FIG. 17, and FIG. 18, when sensing the NFC radio frequency field, the mobile device needs to first determine whether the mobile device is in a quick card selection state, or first determine whether a user has selected an emulated card for NFC payment or NFC verification. If the user has selected the emulated card for NFC payment or NFC verification, detection for quick card selection does not need to be performed. Specifically, when sensing the NFC radio frequency field, the mobile device first determines whether an emulated card is selected. If the emulated card is selected, a subsequent step of obtaining a device parameter (for example, information indicating a status of obtaining a fingerprint image, infrared ranging data, data of an ambient light sensor, data of a front-facing camera, data of a posture sensor, touch data of a touchscreen, or a status of a display) or a subsequent step of triggering to enable a related sensor (for example, enable an infrared ranging sensor or a camera) is not performed. If no emulated card is selected, subsequent steps in the foregoing embodiments may be performed.

Specifically, whether an emulated card is selected may be determined by determining whether a wallet application is opened. If the wallet application is not opened, no emulated card is selected. If the wallet application is opened, whether an emulated card in the wallet application is selected is further determined. If no emulated card in the wallet application is selected, no emulated card is selected. If any emulated card in the wallet application is selected, it is determined that the emulated card is selected.

If the emulated card is selected, it indicates that the mobile device has selected the emulated card for transaction or NFC verification before the mobile device is close to the NFC card reader. In this case, determining for quick card selection does not need to be performed based on a preset condition.

In some embodiments, if it is detected that the user selects the emulated card for NFC payment or NFC verification, when the mobile device senses the radio frequency field, the mobile device performs NFC payment or NFC verification by using the emulated card selected by the user, and does not perform quick card selection.

In the embodiments related to FIG. 4A and FIG. 4B, FIG. 11, FIG. 12, FIG. 13, FIG. 14, FIG. 17, and FIG. 18, a process in which the mobile device determines the emulated card may be performed by a card selection module in the mobile device. The card selection module may be disposed in the NFC apparatus 202, and the NFCC runs the card selection module. Alternatively, the card selection module may be disposed in an operating system of the mobile device, and a processor of the mobile device runs the card selection module.

If the card selection module is disposed in the NFC apparatus, after the NFC apparatus detects the NFC radio frequency field, the NFCC runs the card selection module to determine the emulated card. After the emulated card is determined, the NFC apparatus and a peer NFC card reader establish a communication connection to perform NFC interaction.

If the card selection module is disposed in the operating system, after the NFC apparatus detects the NFC radio frequency field, the NFCC notifies the processor that the NFC radio frequency field is detected, and the processor runs the card selection module. After the emulated card is determined, the processor notifies the NFCC that a subsequent service instruction is sent to an NFCEE corresponding to the emulated card, and the NFCC performs NFC interaction according to the notification.

Figure 19:
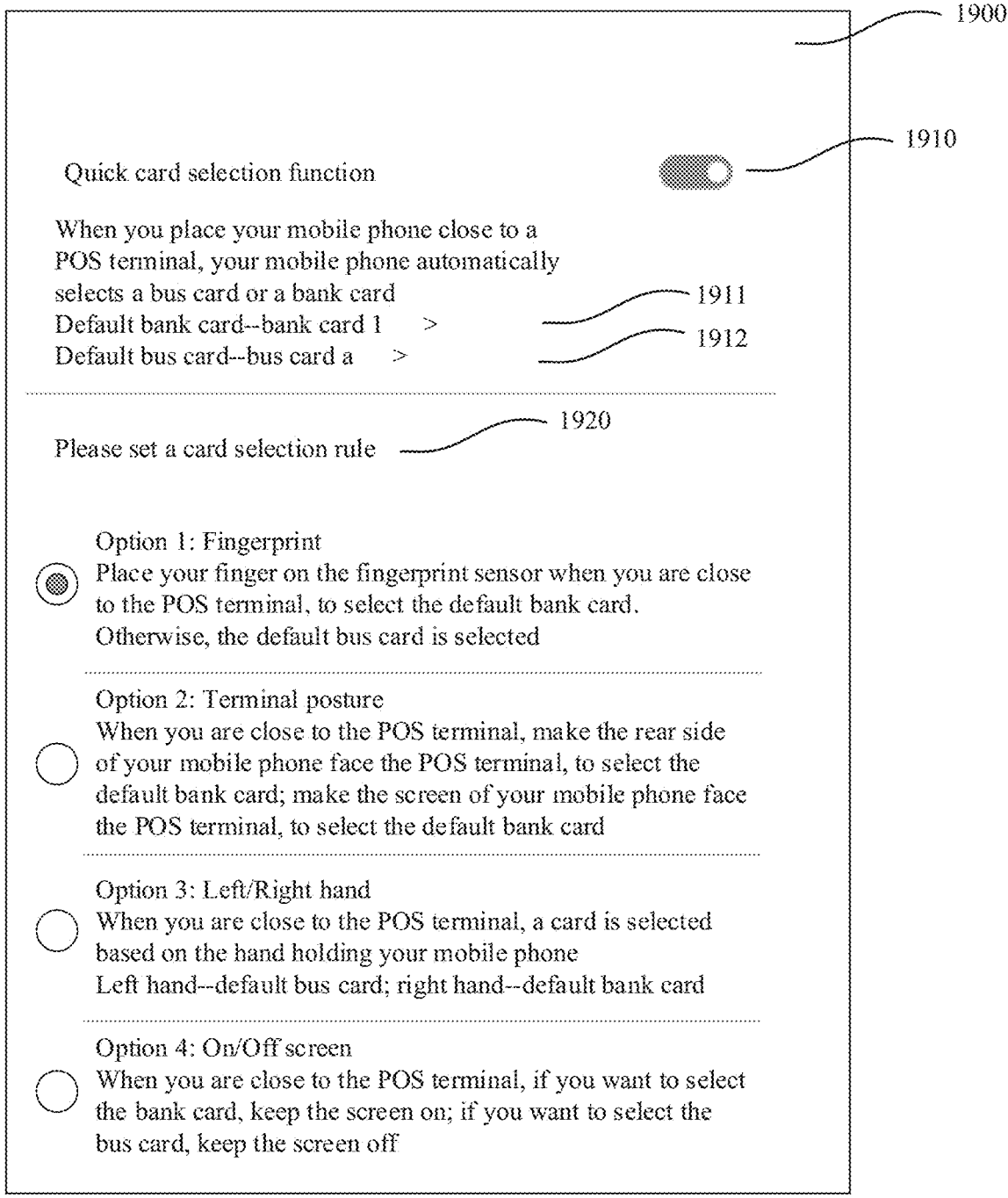
FIG. 19 is a schematic diagram of a user interface for setting a quick card selection function according to some embodiments.

In some embodiments, the mobile device such as the mobile phone 200 provides a quick card selection setting screen for NFC payment. It may be understood that the quick card selection setting screen is a setting screen provided for the user to set a card selection rule. For example, as shown in FIG. 19, an emulated card for NFC payment may be selected more efficiently, so as to perform quick payment during NFC payment next time. A quick card swiping setting screen 1900 provides a switch 1910 for a quick card selection function. The user may choose to enable or disable the quick card selection function. If the user chooses to enable the quick card selection function, selection is automatically performed between a bus card and a bank card when a mobile phone is directly placed close to a POS terminal. If a wallet application is bound to a plurality of bank cards or a plurality of bus cards, the setting screen 1900 provides options 1911 and 1912 for a default bank card and a default bus card. When the quick card selection function is enabled, the user can select the default bank card and the default bus card. The setting screen 1900 provides a rule for automatically selecting a bus card and a bank card during card swiping. FIG. 19 shows four options. When an option 1 is selected, and a terminal is close to a POS terminal, if the user places a finger on a fingerprint sensor, the terminal automatically selects the default bank card for transaction, or if the user places no finger on a fingerprint sensor, the terminal selects the default bus card for transaction. When an option 2 is selected, and a terminal is close to a POS terminal, if a rear side of the terminal faces the POS terminal, the default bank card is automatically selected for transaction, or if a screen of the terminal faces the POS terminal, the default bus card is automatically selected for transaction. When an option 3 is selected, if the user holds a terminal with a left hand and approaches a POS terminal, the default bus card is automatically selected for transaction, or if the user holds a terminal with a right hand and approaches a POS terminal, the default bank card is selected for transaction. When an option 4 is selected, and a terminal is close to a POS terminal, if a screen is on, the bank card is selected for transaction, or if a screen is off, the bus card is selected for transaction.

It may be understood that the quick card swiping setting screen 1900 may include at least one of the options 1 to 4, and may further include another option other than the options 1 to 4. FIG. 19 is merely an example, and there may be different representation manners based on a user interface design requirement of the terminal.

It may be understood that each card selection rule may correspond to one identification rule for identifying a card swiping status by the mobile device. For example, the embodiments in FIG. 4A and FIG. 4B, FIG. 11, FIG. 12, FIG. 13, FIG. 14, FIG. 17, and FIG. 18 provide identification rules for identifying a card swiping status. One card selection rule in a mobile device may correspond to one identification rule. For example, in a mobile phone, as shown in the option 2 in FIG. 19, if a specified card selection rule is that selection of a specified emulated card is determined by determining whether a front side or a rear side is close to an NFC card reader, the mobile phone may have only one identification rule. For example, the mobile phone may include only an identification rule based on whether a distance detected by an infrared ranging sensor is less than a distance threshold. For different mobile phones, there may be different identification rules for the card selection rule in the option 2, for example, the identification rules described in the embodiments corresponding to FIG. 11, FIG. 12, FIG. 13, and FIG. 14.

The embodiment shown in FIG. 4A and FIG. 4B corresponds to a setting in which the quick card selection function is enabled and the option 1 is selected. The embodiments shown in FIG. 11, FIG. 12, FIG. 13, and FIG. 14 correspond to a setting in which the quick card selection function is enabled and the option 2 is selected. Different sensors or components are used for execution. The embodiment shown in FIG. 17 corresponds to a setting in which the quick card selection function is enabled and the option 3 is selected. The embodiment shown in FIG. 18 corresponds to a setting in which the quick card selection function is enabled and the option 4 is selected.

When the quick card selection function is enabled on the quick card selection setting screen in FIG. 19, after receiving an event notification notifying that the NFC radio frequency field is sensed, in response to settings of different card selection rules on the quick card selection setting screen in FIG. 19, the card selection module of the mobile device invokes a corresponding card swiping status identification rule, triggers obtaining of data of a sensor, a display, or a camera of the terminal according to the identification rule, and determines an emulated card based on the obtained data, to perform the procedure shown in FIG. 4A and FIG. 4B, FIG. 11, FIG. 12, FIG. 13, FIG. 14, FIG. 17, or FIG. 18.

Figure 20:
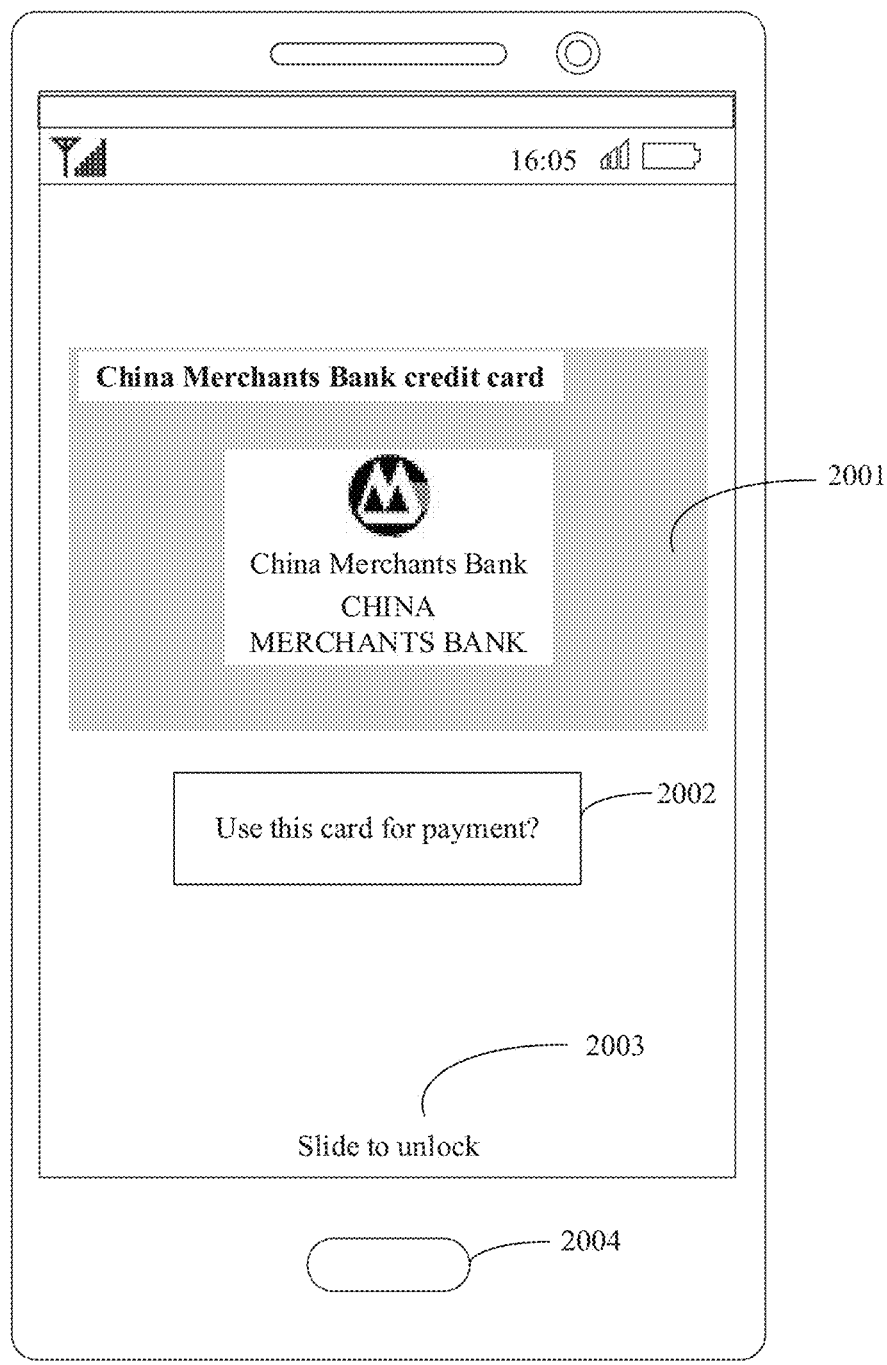
FIG. 20 is a schematic diagram of a user interface of prompting a user to confirm an emulated card according to some embodiments.

In some other embodiments, when the mobile device determines the emulated card for NFC payment, the mobile device may turn on a touchscreen, and may prompt, on a lock screen, the user to confirm whether to select the automatically determined emulated card. As shown in FIG. 20, when the mobile device determines the emulated card, the touchscreen of the mobile device is turned on. In this case, the lock screen is displayed on the touchscreen. An icon 2003 indicates the lock screen of the mobile device. The determined emulated card such as an icon 2001 may be further displayed on the lock screen, and a prompt box 2002 is used to prompt the user, so that the user confirms whether the determined emulated card needs to be used for NFC payment. The user may press a physical button 2004 at the bottom of the mobile device, and this operation indicates that the emulated card automatically determined by the mobile device is confirmed by the user. Then, the mobile device selects the determined emulated card based on the confirmation of the user to perform NFC payment. After the NFC payment is completed, information indicating that the NFC payment succeeds may be displayed on the lock screen. The touchscreen may be turned off after the information is displayed for a preset time (for example, 5 seconds). In addition, if NFC payment is performed in a lock-screen case, related payment information (for example, a payment location, a payment time, and a payment amount) may not be displayed after the NFC payment succeeds, but the payment information can be viewed only after the user unlocks the screen.

In some other embodiments, the mobile device may automatically select a card and perform payment without turning on the screen for the user for confirmation, and the user does not need to perform any operation, especially when the determined emulated card is a bus card. In this way, operation steps can be simplified, and user experience can be improved.

Figure 21:
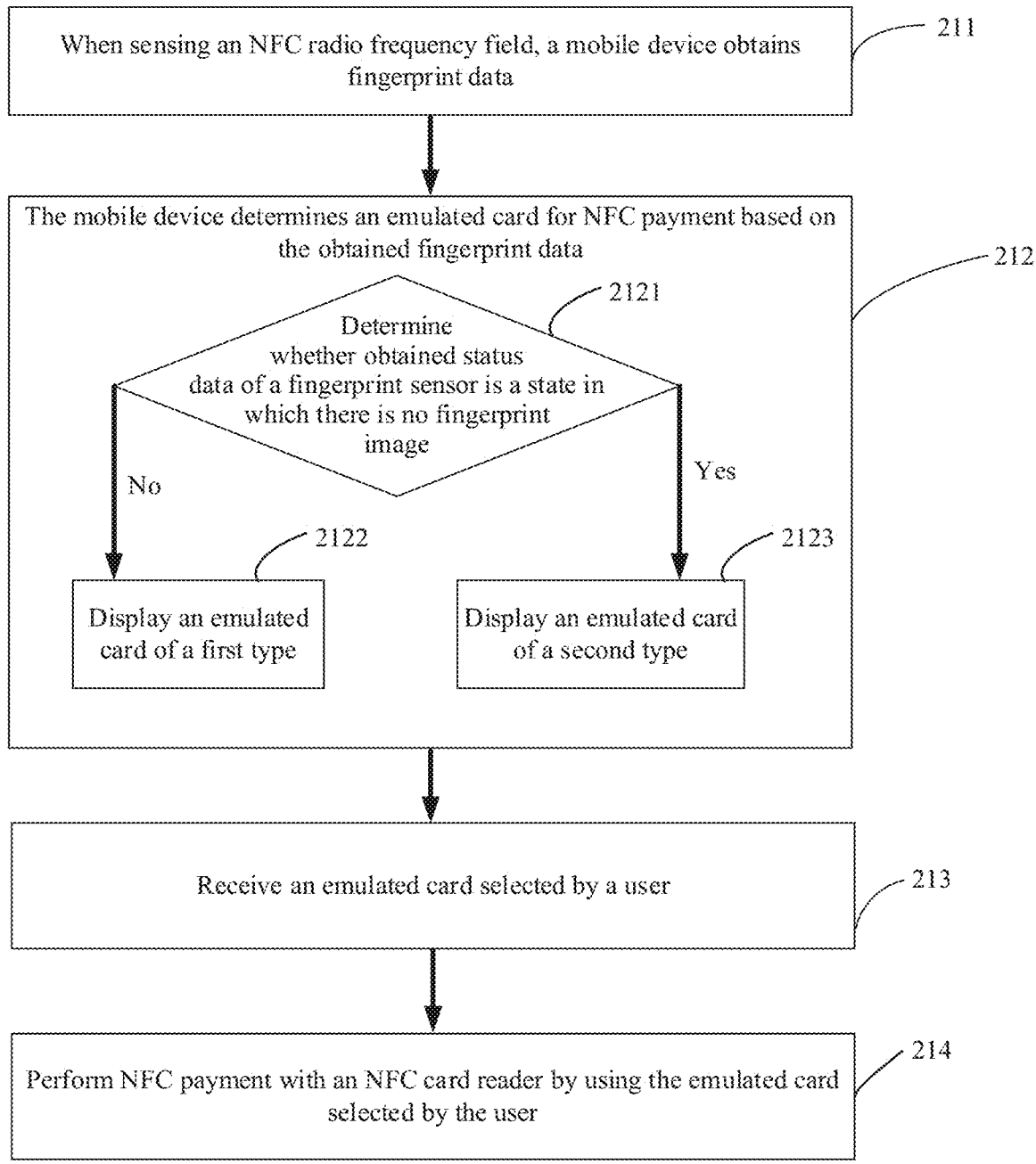
FIG. 21 is a schematic flowchart of an NFC interaction method according to some embodiments.

In the foregoing embodiments, an emulated card can be quickly selected by using different card swiping postures of the mobile device. The embodiments of this application further provide an embodiment. A user may be quickly prompted, by using different card swiping postures of a mobile device, with a specific type of emulated card configured on the mobile device, so that the user performs selection. As described above, there are three types of emulated cards: a bank card, a bus card, and an entrance guard card in the mobile device. Each of the three types of emulated cards may further include a plurality of emulated cards. For example, emulated cards of a bank card type may include a credit card of the China Merchants Bank, a debit card of the Bank of China, and the like. As shown in FIG. 21, based on whether there is a fingerprint touch, the mobile device may provide different types of emulated cards for the user for selection. For example, a card selection rule specified by the user is as follows: An emulated card of a first type is displayed when there is fingerprint input, or an emulated card of a second type is displayed when there is no fingerprint input. The mobile device stores a corresponding identification rule for identifying a card swiping status of the mobile device, and the identification rule is as follows: If information indicating a status of obtaining a fingerprint image is a state in which no fingerprint image is obtained, there is no fingerprint input; or if information indicating a status of obtaining a fingerprint image is not a state in which no fingerprint image is obtained, there is fingerprint input. A card swiping rule of the mobile device may be obtained according to the card selection rule specified by the user and the pre-stored identification rule, and is as follows: When the information indicating the status of obtaining the fingerprint image is not the state in which no fingerprint image is obtained, the emulated card of the first type is displayed, or when the information indicating the status of obtaining the fingerprint image is the state in which no fingerprint image is obtained, the emulated card of the second type is displayed. The method includes the following steps.

Step 211: When sensing an NFC radio frequency field, the mobile device obtains the information indicating the status of obtaining the fingerprint image, where the information indicating the status of obtaining the fingerprint image is used to indicate the obtaining status of the fingerprint image, and may be used to determine whether there is fingerprint input. For details, refer to step 401.

Step 212: The mobile device determines a type of an emulated card for NFC payment based on the obtained information indicating the status of obtaining the fingerprint image.

Specifically, step 212 includes step 2121: Determine whether the information indicating the status of obtaining the fingerprint image is the state in which no fingerprint image is obtained. If the information indicating the status of obtaining the fingerprint image is the state in which no fingerprint image is obtained, it indicates that there is no fingerprint input, and step 2123 is performed. If the information indicating the status of obtaining the fingerprint image is not the state in which no fingerprint image is obtained, it indicates that there is fingerprint input, and step 2122 is performed.

Figure 22A:
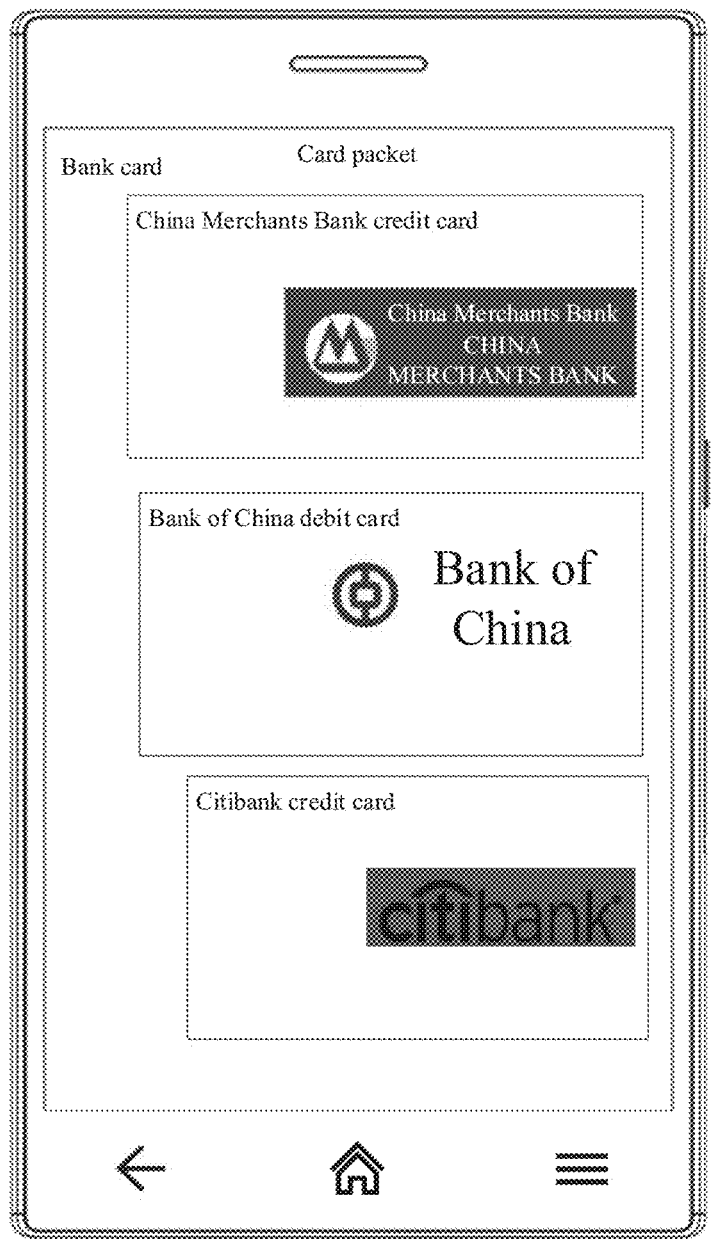
FIG. 22A and FIG. 22B are schematic diagrams of user interfaces of prompting different types of emulated cards according to some embodiments.
Figure 22B:
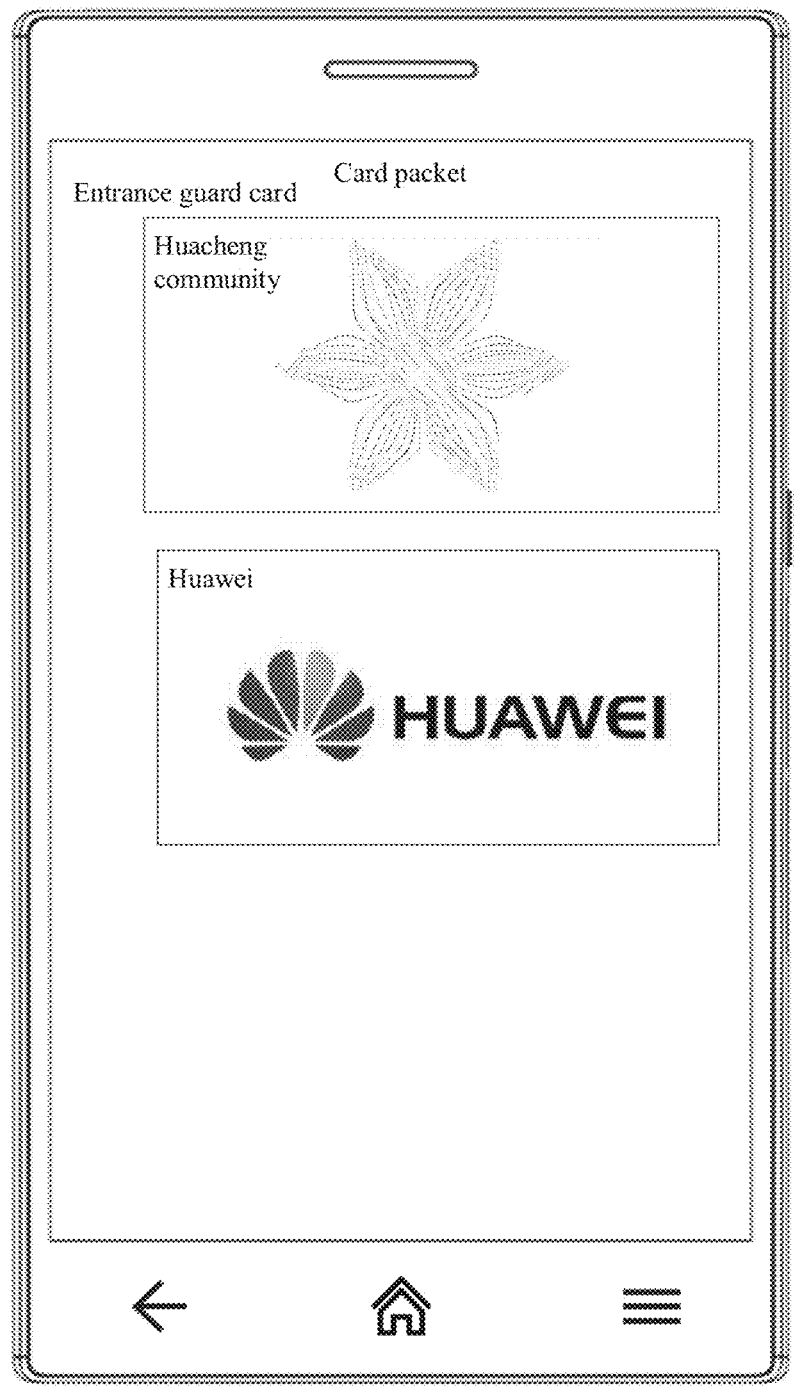

Step 2122: Display the emulated card of the first type.
Step 2123: Display the emulated card of the second type.
FIG. 22A shows an emulated card of a bank card type in the mobile device, and FIG. 22B shows an emulated card of an entrance guard card type in the mobile device.

Step 213: Receive an emulated card selected by the user.
The user may select the emulated card for NFC interaction in FIG. 22A or FIG. 22B.

Step 214: Perform NFC interaction by using the emulated card selected by the user. For details, refer to step 404.

In this embodiment, different types of emulated cards are quickly displayed for the user for selection by detecting whether there is a fingerprint touch, so that a complex process in which the user finds a wallet application and selects the emulated card for NFC interaction is reduced.

Similarly, a person skilled in the art may select different types of emulated cards with reference to selection manners of different emulated cards in related embodiments in FIG. 11, FIG. 12, FIG. 13, FIG. 14, FIG. 17, and FIG. 18.

Similarly, for a card selection rule of quickly selecting different types of emulated cards, a user setting interface may be provided for the user with reference to the screen shown in FIG. 19.

Figure 23:
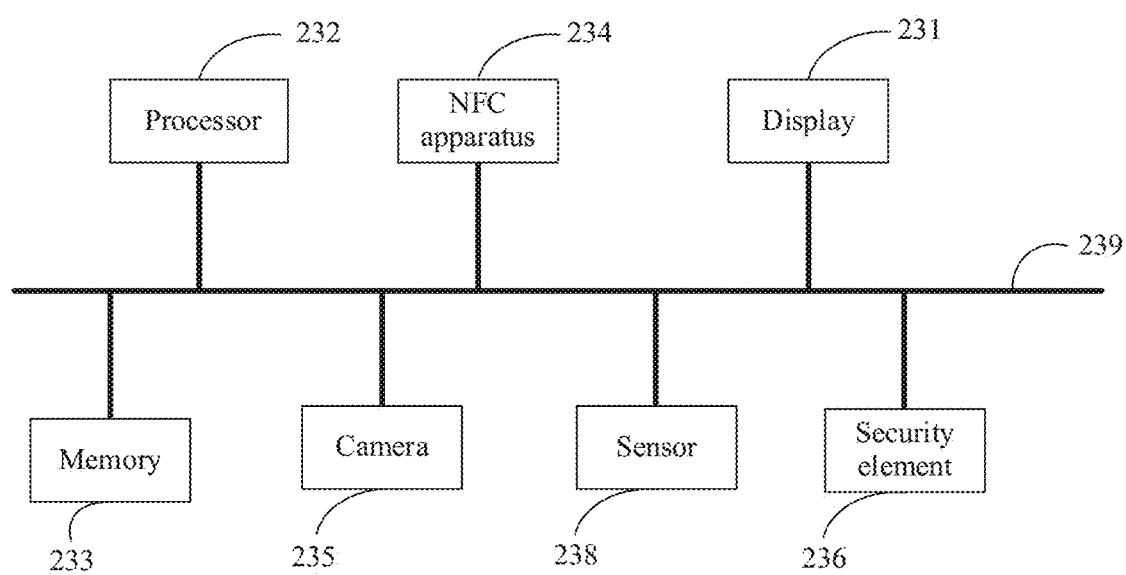
FIG. 23 is a schematic diagram of a hardware structure of a mobile device according to some embodiments.

As shown in FIG. 23, an embodiment of this application provides a mobile device that performs data transmission based on NFC. The mobile device may perform the methods in the foregoing embodiments. The mobile device may specifically include a display 231, a processor 232, a memory 233, an NFC apparatus 234, a camera 235, a security element 236, and one or more sensors 238. The sensors 238 may include a fingerprint sensor, an infrared ranging sensor, an ambient light sensor, a posture sensor, a touch sensor (touch panel), and the like. The foregoing hardware may be connected by using a communications bus 239. When detecting an NFC radio frequency field, the NFC apparatus 234 triggers the processor 232 to selectively obtain data of the display 231, the camera 235, and the sensor 238 according to a card selection rule specified by a user and a corresponding identification rule for identifying a card swiping status. The processor 232 determines an emulated card for NFC payment or NFC verification based on the collected data. The processor 232 may display the determined emulated card to the user by using the display 231. The processor 232 may select the emulated card after a confirmation operation of the user is received. The NFC apparatus 234 performs NFC payment with an NFC card reader based on the selected emulated card. The memory 233 may store payment information, for example, a payment location, a payment time, and a payment amount, received after NFC payment is completed, and the payment information may be displayed to the user by using the display 231.

Figure 24:
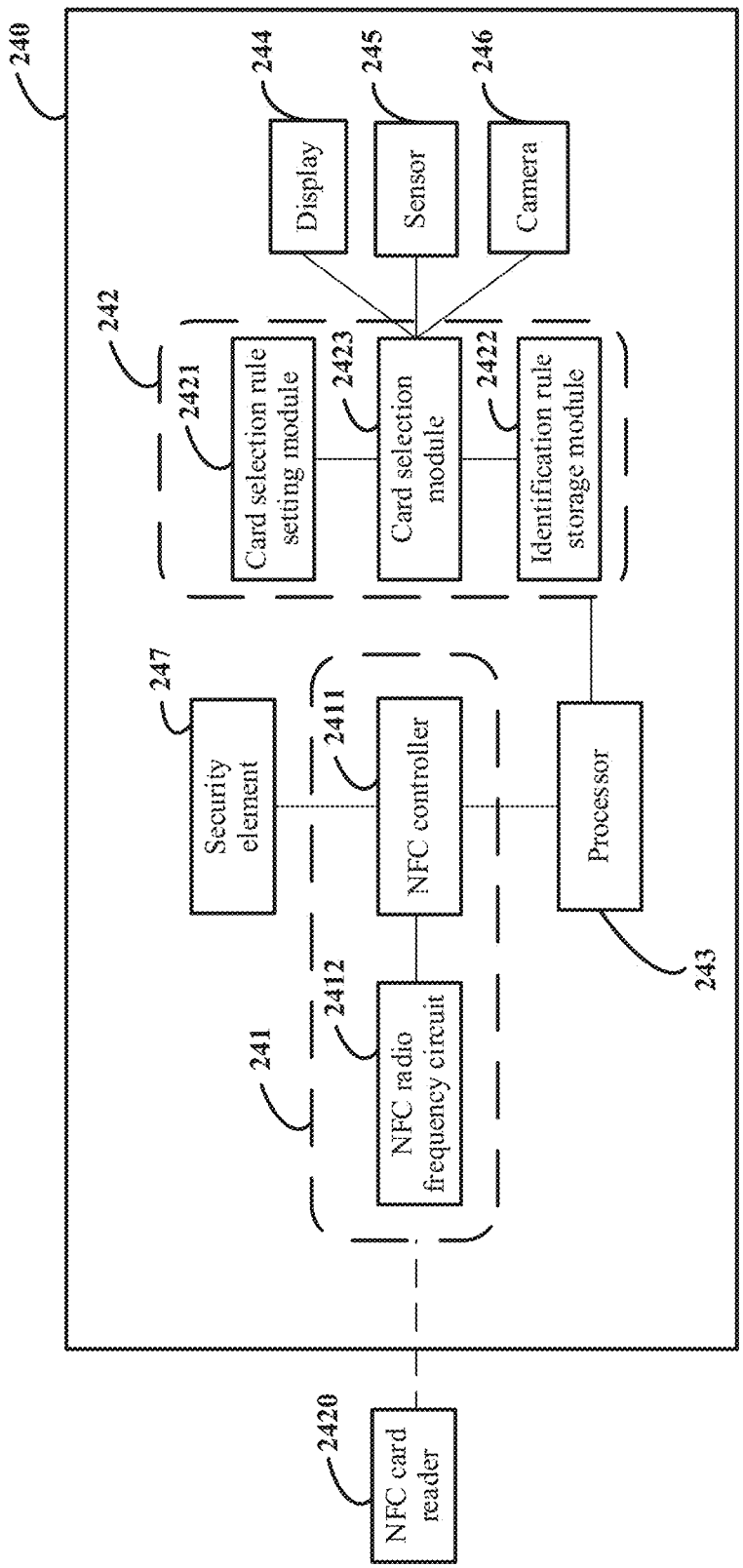
FIG. 24 is a schematic diagram of an NFC payment framework according to some embodiments.

As shown in FIG. 24, in some other embodiments, a mobile device 240 may include an NFC apparatus 241, a memory 242, a processor 243, a security element 247, and the like. The NFC apparatus 241 includes an NFC controller 2411 and an NFC radio frequency circuit 2412. The memory 242 of the mobile device 240 includes a card selection rule setting module 2421, an identification rule storage module 2422, and a card selection module 2423. The card selection rule setting module 2421 stores a card selection rule specified by a user, and the identification rule storage module 2422 stores an identification rule for identifying a card swiping status of the mobile device. It may be understood that the memory 242 further includes an application program such as a bank flash payment APP that performs NFC payment based on an HCE technology and an application program such as a system wallet APP (not shown in the figure) that performs NFC payment based on an entire terminal. The security element 247 is connected to the NFC radio frequency circuit 2412 on the mobile device 240 by using the NFC controller 2411, and a card application (an emulated card) may be configured in an NFCEE such as the security element 247. The card selection module 2423 obtains, according to the preset card selection rule and the corresponding card swiping status identification rule, a parameter of a component related to the identification rule, and performs analysis based on the parameter of the component to determine an emulated card for NFC payment. Specifically, the card selection module may obtain various component parameters collected by, for example, a display 244, a sensor 245, and a camera 246. The sensor 245 may be an infrared ranging sensor, an ambient light sensor, a touch sensor, a posture sensor, or the like.

The processor 243 runs the card selection module 2423, and may specifically perform the methods in the related embodiments shown in FIG. 4A and FIG. 4B, FIG. 11, FIG. 12, FIG. 13, FIG. 14, FIG. 17, FIG. 18, and FIG. 21. When the card selection module determines an emulated card, the NFC apparatus 241 is instructed to use the emulated card when the NFC apparatus 241 interacts with an NFC card reader 2420.

Figure 25:
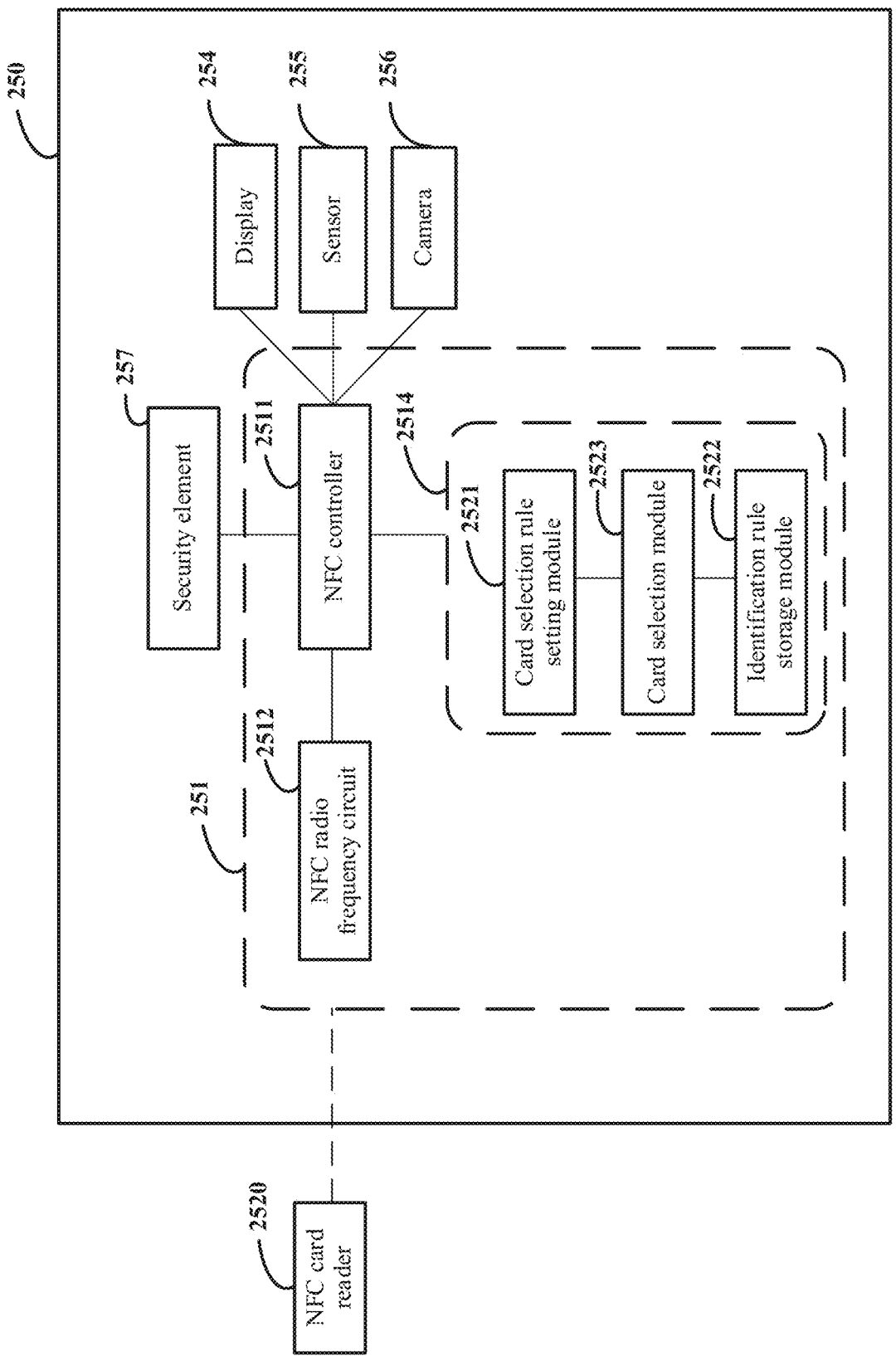
FIG. 25 is a schematic diagram of another NFC payment framework according to some embodiments.

As shown in FIG. 25, in some other embodiments, a mobile device 250 may include an NFC apparatus 251, a security element 257, and the like. The NFC apparatus 251 includes an NFC controller 2511, an NFC radio frequency circuit 2512, and a memory 2514. The memory 2514 includes a card selection rule setting module 2521, an identification rule storage module 2522, and a card selection module 2523. The card selection rule setting module 2521 stores a card selection rule specified by a user, and the identification rule storage module 2522 stores an identification rule for identifying a card swiping status of the mobile device. The security element 257 is connected to the NFC radio frequency circuit 2512 on the mobile device 250 by using the NFC controller 2511, and a card application (an emulated card) may be configured in an NFCEE such as the security element 247. The card selection module 2523 obtains, according to the preset card selection rule and the corresponding card swiping status identification rule, a parameter of a component related to the identification rule, and performs analysis based on the parameter of the component to determine an emulated card for NFC payment. Specifically, the card selection module may obtain various component parameters collected by components, for example, a display 254, a sensor 255, and a camera 256. The sensor 245 may be an infrared ranging sensor, an ambient light sensor, a touch sensor, a posture sensor, or the like.

The NFC controller 2511 runs the card selection module 2523, and may specifically perform the methods in the related embodiments shown in FIG. 4A and FIG. 4B, FIG. 11, FIG. 12, FIG. 13, FIG. 14, FIG. 17, FIG. 18, and FIG. 21. When the card selection module determines an emulated card, the NFC controller 2315 uses the emulated card when interacting with an NFC card reader 2520.

Figure 26:
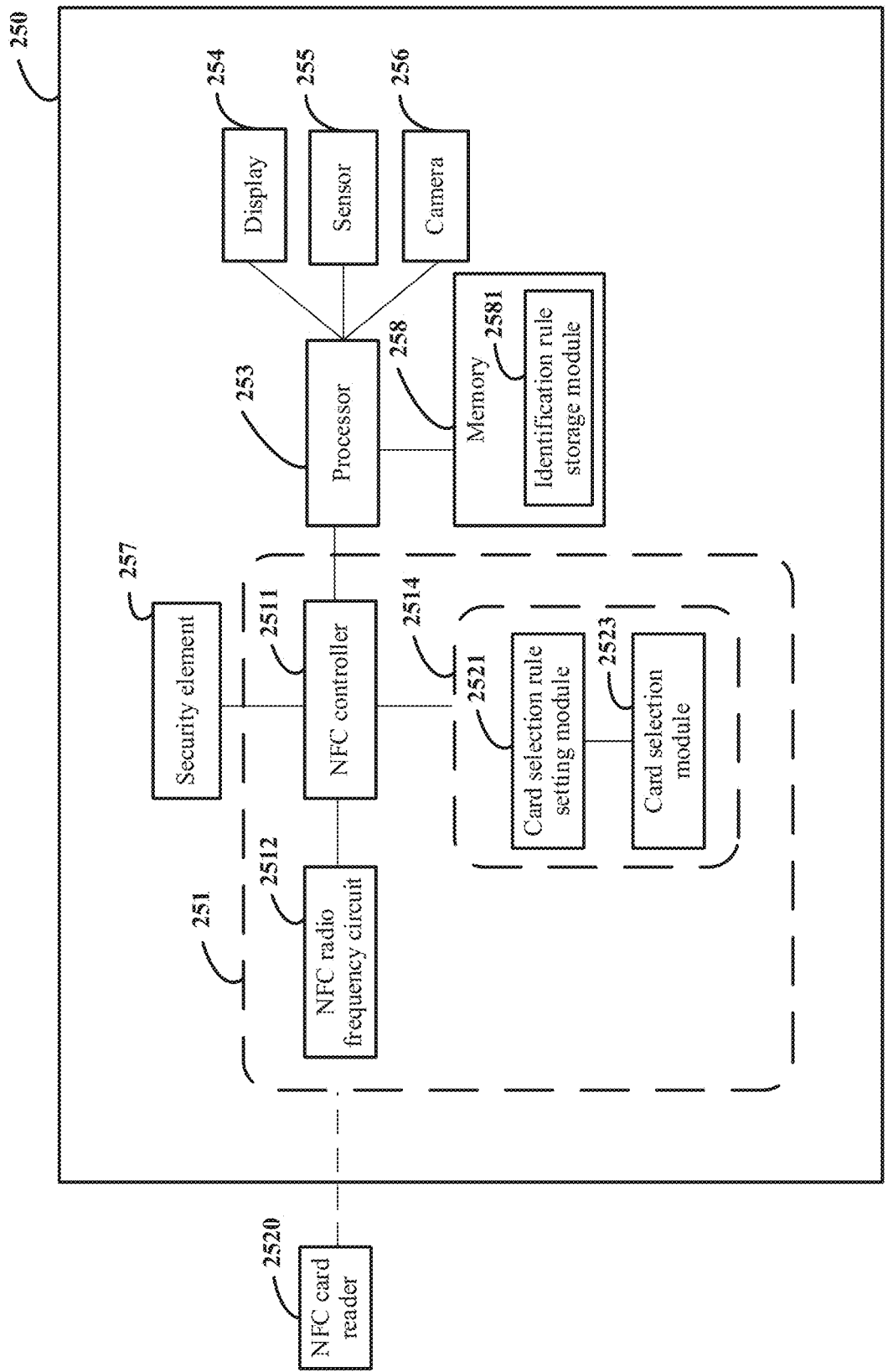
FIG. 26 is a schematic diagram of another NFC payment framework according to some embodiments.

As shown in FIG. 26, compared with that in the embodiment shown in FIG. 25, the mobile device may further include a memory 258 and a processor 253. Compared with that in the embodiment shown in FIG. 25, the memory 2514 includes no identification rule storage module, the memory 258 includes an identification rule storage module 2581, and the identification rule storage module 2581 stores an identification rule for identifying a card swiping status of the mobile device. When running the card selection module 2523, the NFC controller 2511 may trigger the processor 253 to obtain a parameter of a component related to the identification rule. The processor 253 identifies the card swiping status of the mobile device based on the parameter of the component, and returns an identification result to the NFC controller 2511, so that the NFC controller 2511 selects an emulated card for NFC interaction based on the identification result according to the card selection rule.

It may be understood that the NFC apparatus in FIG. 25 and FIG. 26 may have no memory 2514, but information stored in the memory 2514 is directly written into the NFC controller 2511.

For a process of implementing running of a calculator by the foregoing apparatus and each module of the apparatus, refer to corresponding steps in some embodiments of the foregoing methods. Details are not described again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

According to the context, the term "when" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

It should be noted that a person of ordinary skill in the art may understand that all or some of the processes of the methods in the embodiments may be implemented by a computer program instructing related hardware. The program may be stored in a computer-readable storage medium. When the program is executed, the processes of the methods in the embodiments are performed. The storage medium may be a magnetic disk, an optical disc, a read-only memory, a random access memory, or the like.

For a purpose of explanation, the foregoing description is described with reference to a specific embodiment. However, the foregoing example discussion is not intended to be detailed, and is not intended to limit the technical solutions to a disclosed precise form. According to the foregoing teaching content, many modification forms and variation forms are possible. Embodiments are selected and described to fully illustrate the principles of the technical solutions and practical application of the principles, so that another person skilled in the art can make full use of the technical solutions and various embodiments that have various modifications applicable to conceived specific usage.

What is claimed is:

1. An emulated card selection method, implemented by a mobile device comprising a near field communication (NFC) function, a first emulated card, a second emulated card, and an infrared ranging sensor, wherein the emulated card selection method comprises:
    detecting whether a front side of the mobile device is proximate to an NFC card reader when detecting an NFC radio frequency field by:
        obtaining a distance detected by the infrared ranging sensor; and
        determining whether the front side of the mobile device is proximate to the NFC card reader based on the distance according to a preset card swiping status identification rule when detecting the NFC radio frequency field;
    selecting the first emulated card when the front side of the mobile device is proximate to the NFC card reader;
    selecting the second emulated card when the front side of the mobile device is not proximate to the NFC card reader; and
    performing NFC interaction with the NFC card reader based on the first emulated card or the second emulated card.

2. The emulated card selection method of claim 1, wherein the infrared ranging sensor is disposed on a rear side of the mobile device, and wherein the preset card swiping status identification rule comprises:
    determining that the rear side of the mobile device is proximate to the NFC card reader when the distance detected by the infrared ranging sensor is less than a preset distance threshold or when the distance detected by the infrared ranging sensor continuously decreases; and
    determining that the front side of the mobile device is proximate to the NFC card reader when the distance detected by the infrared ranging sensor is not less than the preset distance threshold or when the distance detected by the infrared ranging sensor does not continuously decrease.

3. The emulated card selection method of claim 1, wherein the mobile device further comprises an ambient light sensor, and wherein the emulated card selection method further comprises:
    obtaining ambient light intensity detected by the ambient light sensor; and
    determining whether the front side of the mobile device is proximate to the NFC card reader based on the ambient light intensity according to a preset card swiping status identification rule when detecting the NFC radio frequency field.

4. The emulated card selection method of claim 3, wherein the ambient light sensor is disposed on the front side of the mobile device, and wherein the preset card swiping status identification rule comprises:
    determining that the front side of the mobile device is proximate to the NFC card reader when the ambient light intensity is less than a preset light intensity threshold, when an attenuation amount of the ambient light intensity is greater than a preset attenuation amount threshold, or when an attenuation speed of the ambient light intensity is greater than a preset attenuation speed threshold; and
    determining that a rear side of the mobile device is proximate to the NFC card reader when the ambient light intensity is not less than the preset light intensity threshold, when the attenuation amount of the ambient light intensity is not less than the preset attenuation amount threshold, or when the attenuation speed of the ambient light intensity is not greater than the preset attenuation speed threshold.

5. The emulated card selection method of claim 1, wherein the mobile device further comprises a camera, and wherein the emulated card selection method further comprises:
    obtaining information from the camera; and
    determining whether a portrait is in the information to determine whether the front side of the mobile device is proximate to the NFC card reader when detecting the NFC radio frequency field.

6. The emulated card selection method of claim 5, wherein the mobile device further comprises a front-facing camera, and wherein the emulated card selection method further comprises:
    obtaining information from the front-facing camera;
    determining whether a portrait is in the information when detecting the NFC radio frequency field;
    determining that a rear side of the mobile device is proximate to the NFC card reader when the portrait is in the information; and
    determining that the front side of the mobile device is proximate to the NFC card reader when the portrait is not in the information.

7. The emulated card selection method of claim 1, wherein the mobile device further comprises a posture sensor, and wherein the emulated card selection method further comprises:
    obtaining data of the posture sensor;
    calculating an included angle between a facing direction of the front side of the mobile device and a positive direction of a first axis based on the data of the posture sensor when detecting the NFC radio frequency field, wherein the first axis is perpendicular to a horizontal plane, and wherein the positive direction of the first axis faces upward;

determining that a rear side of the mobile device is proximate to the NFC card reader when the included angle is less than 90 degrees; and determining that the front side of the mobile device is proximate to the NFC card reader when the included angle is not less than 90 degrees.

8. The emulated card selection method of claim 1, wherein the distance is less than or equal to about 10 centimeters.

9. A mobile device, comprising:
a first emulated card;
a second emulated card;
a near field communication (NFC) apparatus coupled to the first emulated card and the second emulated card and configured to:
   detect an NFC radio frequency field of an NFC card reader; and
   perform NFC interaction with the NFC card reader based on the first emulated card or the second emulated card;
a memory coupled to the NFC apparatus;
an infrared ranging sensor; and
a processor coupled to the NFC apparatus, the memory, and the infrared ranging sensor and configured to:
   detect whether a front side of the mobile device is proximate to the NFC card reader when the NFC apparatus detects the NFC radio frequency field of the NFC card reader by:
     obtaining a distance from the infrared ranging sensor; and
     determining whether the front side of the mobile device is proximate to the NFC card reader based on the distance according to a preset card swiping status identification rule;
   select the first emulated card when the front side of the mobile device is proximate to the NFC card reader; and
   select the second emulated card when the front side of the mobile device is not proximate to the NFC card reader.

10. The mobile device of claim 9, wherein the infrared ranging sensor is located on a rear side of the mobile device, and wherein the preset card swiping status identification rule comprises:
determining that the rear side of the mobile device is proximate to the NFC card reader when the distance is less than a preset distance threshold or when the distance detected continuously decreases; and
determining that the front side of the mobile device is proximate to the NFC card reader when the distance is not less than the preset distance threshold or when the distance does not continuously decrease.

11. The mobile device of claim 9, further comprising an ambient light sensor coupled to the processor, wherein the processor is further configured to:
obtain ambient light intensity data from the ambient light sensor; and
determine whether the front side of the mobile device is proximate to the NFC card reader based on the ambient light intensity data according to a preset card swiping status identification rule.

12. The mobile device of claim 11, wherein the ambient light sensor is disposed on the front side of the mobile device, and wherein the preset card swiping status identification rule comprises:
determining that the front side of the mobile device is proximate to the NFC card reader when the ambient light intensity is less than a preset light intensity threshold, when an attenuation amount of the ambient light intensity is greater than a preset attenuation amount threshold, or when an attenuation speed of the ambient light intensity is not greater than the preset attenuation amount threshold; and
determining that a rear side of the mobile device is proximate to the NFC card reader when the ambient light intensity is not less than the preset light intensity threshold, when the attenuation amount of the ambient light intensity is not less than the preset attenuation amount threshold, or when the attenuation speed of the ambient light intensity is not greater than the preset attenuation amount threshold.

13. The mobile device of claim 9, further comprising a camera coupled to the processor, wherein the processor is further configured to:
obtain information from the camera; and
determine whether a portrait is in the information to determine whether the front side of the mobile device is proximate to the NFC card reader.

14. The mobile device of claim 13, wherein the camera is a front-facing camera, and wherein the processor is further configured to:
obtain information from the front-facing camera; and
determine whether a portrait is in the information, wherein a rear side of the mobile device is proximate to the NFC card reader when the portrait is in the information, and wherein the front side of the mobile device is proximate to the NFC card reader when the portrait is not in the information.

15. The mobile device of claim 9, further comprising a posture sensor coupled to the processor, wherein the processor is further configured to:
obtain data of the posture sensor; and
calculate an included angle between a facing direction of the front side of the mobile device and a positive direction of a first axis based on the data of the posture sensor, wherein the first axis is perpendicular to a horizontal plane, wherein the positive direction of the first axis faces upward, wherein a rear side of the mobile device is close to the NFC card reader when the included angle is less than 90 degrees, and wherein the front side of the mobile device is proximate to the NFC card reader when the included angle is not less than 90 degrees.

16. The mobile device of claim 9, wherein the distance is less than or equal to about 10 centimeters.

17. A non-transitory computer program product comprising instructions stored on a non-transitory computer-readable medium that, when executed by a processor, cause a mobile device to:
detect whether a front side of the mobile device is proximate to a near field communication (NFC) card reader when detecting an NFC radio frequency field by:
   obtaining a distance detected by an infrared ranging sensor of the mobile device; and
   determining whether the front side of the mobile device is proximate to the NFC card reader based on the distance;
select a first emulated card of the mobile device when the front side of the mobile device is proximate to the NFC card reader;
select a second emulated card of the mobile device when the front side of the mobile device is not proximate to the NFC card reader; and perform NFC interaction with the NFC card reader based on the first emulated card or the second emulated card.

18. The non-transitory computer program product of claim 17, wherein the instructions further cause the mobile device to:
   determine that a rear side of the mobile device is proximate to the NFC card reader when the distance detected by the infrared ranging sensor is less than a present distance threshold; and
   determine that the front side of the mobile device is proximate to the NFC card reader when the distance detected by the infrared ranging sensor is not less than the present distance threshold.

19. The non-transitory computer program product of claim 17, wherein the instructions further cause the mobile device to:
   determine that a rear side of the mobile device is proximate to the NFC card reader when the distance detected by the infrared ranging sensor continuously decreases; and
   determine that the front side of the mobile device is proximate to the NFC card reader when the distance detected by the infrared ranging sensor does not continuously decrease.

20. The non-transitory computer program product of claim 17, wherein the distance is less than or equal to about 10 centimeters.

* * * * *

UNITED STATES PATENT AND TRADEMARK OFFICE
CERTIFICATE OF CORRECTION

| | | |
|---|---|---|
| PATENT NO. | : 11,979,202 B2 | |
| APPLICATION NO. | : 16/958491 | |
| DATED | : May 7, 2024 | |
| INVENTOR(S) | : Sishan Wang et al. | |

It is certified that error appears in the above-identified patent and that said Letters Patent is hereby corrected as shown below:

On the Title Page

Item (57) Abstract should read: "An emulated card selection method is implemented on a mobile device having a near field communication (NFC) NFC function. A first emulated card and a second emulated card are configured on the mobile device. When detecting an NFC radio frequency field, the mobile device detects whether there is fingerprint input. The mobile device selects the first emulated card if there is the fingerprint input. The mobile device selects the second emulated card if there is no fingerprint input. The mobile device performs NFC interaction with the NFC card reader based on the selected first emulated card or second emulated card. The mobile device can automatically select an emulated card in different emulated cards based on a card swiping status when a user uses an NFC emulated card."

Signed and Sealed this
Eighteenth Day of June, 2024

Katherine Kelly Vidal
*Director of the United States Patent and Trademark Office*